United States Patent
Jha et al.

(10) Patent No.: US 12,056,098 B2
(45) Date of Patent: Aug. 6, 2024

(54) METHODS AND SYSTEMS THAT IDENTIFY COMPUTATIONAL-ENTITY TRANSACTIONS AND CORRESPONDING LOG/EVENT-MESSAGE TRACES FROM STREAMS AND/OR COLLECTIONS OF LOG/EVENT MESSAGES

(71) Applicant: VMware LLC, Palo Alto, CA (US)

(72) Inventors: Ritesh Jha, Bangalore (IN); Shivam Satija, Bangalore (IN); Pushkar Patil, Bangalore (IN); Jobin Raju George, Bangalore (IN); Nikhil Jaiswal, Bangalore (IN)

(73) Assignee: VMware LLC, Palo Alto, CA (US)

( * ) Notice: Subject to any disclaimer, the term of this patent is extended or adjusted under 35 U.S.C. 154(b) by 548 days.

(21) Appl. No.: 17/096,991

(22) Filed: Nov. 13, 2020

(65) Prior Publication Data
US 2022/0066998 A1 Mar. 3, 2022

(30) Foreign Application Priority Data
Aug. 26, 2020 (IN) ............................. 202041036834

(51) Int. Cl.
*G06F 16/18* (2019.01)
*G06F 11/30* (2006.01)
(Continued)

(52) U.S. Cl.
CPC ...... *G06F 16/1865* (2019.01); *G06F 11/3006* (2013.01); *G06F 11/3075* (2013.01); *G06F 16/1734* (2019.01); *G06N 7/01* (2023.01)

(58) Field of Classification Search
None
See application file for complete search history.

(56) References Cited

U.S. PATENT DOCUMENTS

| | | | |
|---|---|---|---|
| 6,922,724 B1 * | 7/2005 | Freeman | G06F 9/505 709/223 |
| 2004/0119617 A1 * | 6/2004 | Brown | H03M 7/30 341/90 |

(Continued)

*Primary Examiner* — Thu N Nguyen
(74) *Attorney, Agent, or Firm* — Quarles & Brady LLP

(57) ABSTRACT

The current document is directed to methods and systems that automatically identify log/event-message traces and computational-entity transactions within collections and/or streams of log/event messages. Automated identification of log/event-message traces provides the basis for automated interpretation, by automated computer-system administration-and-the management subsystems, of the information represented by collections and/or streams of log/event messages. Disclosed approaches to automatically identifying log/event-message traces and computational-entity involve identifying log/event-message types, generating time-series-like log/event-message-type occurrence signals from log/event-message collections and/or streams, and computing cross correlations between pairs of log/event-message-type occurrence signals. In one implementation, a strongly-correlated-type graph is generated from the computed cross correlations, from which connected-components subgraphs, corresponding to computational-entity transactions, are extracted. Log/event-message traces are then extracted from acyclic graphs generated from the connected-component subgraphs.

20 Claims, 61 Drawing Sheets

(51) Int. Cl.
*G06F 16/17* (2019.01)
*G06N 7/01* (2023.01)

(56) References Cited

U.S. PATENT DOCUMENTS

| | | | | |
|---|---|---|---|---|
| 2005/0015424 A1* | 1/2005 | Aguilera | ................. | H04L 41/00 |
| | | | | 709/200 |
| 2014/0149803 A1* | 5/2014 | Lehofer | .............. | H04L 41/0631 |
| | | | | 714/47.1 |
| 2015/0370799 A1* | 12/2015 | Kushmerick | ......... | H04L 41/046 |
| | | | | 707/740 |

* cited by examiner

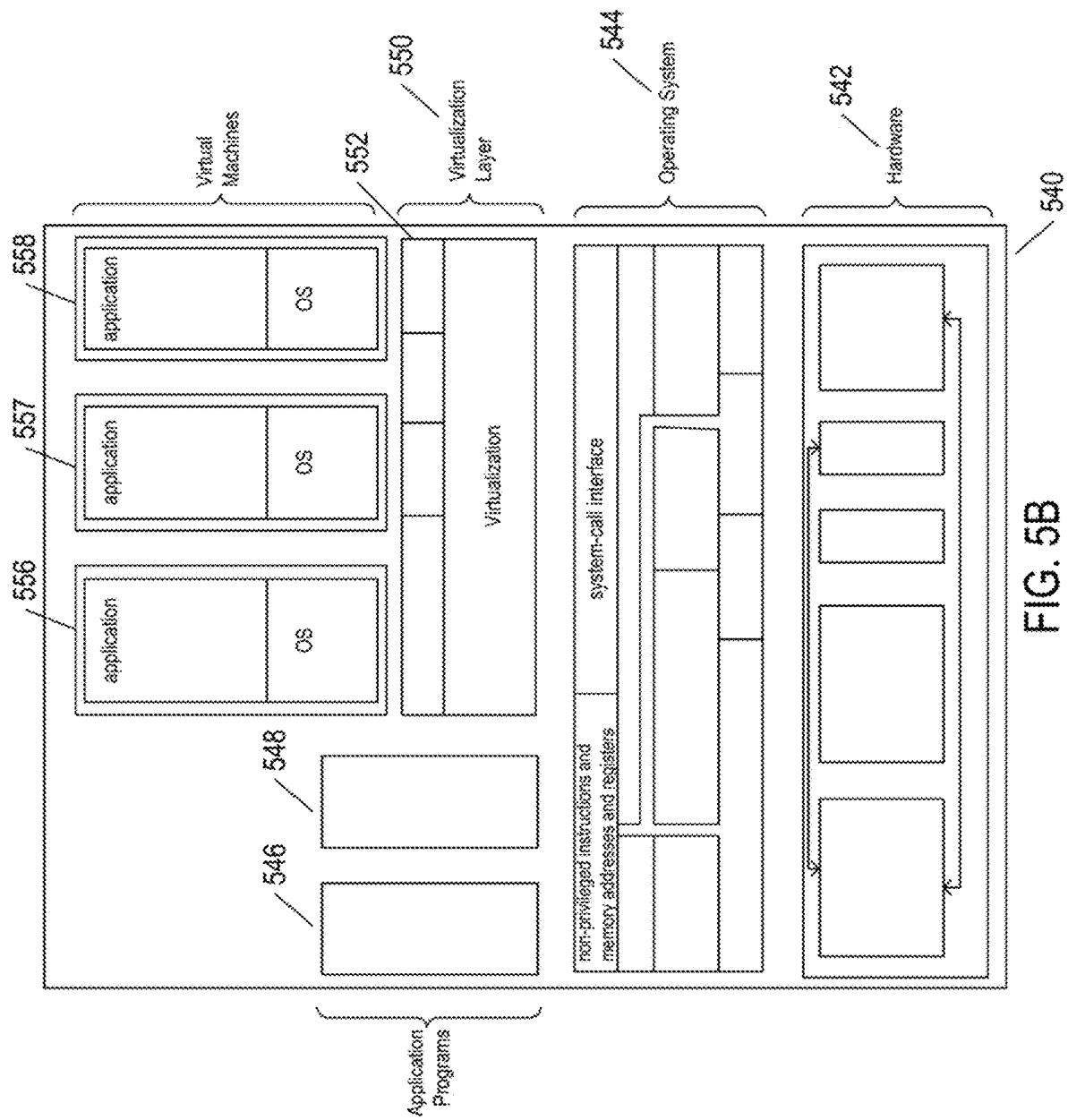

1102  1108  1110

2013-12-02T10:44:24.095Z li-qe-esx5.vmware.com Rhttpproxy: [28959B90 verbose 'Proxy Req 46691'] Connected to localhost:8307 —— 1112                    1106

2013-12-02T10:44:24.094Z li-qe-esx5.vmware.com Rhttpproxy: [FFFC2B90 verbose 'Proxy Req 46691'] new proxy client TCP (local=127.0.0.1:80, peer=127.0.0.1:50155)

2013-12-02T10:44:24.093Z li-qe-esx5.vmware.com Rhttpproxy: [28B93B90 verbose 'Proxy Req 46685'] The client closed the stream, not unexpectedly.

Dec  2 18:48:29 strata-vc 2013-12-02T18:48:30.273Z [7FA39448B700 info 'commonvpxLro' opID=1947d6f9] [VpxLRO] -- FINISH task-internal-2163522 -- -- vim.SessionManager.logout -

2013-12-02T18:48:51.396Z strata-esx1.eng.vmware.com Vpxa: [65B5AB90 verbose 'VpxaHalCnxHostagent' opID=WFU-ed393333] [WaitForUpdatesDone] Completed callback 2013-12-02T18:48:51.395Z strata-esx1.eng.vmware.com Vpxa: [65B5AB90 verbose 'VpxaHalCnxHostagent' opID=WFU-ed393333] [WaitForUpdatesDone] Starting next WaitForUpdates() call to hostd 2013-12-02T18:48:51.395Z strata-esx1.eng.vmware.com Vpxa: [65B5AB90 verbose 'vpxavpxaInvtVm' opID=WFU-ed393333] [VpxaInvtVmChangeListener] Guest DiskInfo Changed 2013-12-02T18:48:51.395Z strata-esx1.eng.vmware.com Vpxa: [65B5AB90 verbose 'halservices' opID=WFU-ed393333] [VpxaHalServices] VMGuestDiskChange Event for vm(6) 59

2013-12-02T18:48:51.395Z strata-esx1.eng.vmware.com Vpxa: [65B5AB90 verbose 'hostdvm' opID=WFU-ed393333] [VpxaHalVmHostagent] 59: GuestInfo changed 'guest.disk'

2013-12-02T18:48:51.395Z strata-esx1.eng.vmware.com Vpxa: [65B5AB90 verbose 'VpxaHalCnxHostagent' opID=WFU-ed393333] [VpxaHalCnxHostagent::ProcessUpdate] Applying updates from 123718 to 123719 (at 123718)

2013-12-02T18:48:51.395Z strata-esx1.eng.vmware.com Vpxa: [65B5AB90 verbose 'VpxaHalCnxHostagent' opID=WFU-ed393333] [WaitForUpdatesDone] Received callback
2013-12-02T18:48:51.360Z li-dev-esx6.eng.vmware.com Hostd: [617C1B90 error 'SoapAdapter.HTTPService'] HTTP Transaction

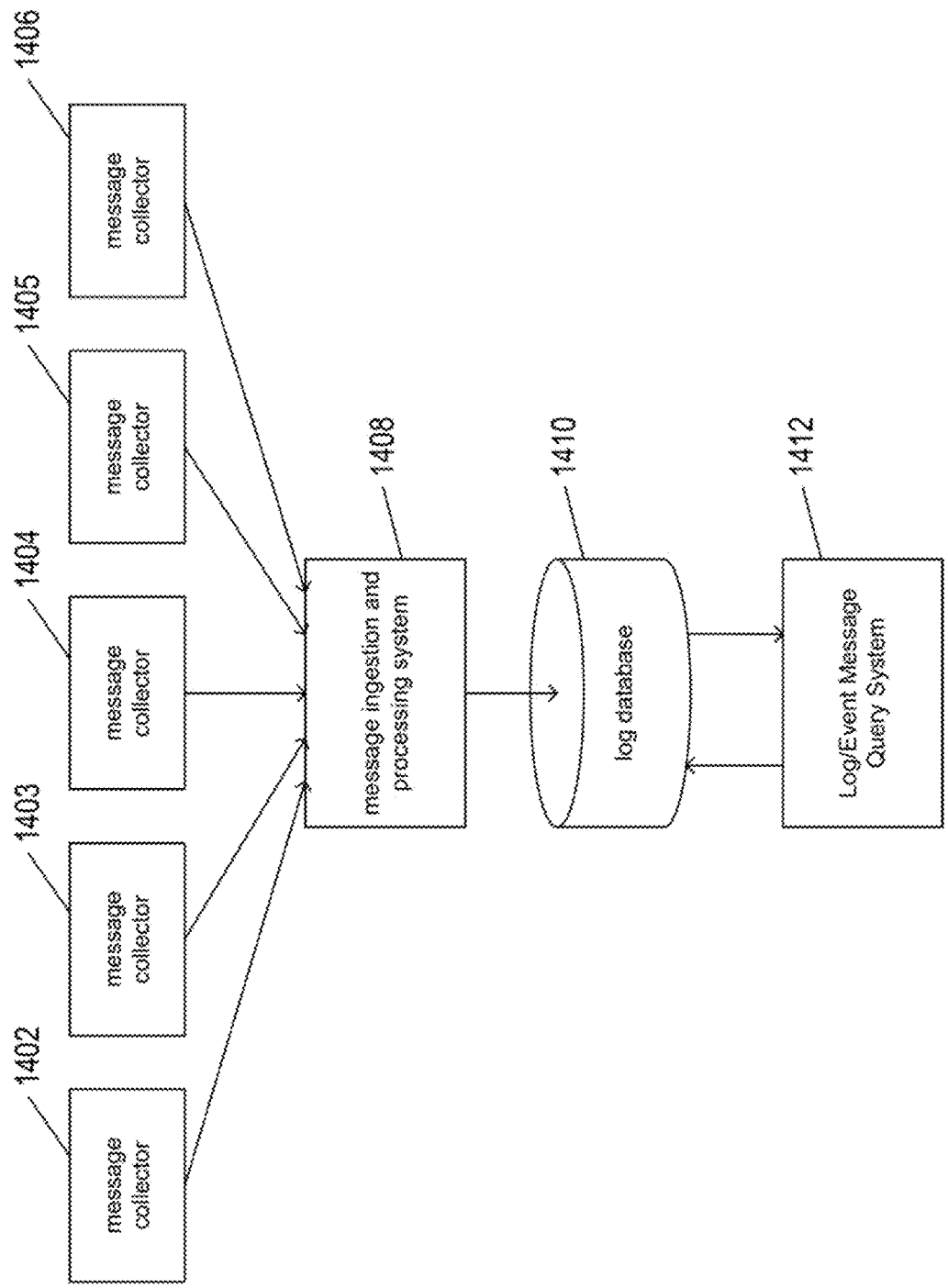

2020-07-30T 13:17:39 — 08:00 INFO [TransApp] : T-comp : ID-a3651f8 timestamp — level — application — action — transaction ID

YEAR (?>\d\d){1,2}
MONTHNUM (?:0?[1-9]|1[0-2])
MONTHDAY (?:(?:0[1-9])|(?:[12][0-9])|(?:3[01])|[1-9])
HOUR (?:2[0123]|[01]?[0-9])
MINUTE (?:[0-5][0-9])
SECOND (?:(?:[0-5]?[0-9]|60)(?:[.,][0-9]+)?)
ISO8601_TIMEZONE (?:Z|[+-]%{HOUR}(?::?%{MINUTE}))
TIMESTAMP_ISO8601 %{YEAR}-%{MONTHNUM}-%{MONTHDAY}[T]%{HOUR}:?%{MINUTE}(?::?%{SECOND})?%
{ISO8601_TIMEZONE}?

LOGLEVEL ([Aa]lert|ALERT|[Tt]race|TRACE|[Dd]ebug|DEBUG|[Nn]otice|NOTICE|[Ii]nfo|INFO|[Ww]arn?
(?:ing)?|WARN?(?:ING)?|[Ee]rr?(?:or)?|ERR?(?:OR)?|[Cc]rit?(?::ical)?|CRIT?(?::ICAL)
?|[Ff]atal|FATAL|[Ss]evere|SEVERE|EMERG(?:ENCY)?|[Ee]merg(?:ency)?)

DATA .*?

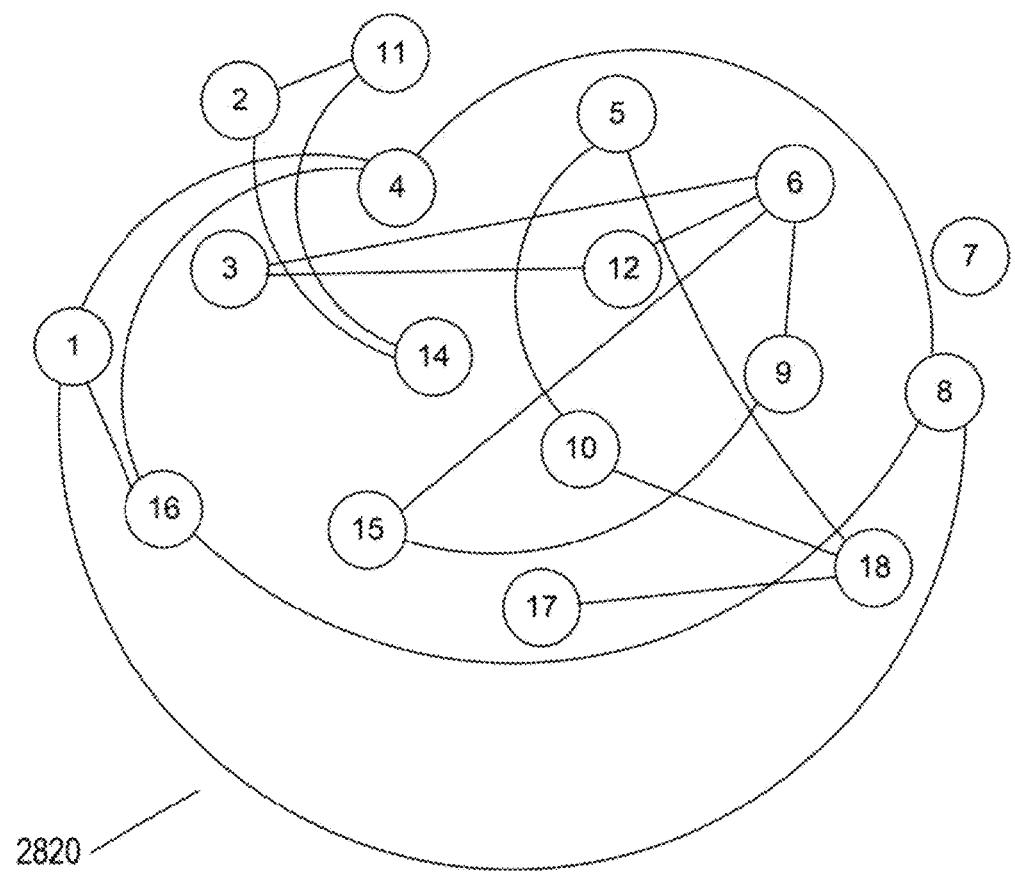
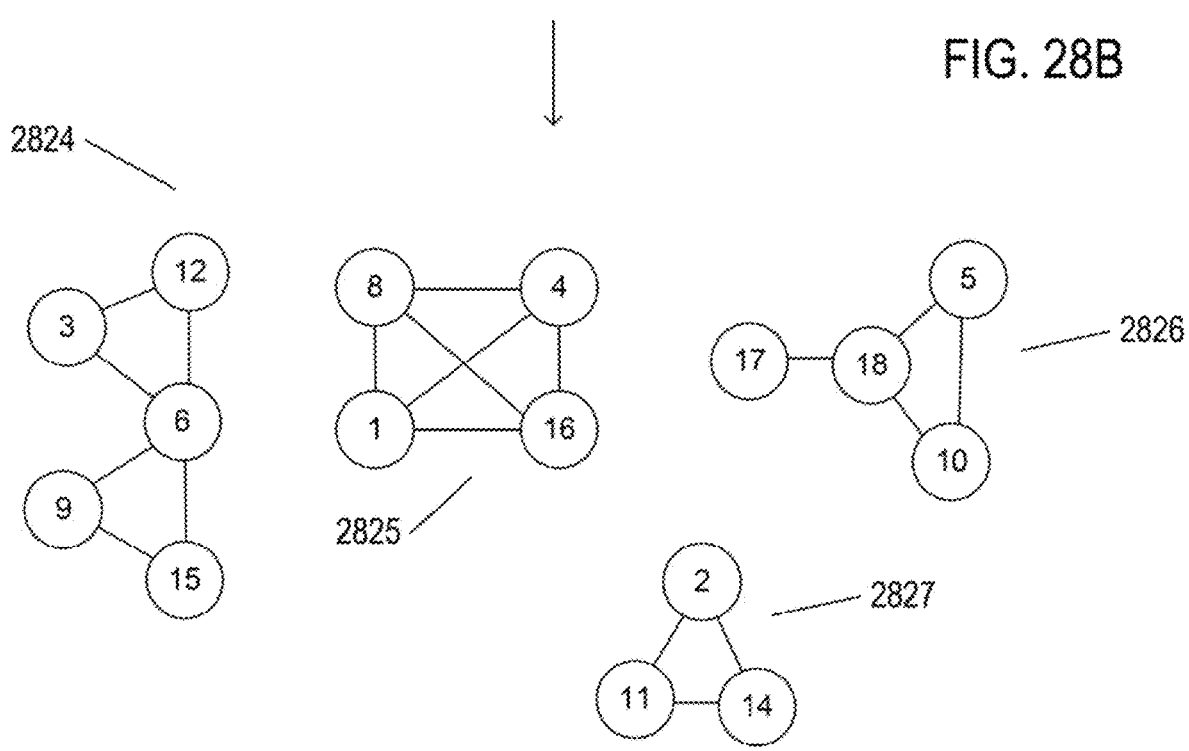
FIG. 28B

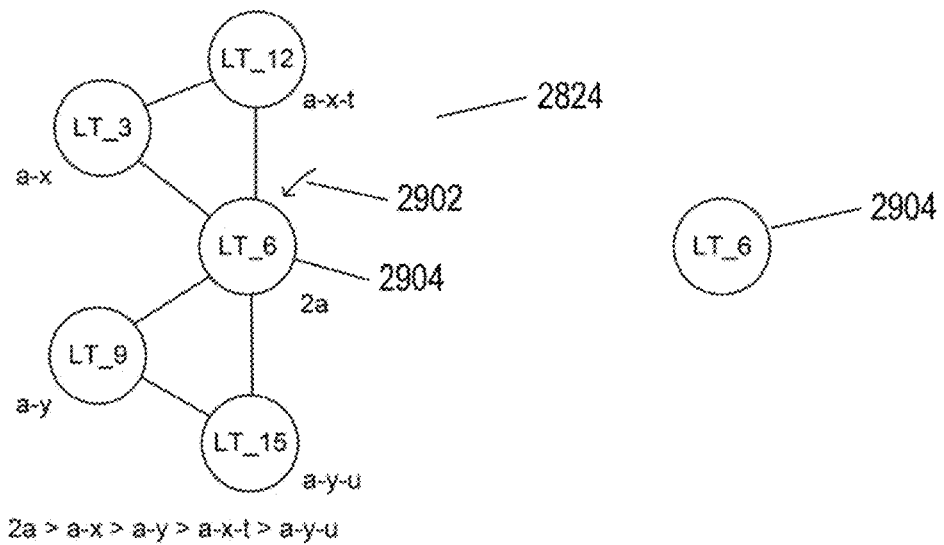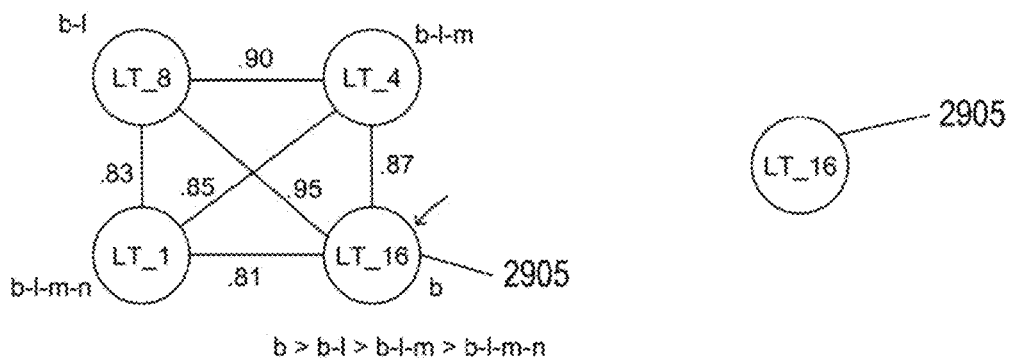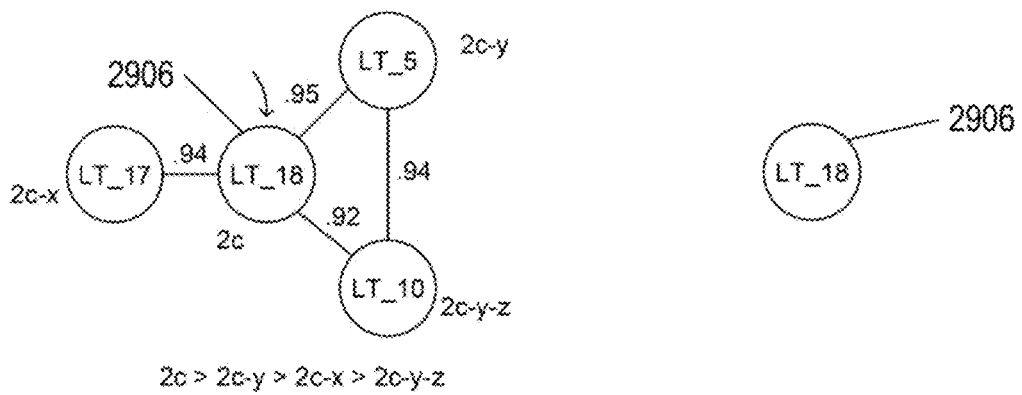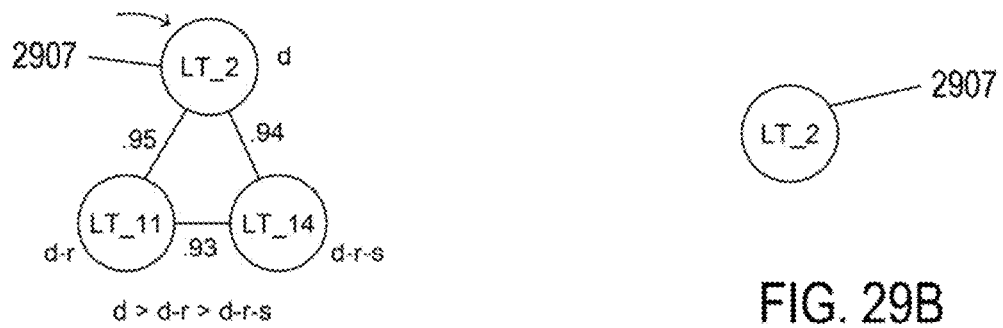
FIG. 29B

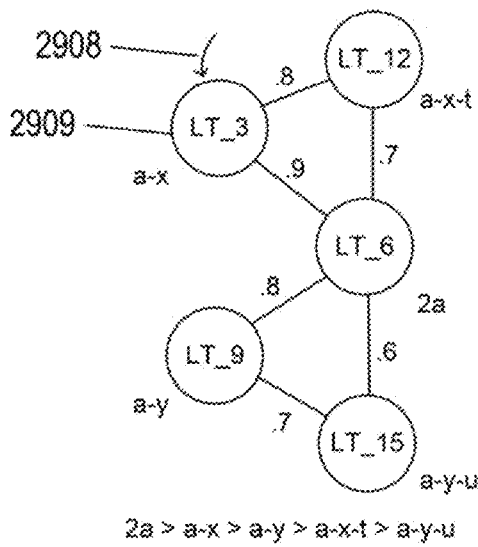
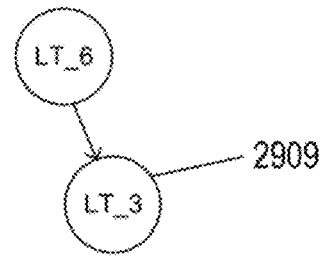
2a > a-x > a-y > a-x-t > a-y-u
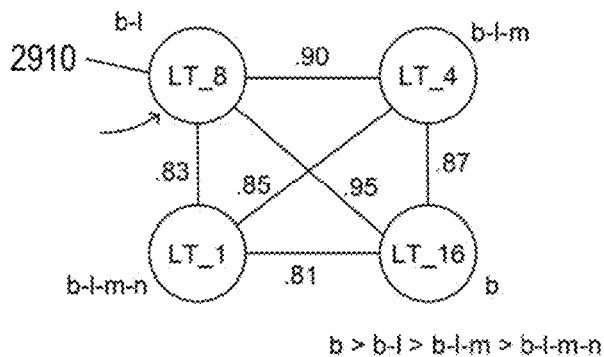
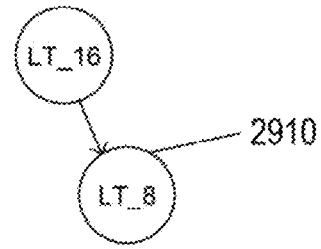
b > b-l > b-l-m > b-l-m-n
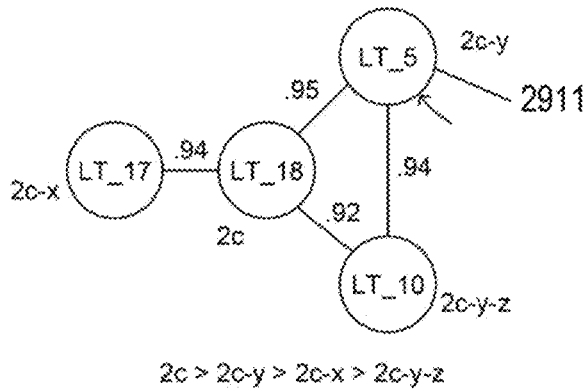
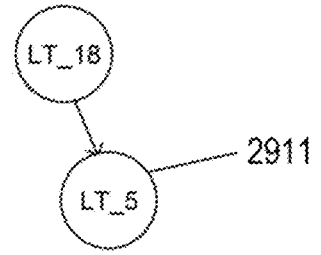
2c > 2c-y > 2c-x > 2c-y-z
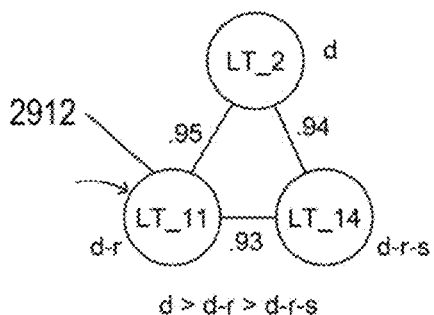
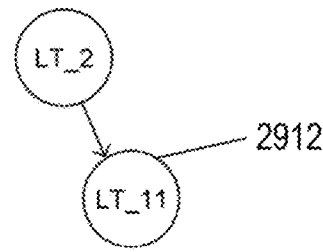
d > d-r > d-r-s
FIG. 29C

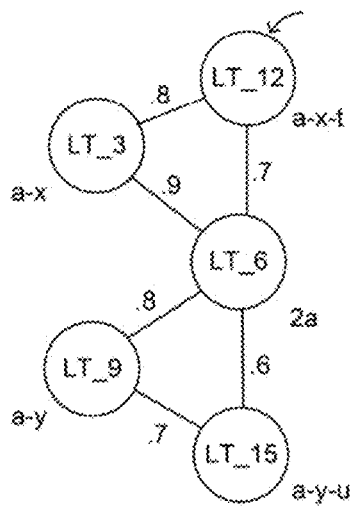
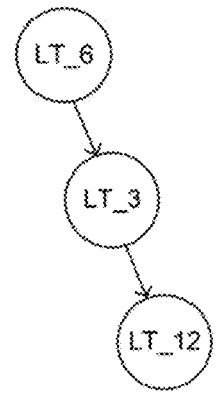
2a > a-x > a-y > a-x-t > a-y-u
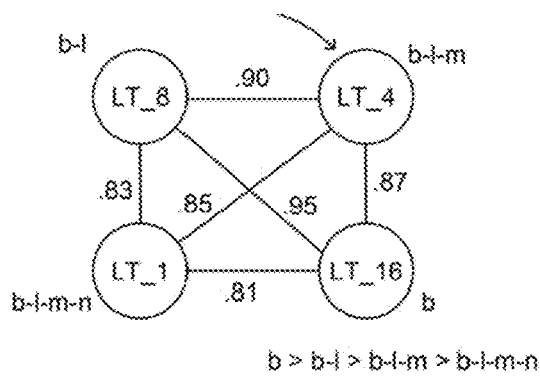
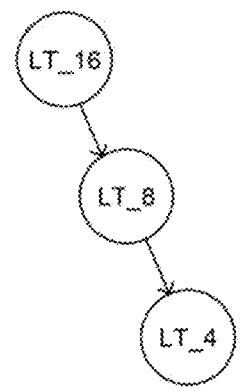
b > b-l > b-l-m > b-l-m-n
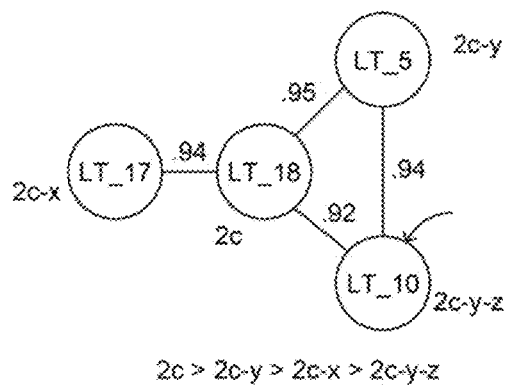
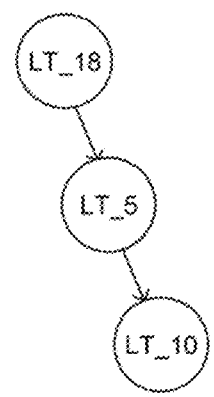
2c > 2c-y > 2c-x > 2c-y-z
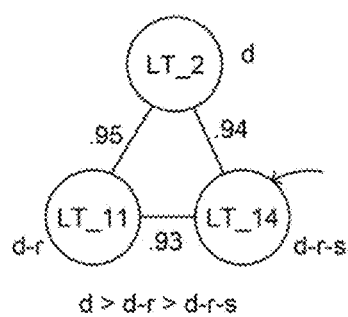
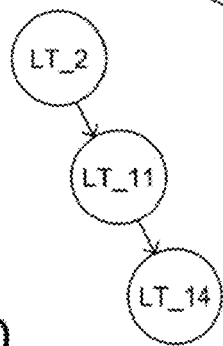
d > d-r > d-r-s
FIG. 29D

```
const int firstVertex = 0;
const int secondVertex = 1;
const int numVertices = 2;
const int smallNo = -1000000;

enum class ComponentType {Vertex, Edge, Undefined};

class graphComponent                    ——— 3002
{
   public:
        friend class vertex;
        friend class edge;
        virtual   ComponentType getType() { return ComponentType::Undefined; };  ——— 3014
        int       getNumValues() { return num; };
        bool      setValue(int i, double d);
        bool      getValue(int i, double& d);                          } 3012
        void      addValue(double d);
        void      deleteValue(int i);
        graphComponent();
        graphComponent(const graphComponent& g);
        graphComponent& operator=(const graphComponent& g);
        virtual ~graphComponent();
};

using graphComponentPtr = graphComponent*;

class vertex : public graphComponent     ——— 3004
{
   public:
        friend class       graphComponent;
        virtual            ComponentType getType() { return ComponentType::Vertex; };
        vertex();
        vertex(double d);
        vertex(double d1, double d2);
        vertex(const vertex& v);
        vertex& operator=(const vertex& v);
        ~vertex();
};
```

FIG. 30A

```
using vertexPtr = vertex*;

class edge : public graphComponent ──── 3006
{
   public:
         friend class      graphComponent;
         virtual           ComponentType getType() { return ComponentType::Edge; };
         vertexPtr*        getVertices() { return &(vertices[firstVertex]); }; ─┐
         edge(vertexPtr vtx1, vertexPtr vtx2);                                   ── 3016
         edge(vertexPtr vtx1, vertexPtr vtx2, double d);
         edge(vertexPtr vtx1, vertexPtr vtx2, double d1, double d2);
         edge(const edge& e);
         edge& operator=(const edge& e);
         ~edge();
};

using edgePtr = edge*;

template<typename C>
class stack    ──── 3008
{
   public:
         C* pop();
         void remove(int i);
         C* look();
         void push(C* c);
         bool onStack(C* i);
         stack();
};

class graph  ──── 3010
{
   public:
         vertexPtr         getVertex();
         void              getEdges(vertexPtr v);
         int               getEdgesUnstacked(vertexPtr v);
         edgePtr           getEdge() { return edgeStack.pop(); };
         void              pushVertex(vertexPtr v) { vertexStack.push(v); };
         vertexPtr         popVertex() { return vertexStack.pop();};
         void              addVertex(vertexPtr v);
         void              removeVertex(vertexPtr v);
         void              removeVertices() { numVertices = 0; };
         void              addEdge(edgePtr e);
         void              removeEdge(edgePtr e);
         void              removeEdges(vertexPtr v);
         void              removeEdgesUnstacked(vertexPtr v);
         graph*            removeAndReturnCC(); ──────── 3018
         graph*            acyclize(int dv_index1, int dv_index2);       ⎫
         void              acyclizeRecurse(int dv_index2, graph* gPtr, vertexPtr vp); ⎬ 3020
         vertexPtr         getMax(int dv_index);                         ⎭
         graph();
         ~graph();
};

using graphPtr = graph*;
```

FIG. 30B

```
graph* graph::removeAndReturnCC()
{
  vertexPtr v;
  graphPtr gPtr;

v = getVertex();                    — 3030
  if (v == NULL) return NULL;         — 3031
  gPtr = new(graph);
  do                                  — 3032
  {
      edgePtr e;
      getEdges(v);                    — 3034
      e = getEdge();                  — 3035
      while (e != NULL)
      {
          vertexPtr* vs;

vs = e->getVertices();
          if (vs[firstVertex] != v) pushVertex(vs[firstVertex]);
          else pushVertex(vs[secondVertex]);
          gPtr->addEdge(e);           — 3038            — 3037
          removeEdge(e);
          e = getEdge();
      }
      gPtr->addVertex(v);             — 3039
      removeVertex(v);                — 3040
      v = popVertex();
  } while (v != NULL);                — 3041 return gPtr;                        — 3042
}
```

```
graphPtr graph::acyclize(int dv_index1, int dv_index2)
{
  int n;
  vertexPtr v = getMax(dv_index1);          ——— 3050
  graph* gPtr;

if (v == NULL) return NULL;               ——— 3051
  gPtr = new(graph);                         ——— 3052
  n = getEdgesUnstacked(v);                  ——— 3053
  pushVertex(v);
  do                                          ——— 3054
  {
      double max = smallNo;
      edgePtr eMax = NULL;

for (int i = 0; i < n; i++)
      {
          double dv;
          edgePtr e;

e = getEdge();
          if (!e->getValue(dv_index2, dv)) continue;    ⎫
          if (dv > max)                                  ⎬ 3056
          {                                              ⎪
              max = dv;
              eMax = e;
          }
      }
      if (eMax == NULL) return gPtr;
      else
      {
          vertexPtr nextV;
          vertexPtr* vp;

vp = eMax->getVertices();
          if (vp[firstVertex] != v) nextV = vp[firstVertex];
          else nextV = vp[secondVertex];
          acyclizeRecurse(dv_index2, gPtr, nextV);    ——— 3057
          gPtr->addEdge(eMax);                         ——— 3058
          removeEdges(nextV);                          ——— 3059
      }
      n = getEdgesUnstacked(v);
  } while (n > 0);
  v = popVertex();
  while (v != NULL)
  {                                   ⎫
      gPtr->addVertex(v);              ⎬ 3060
      v = popVertex();                 ⎭
  }
  removeVertices();            ——— 3061
  return gPtr;                  ——— 3062
}
```

3055 brackets the do-while block.

FIG. 30D

```
void graph::acyclizeRecurse(int dv_index2, graph* gPtr, vertexPtr nxtV)
{
    int n;

if (nxtV == NULL) return;                    ——— 3070
    n = getEdgesUnstacked(nxtV);                 ——— 3071
    pushVertex(nxtV);                            ——— 3072
    if (n == 0) return;
    for (int i = 0; i < n; i++)
    {
        edgePtr e;
        edgePtr eMax = NULL;
        vertexPtr* vp;
        vertexPtr nextV;

e = getEdge();
        vp = e->getVertices();
        if (vp[firstVertex] != nxtV) nextV = vp[firstVertex];
        else nextV = vp[secondVertex];
        acyclizeRecurse(dv_index2, gPtr, nextV);  ——— 3074
        gPtr->addEdge(e);                         ——— 3075
        removeEdges(nextV);
    }
    return;                                       ——— 3076
}
```
}  3073

FIG. 30E

METHODS AND SYSTEMS THAT IDENTIFY COMPUTATIONAL-ENTITY TRANSACTIONS AND CORRESPONDING LOG/EVENT-MESSAGE TRACES FROM STREAMS AND/OR COLLECTIONS OF LOG/EVENT MESSAGES

RELATED APPLICATIONS

Benefit is claimed under 35 U.S.C. 119(a)-(d) to Foreign Application Serial No. 202041036834 filed in India entitled "METHODS AND SYSTEMS THAT IDENTIFY COMPUTATIONAL-ENTITY TRANSACTIONS AND CORRESPONDING LOG/EVENT-MESSAGE TRACES FROM STREAMS AND/OR COLLECTIONS OF LOG/EVENT MESSAGES", on Aug. 26, 2020, by VMware, Inc., which is herein incorporated in its entirety by reference for all purposes.

TECHNICAL FIELD

The current document is directed to distributed-computer-systems and, in particular, to methods and systems that automatically identify log/event-message traces and computational-entity transactions in streams and/or collections of log/event messages.

BACKGROUND

During the past seven decades, electronic computing has evolved from primitive, vacuum-tube-based computer systems, initially developed during the 1940s, to modern electronic computing systems in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems has, in turn, become increasingly complex, involving greater computational overheads and significant inefficiencies and deficiencies. In fact, many desired management-and-administration functionalities are becoming sufficiently complex to render traditional approaches to the design and implementation of automated management and administration systems impractical, from a time and cost standpoint, and even from a feasibility standpoint. Therefore, designers and developers of various types of automated management-and-administration facilities related to distributed computing systems are seeking new approaches to implementing automated management-and-administration facilities and functionalities.

SUMMARY

The current document is directed to methods and systems that automatically identify log/event-message traces and computational-entity transactions within collections and/or streams of log/event messages. Automated identification of log/event-message traces provides the basis for automated interpretation, by automated computer-system administration-and-the management subsystems, of the information represented by collections and/or streams of log/event messages. Disclosed approaches to automatically identifying log/event-message traces and computational-entity involve identifying log/event-message types, generating time-series-like log/event-message-type occurrence signals from log/event-message collections and/or streams, and computing cross correlations between pairs of log/event-message-type occurrence signals. In one implementation, a strongly-correlated-type graph is generated from the computed cross correlations, from which connected-components subgraphs, corresponding to computational-entity transactions, are extracted. Log/event-message traces are then extracted from acyclic graphs generated from the connected-component subgraphs.

BRIEF DESCRIPTION OF THE DRAWINGS

FIGS. 5A-D illustrate two types of virtual machine and virtual-machine execution environments.

FIG. 11 shows a small, 11-entry portion of a log file from a distributed computer system.

FIG. 14 provides a block diagram of a generalized log/event-message system incorporated within one or more distributed computing systems.

FIGS. 19A-C illustrate one approach to extracting fields from a log/event message.

FIGS. 28A-B illustrate a first step the second phase of the transaction/trace-identification process.

FIGS. 29A-G illustrate generation of traces corresponding to each of the application transactions that, in turn, correspond to each of the connected-component subgraphs extracted from strongly-correlated-type graph 2020 shown in FIG. 28B.

FIGS. 30A-E provide an example implementation of methods for extracting connected-component subgraphs from a strongly-correlated-type graph and for transforming the extracted connected-component subgraphs into acyclic graphs, discussed with reference to FIGS. 25-29F.

DETAILED DESCRIPTION

Figure 1:
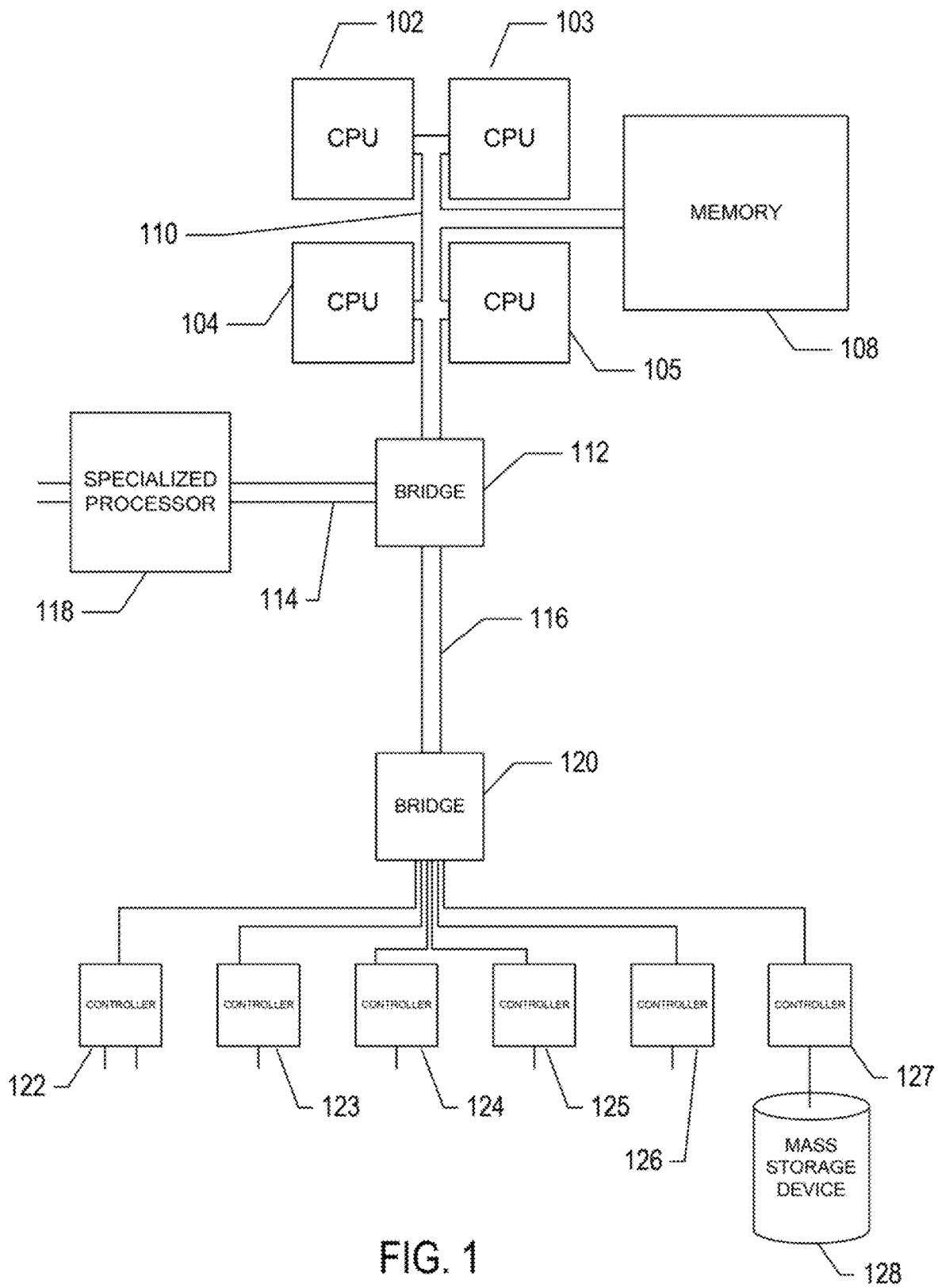
FIG. 1 provides a general architectural diagram for various types of computers.

The current document is directed to methods and systems that automatically identify log/event-message traces and computational-entity transactions within collected sets of log/event messages. In a first subsection, below, a detailed description of computer hardware, complex computational systems, and virtualization is provided with reference to FIGS. 1-10. In a second subsection, the currently disclosed methods and systems are discussed with reference to FIGS. 11-31.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
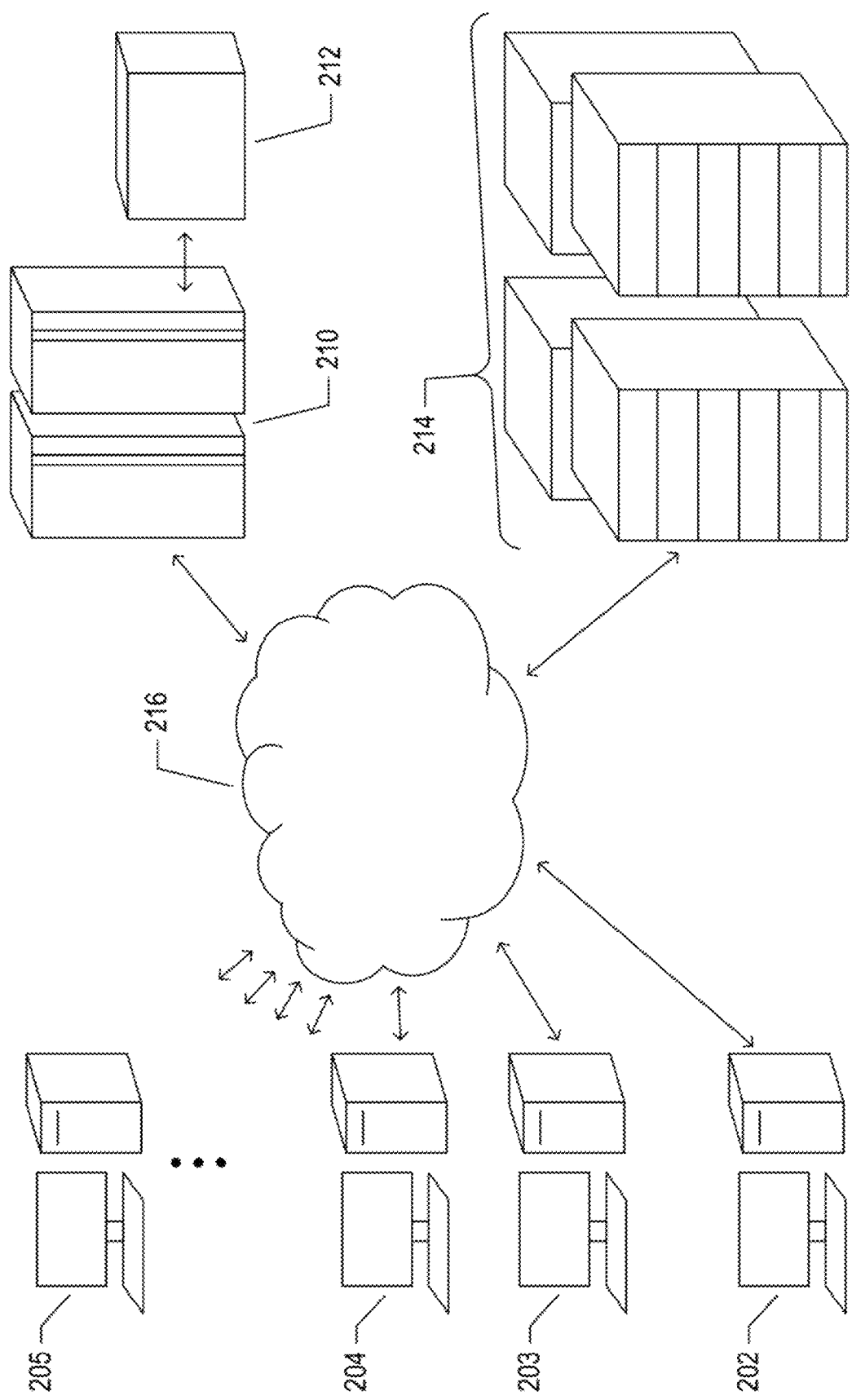
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
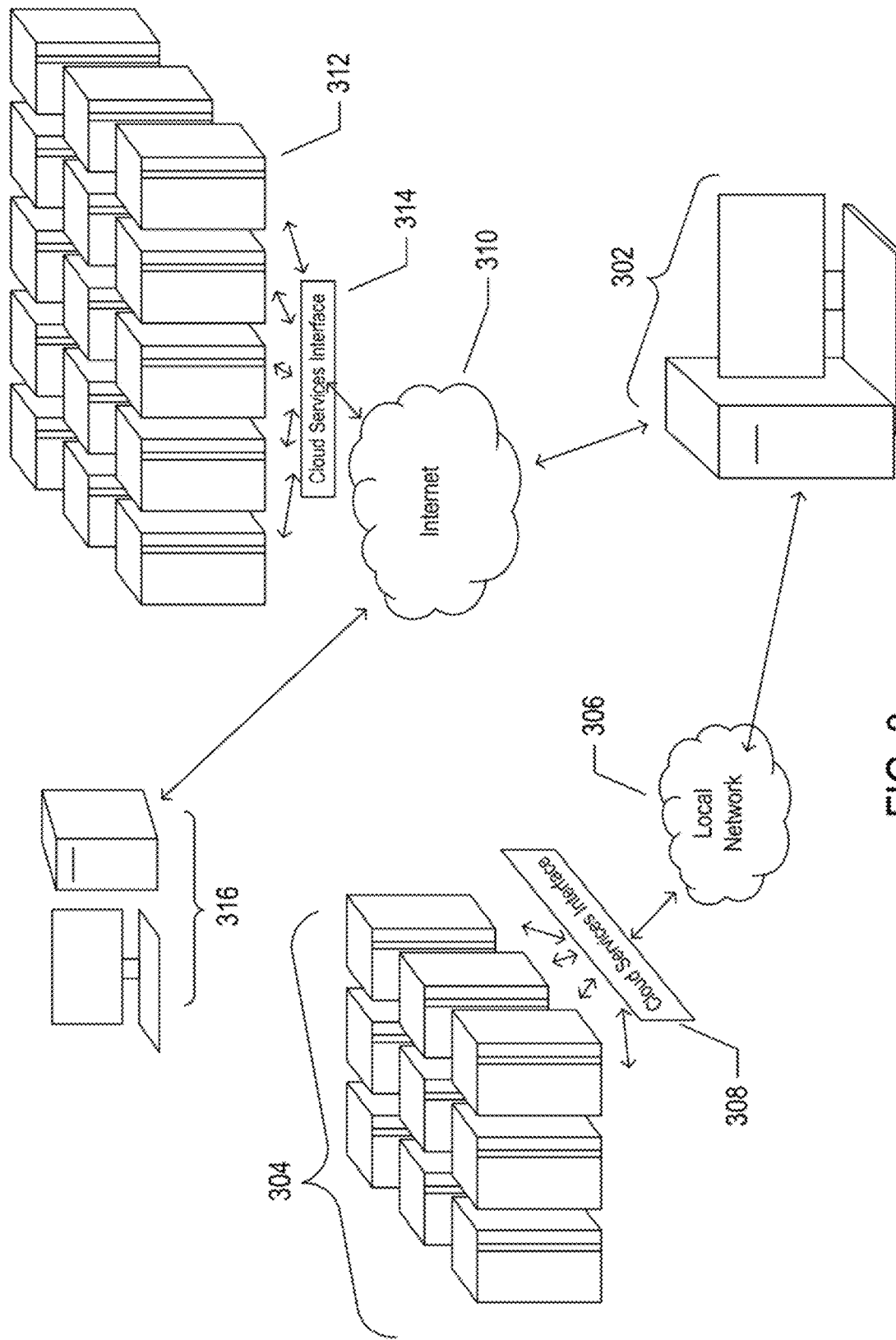
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
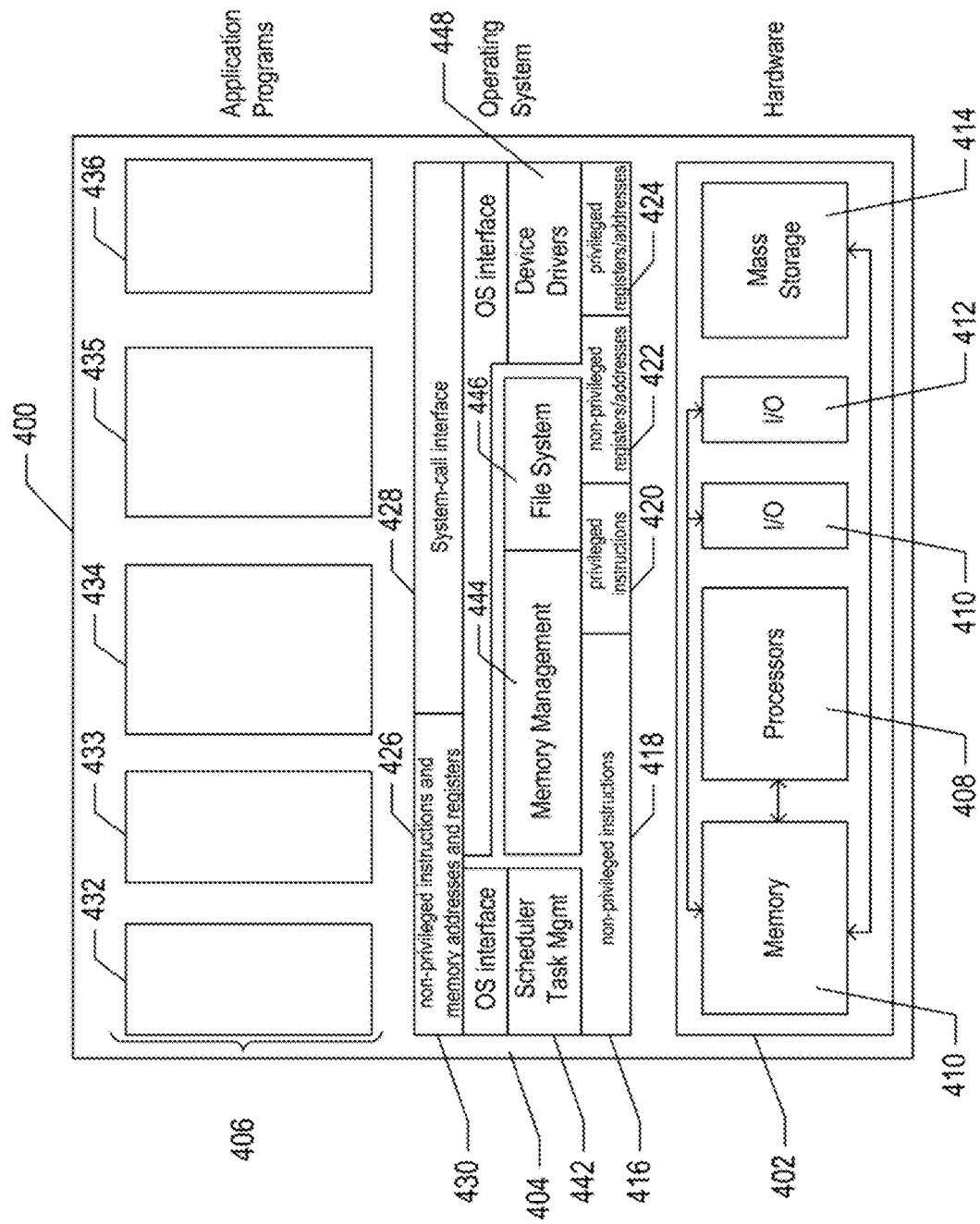
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
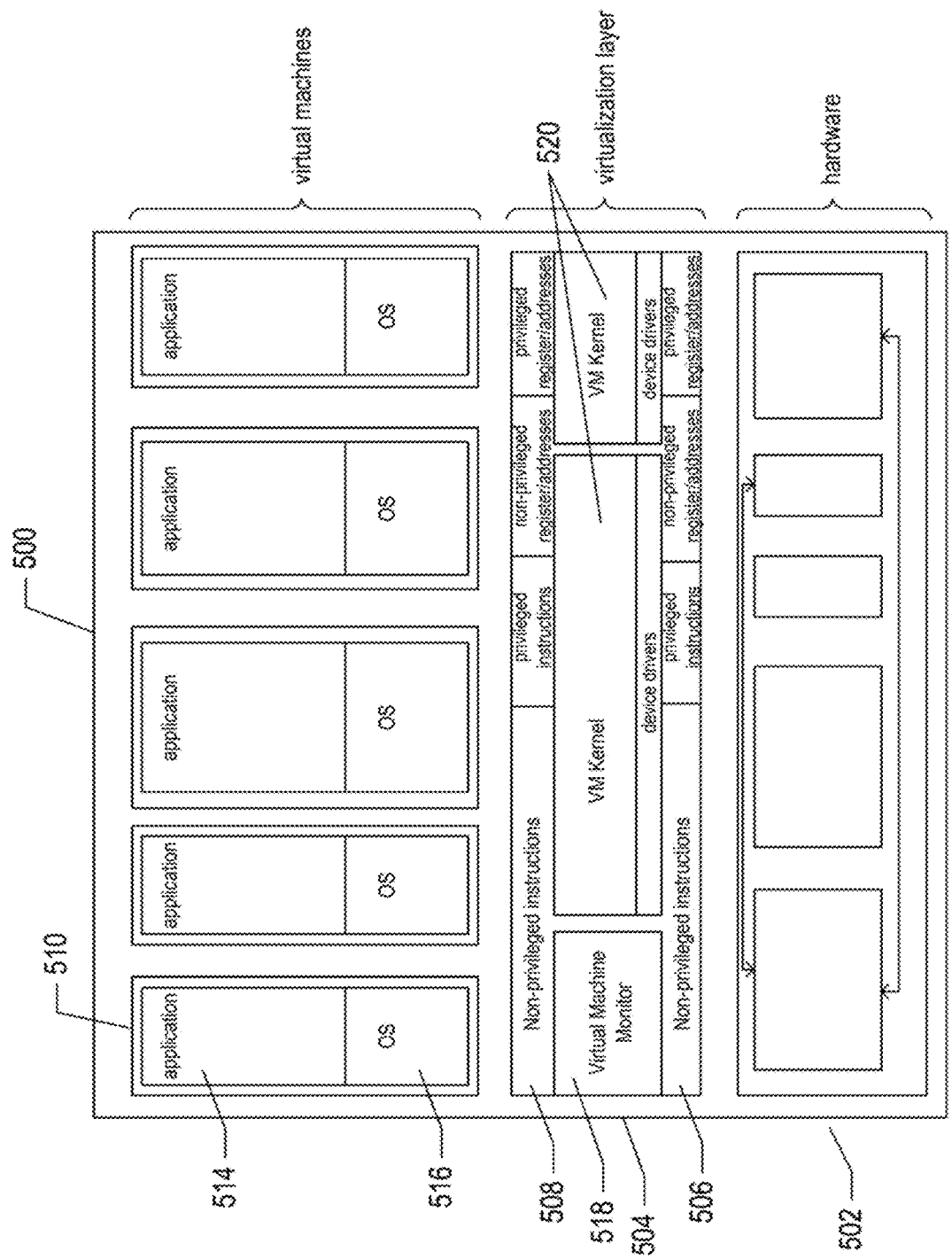

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system." such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
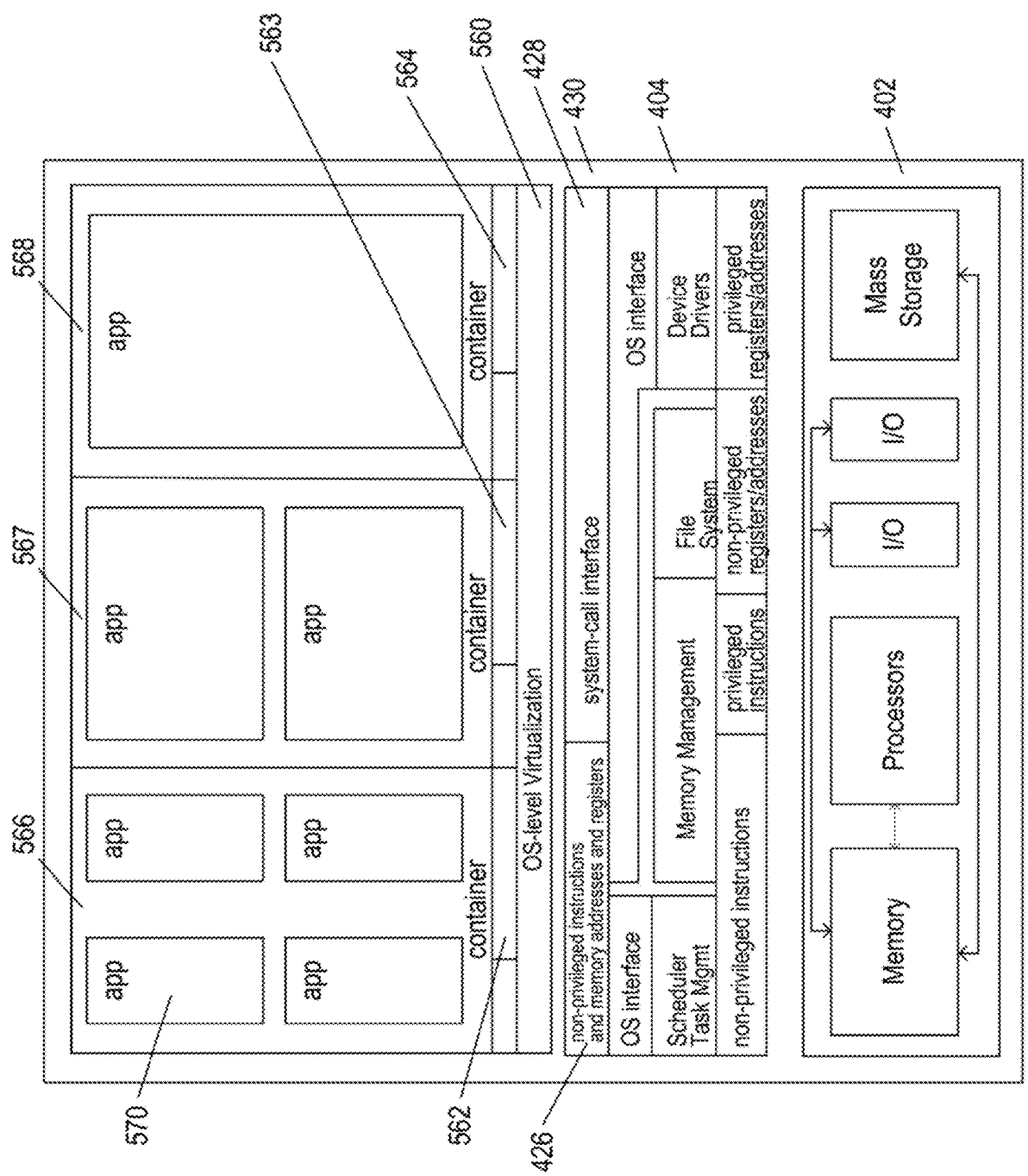

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
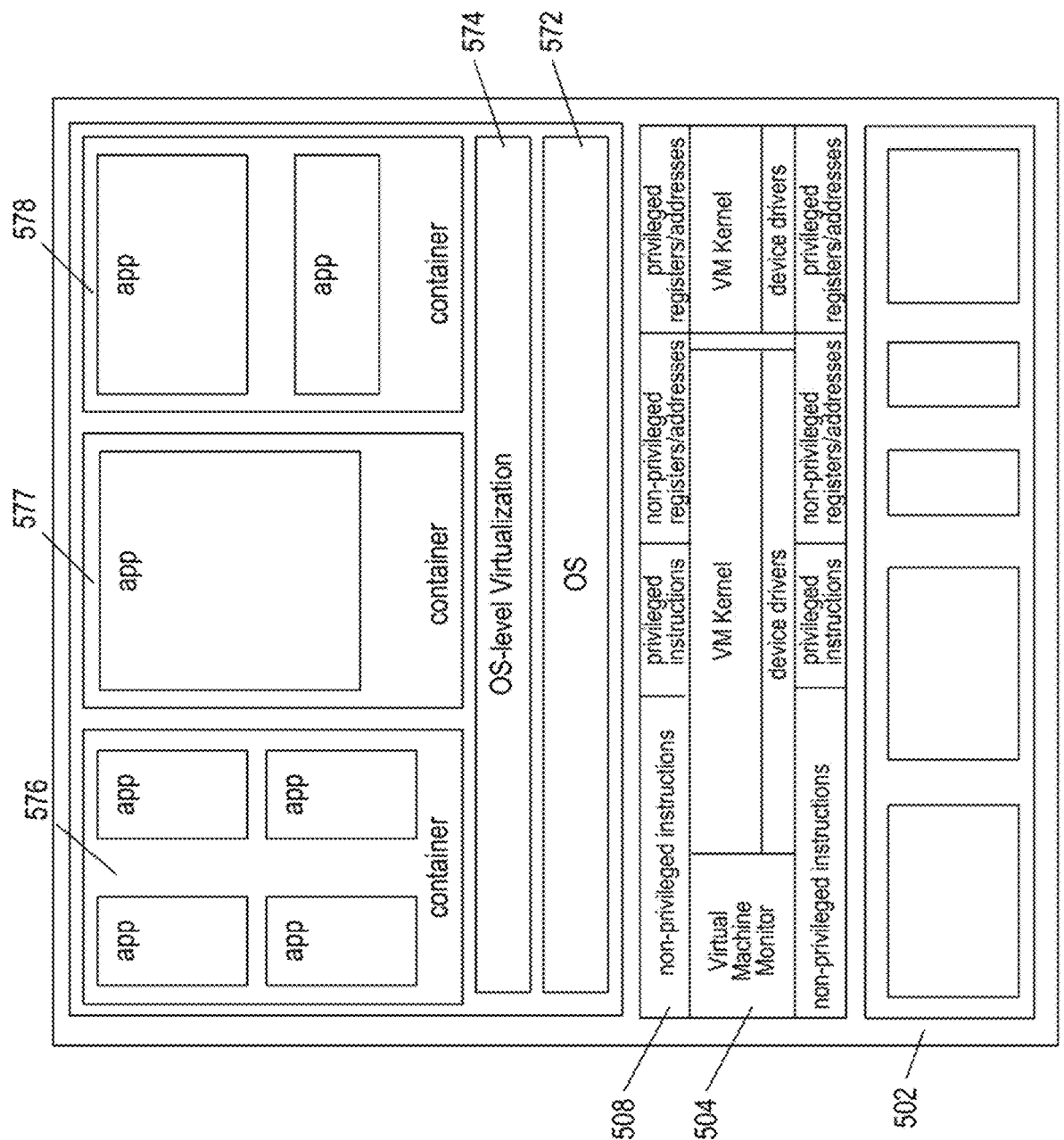

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
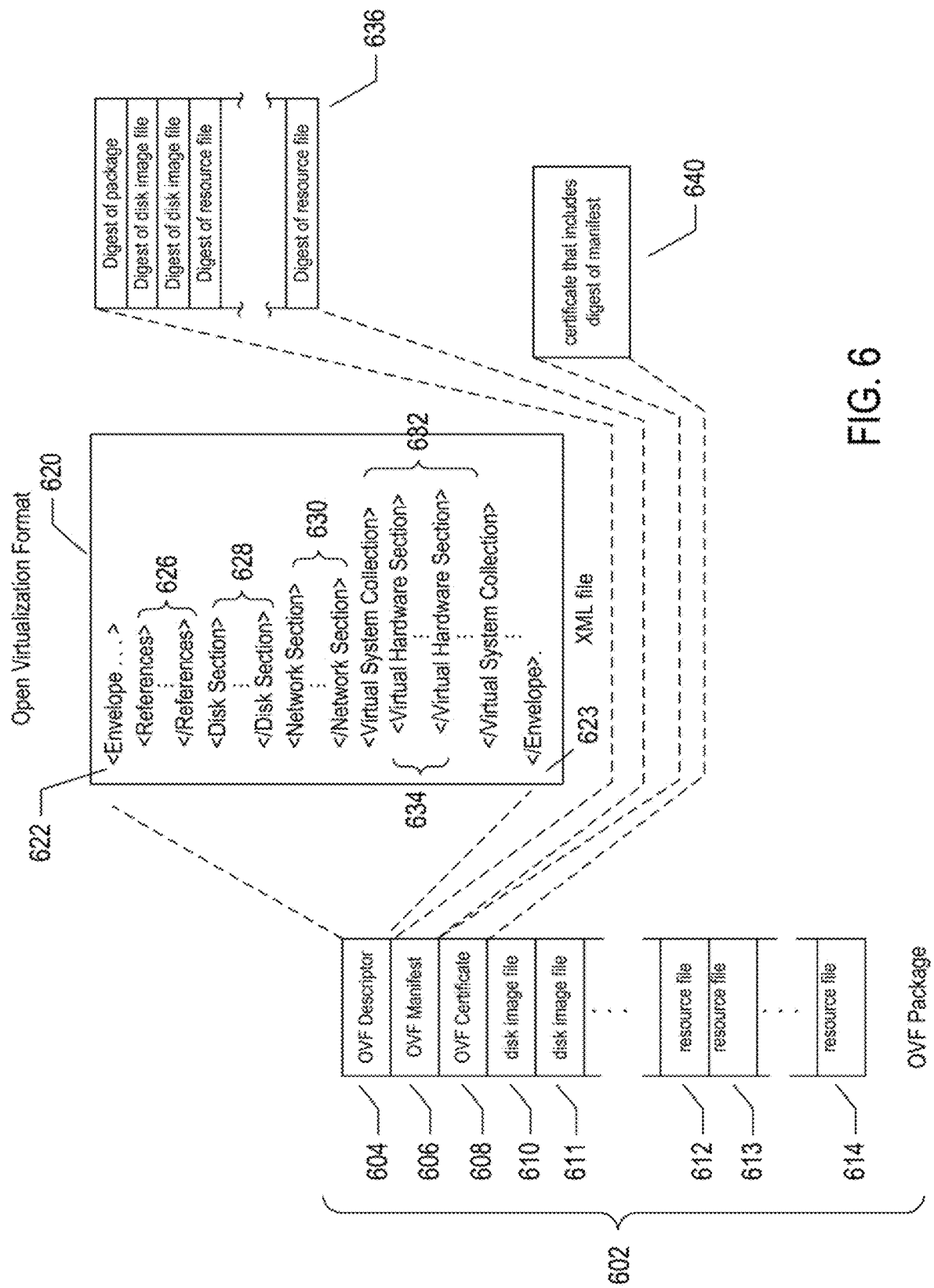
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
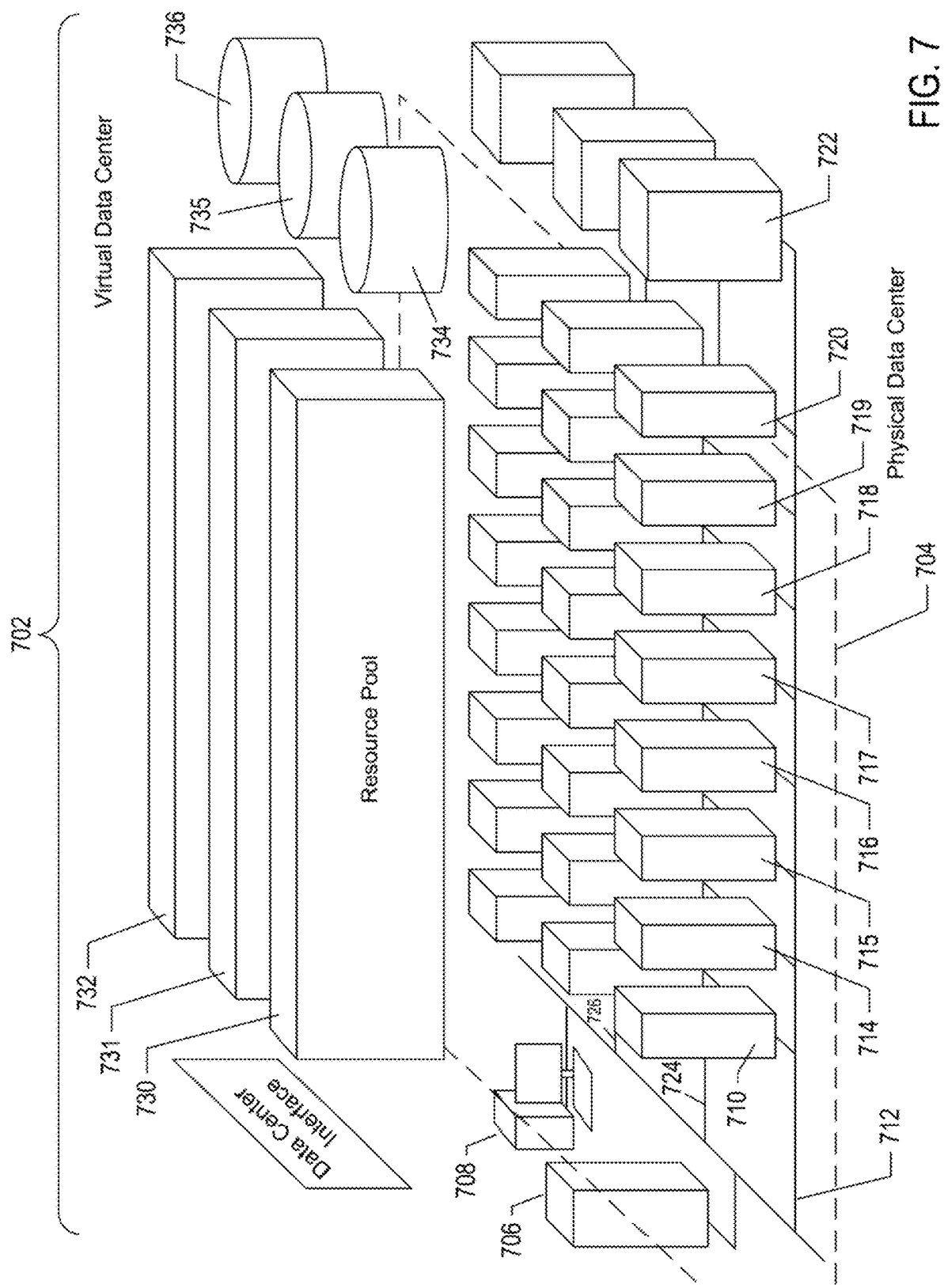
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
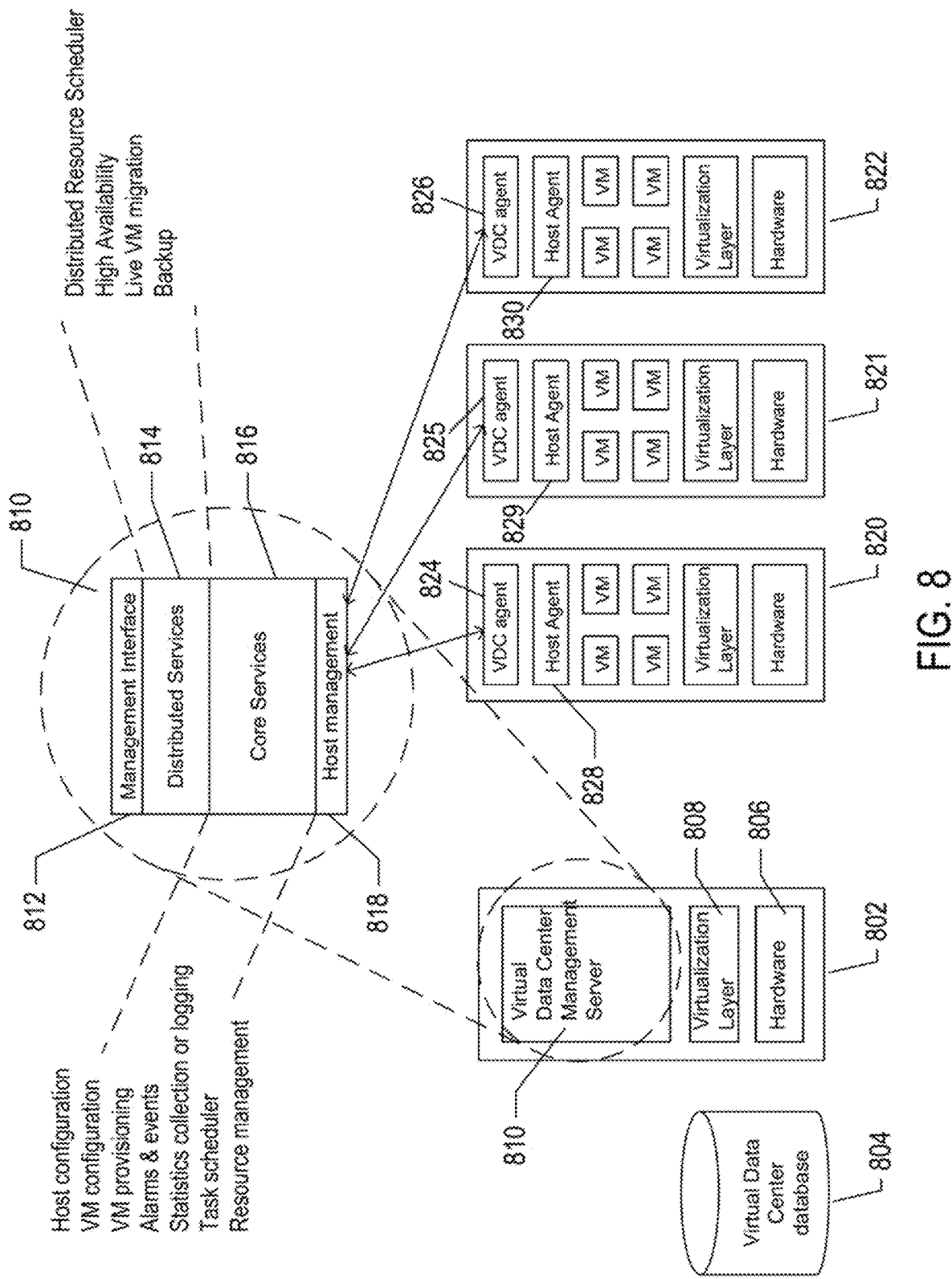
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
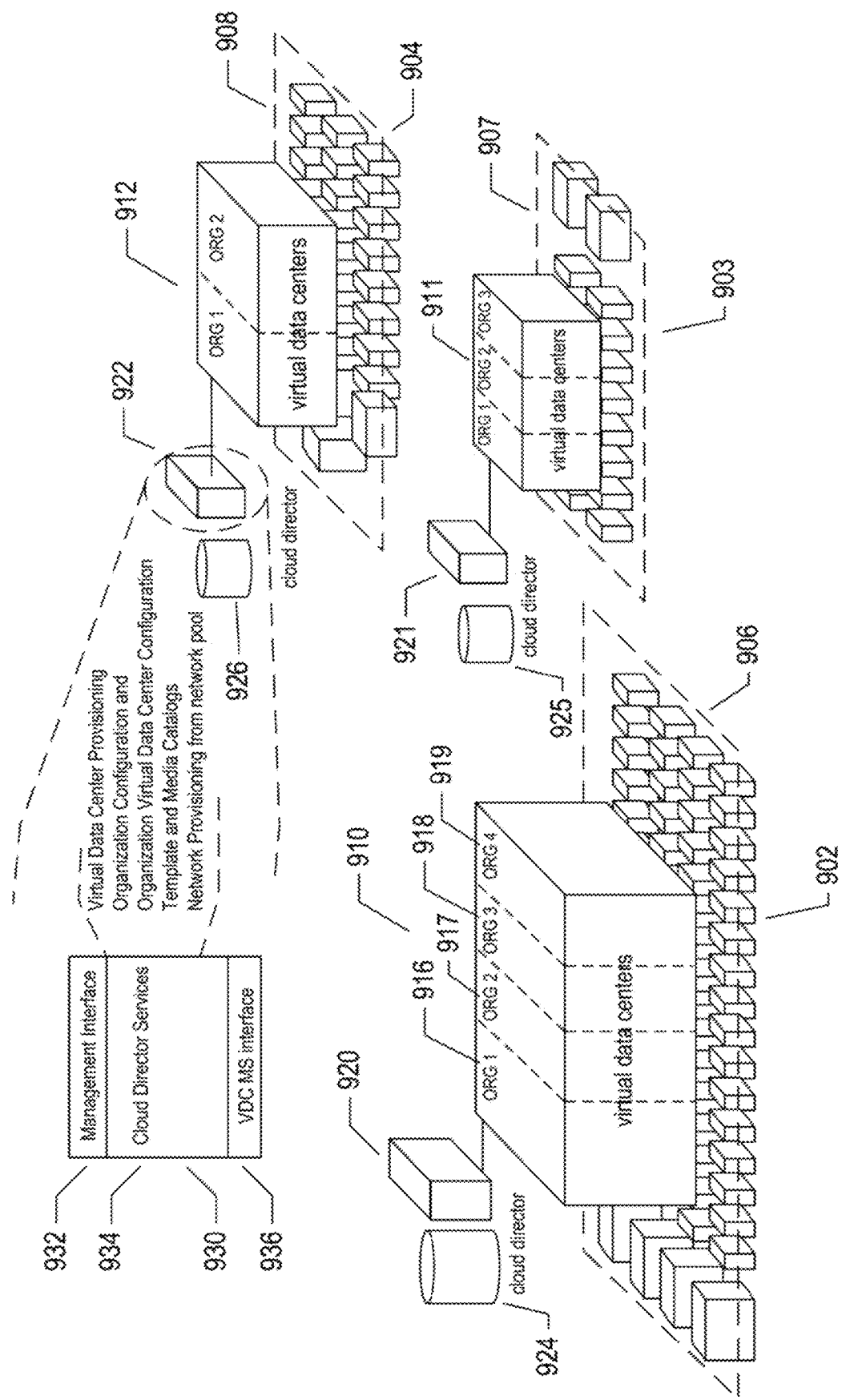
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
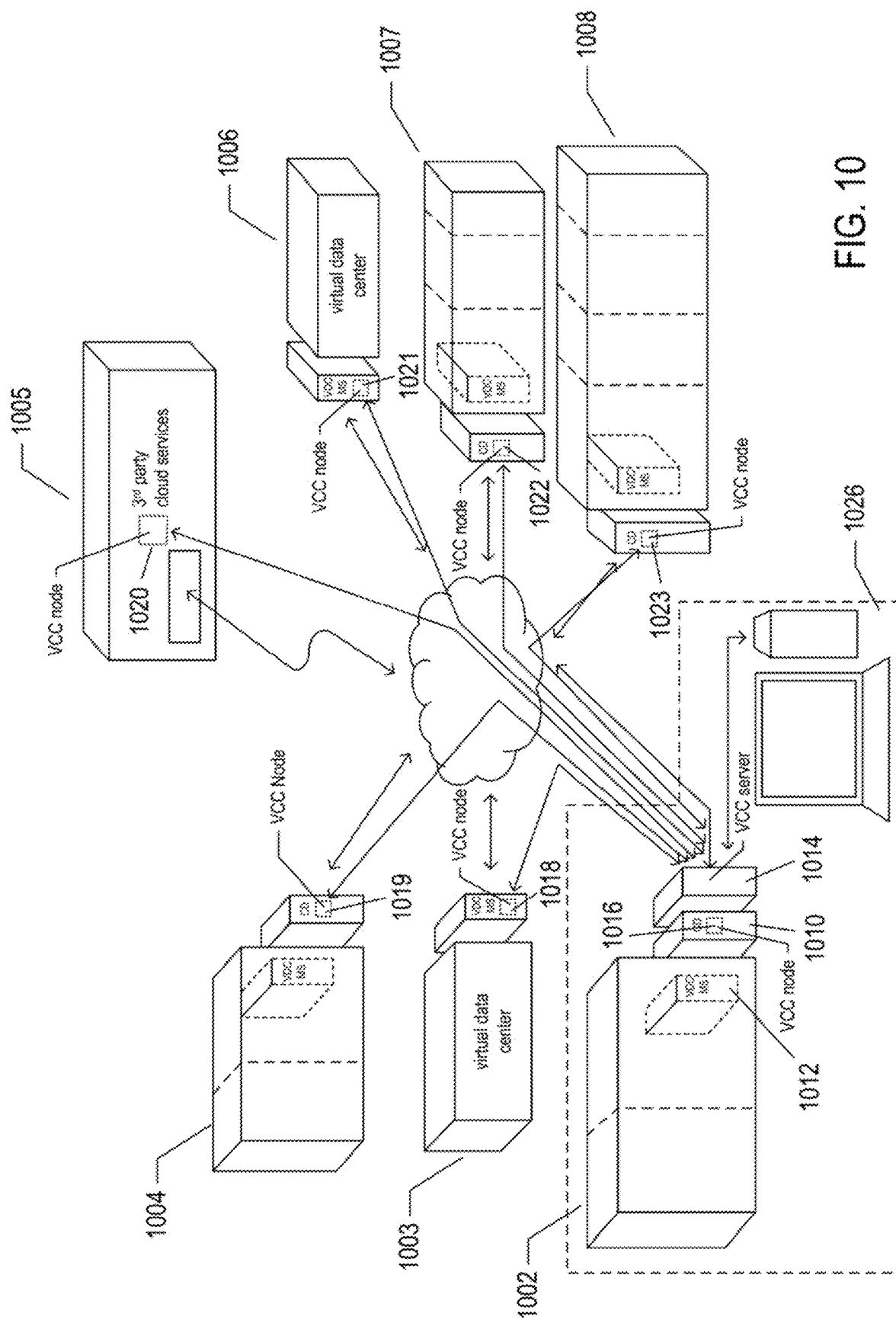
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Currently Disclosed Methods and Systems

Modern distributed computing systems feature a variety of different types of automated and semi-automated administration-and-management systems that monitor indications of operational behaviors of distributed-computing-system components, collect information regarding the operational behaviors of distributed-computing-system components, detect and collect indications of anomalous operational behaviors of distributed-computing-system components, and use the collected information to monitor and diagnose the operational states of the distributed computing systems in order to automatically undertake corrective and ameliorative actions to address potential, incipient and developing problems as well as to alert human system administrators of the potential, incipient, and developing problems. Log/event-message reporting, collecting, storing, and querying systems are fundamental components of administration and management subsystems.

The phrase "log/event message" refers to various types of generally short log messages and event messages issued by message-generation-and-reporting functionality incorporated within many hardware components, including network routers and bridges, network-attached storage devices, network-interface controllers, virtualization layers, operating systems, applications running within servers and other types of computer systems, and additional hardware devices incorporated within distributed computing systems. The log/event messages generally include both text and numeric values and represent various types of information, including notification of completed actions, errors, anomalous operating behaviors and conditions, various types of computational events, warnings, and other such information. The log/event messages are transmitted to message collectors, generally running within servers of local data centers, which forward collected log/event messages to message-ingestion-and-processing systems that collect and store log/event messages in message databases. Log/event-message query-processing systems provide, to administrators and managers of distributed computing systems, query-based access to log/event messages in message databases. The message-ingestion-and-processing systems may additionally provide a variety of different types of services, including automated generation of alerts, filtering, and other message-processing services.

Large modern distributed computing systems may generate enormous volumes of log/event messages, from tens of gigabytes ("GB") to terabytes ("TB") of log/event messages per day. Generation, transmission, and storage of such large volumes of data represent significant networking-bandwidth, processor-bandwidth, and data-storage overheads for distributed computing systems, significantly decreasing the available networking bandwidth, processor bandwidth, and data-storage capacity for supporting client applications and services. In addition, the enormous volumes of log/event messages generated, transmitted, and stored on a daily basis result in significant transmission and processing latencies, as a result of which greater than desired latencies in alert generation and processing of inquiries directed to stored log/event messages are often experienced by automated and semi-automated administration tools and services as well as by human administrators and managers. Thus, as with many areas in computing and electronics, there are trade-offs and careful balancing considerations in developing and using log/event-messages subsystems incorporated within distributed computing systems.

FIG. 11 shows a small, 11-entry portion of a log file from a distributed computer system. A log file may store log/event messages for archival purposes, in preparation for transmission and forwarding to processing systems, or for batch entry into a log/event-message database. In FIG. 11, each rectangular cell, such as rectangular cell 1102, of the portion of the log file 1104 represents a single stored log/event message. In general, log/event messages are relatively cryptic, including only one or two natural-language sentences or phrases as well as various types of file names, path names, network addresses, component identifiers, and, other alphanumeric parameters. For example, log entry 1102 includes a short natural-language phrase 1106, date 1108 and time 1110 parameters, as well as a numeric parameter 1112 which appears to identify a particular host computer.

Figure 12:
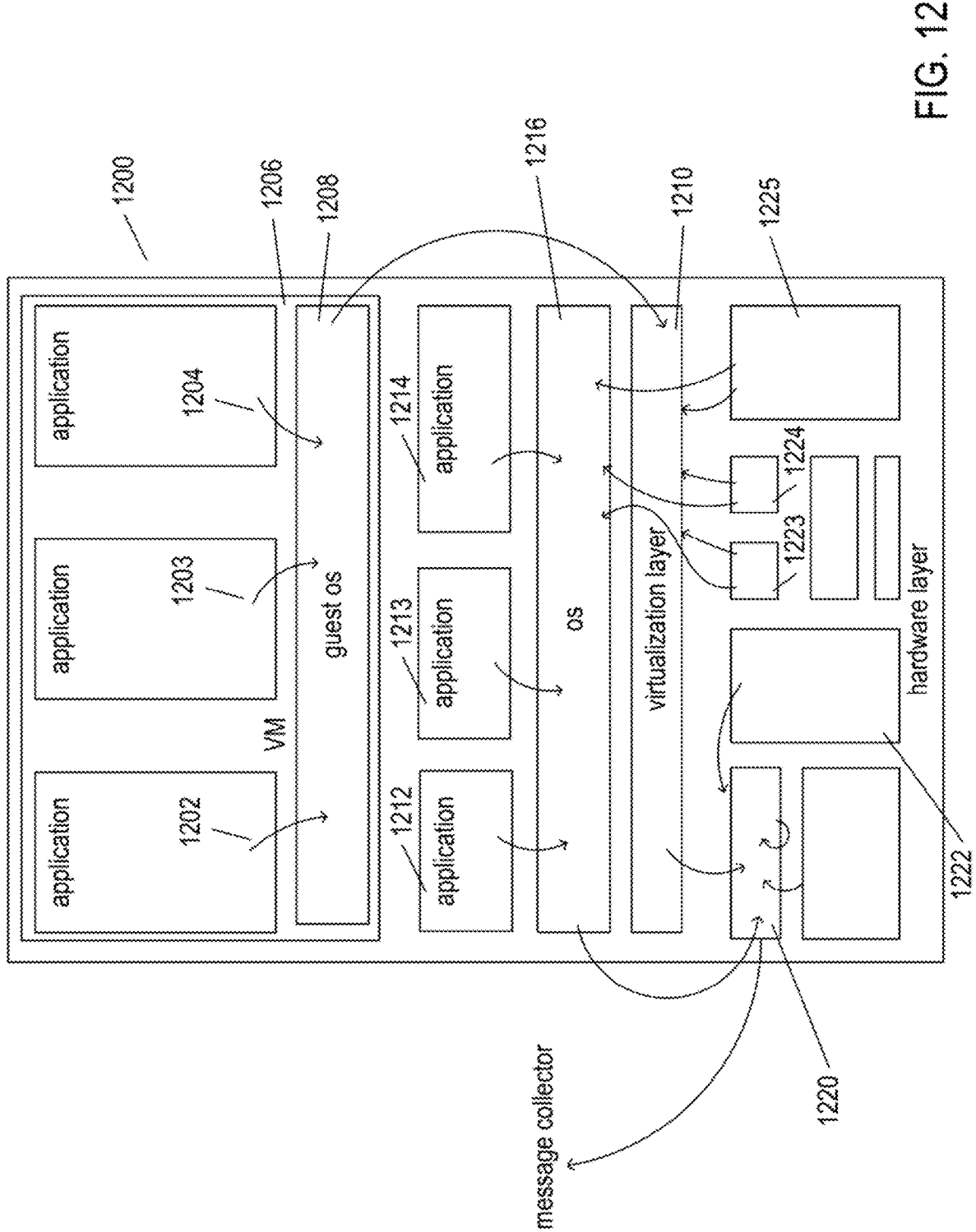
FIG. 12 illustrates generation of log/event messages within a server.

FIG. 12 illustrates generation of log/event messages within a server. A block diagram of a server 1200 is shown in FIG. 12. Log/event messages can be generated within application programs, as indicated by arrows 1202-1204. In this example, the log/event messages generated by applications running within an execution environment provided by a virtual machine 1206 are reported to a guest operating system 1208 running within the virtual machine. The application-generated log/event messages and log/event messages generated by the guest operating system are, in this example, reported to a virtualization layer 1210. Log/event messages may also be generated by applications 1212-1214 running in an execution environment provided by an operating system 1216 executing independently of a virtualization layer. Both the operating system 1216 and the virtualization layer 1210 may generate additional log/event messages and transmit those log/event messages along with log/event messages received from applications and the guest operating system through a network interface controller 1222 to a message collector. In addition, various hardware components and devices within the server 1222-1225 may generate and send log/event messages either to the operating system 1216 and/or virtualization layer 1210, or directly to the network interface controller 122 for transmission to the message collector. Thus, many different types of log/event messages may be generated and sent to a message collector from many different components of many different component levels within a server computer or other distributed-computer-system components, such as network-attached storage devices, networking devices, and other distributed-computer-system components.

Figure 13A:
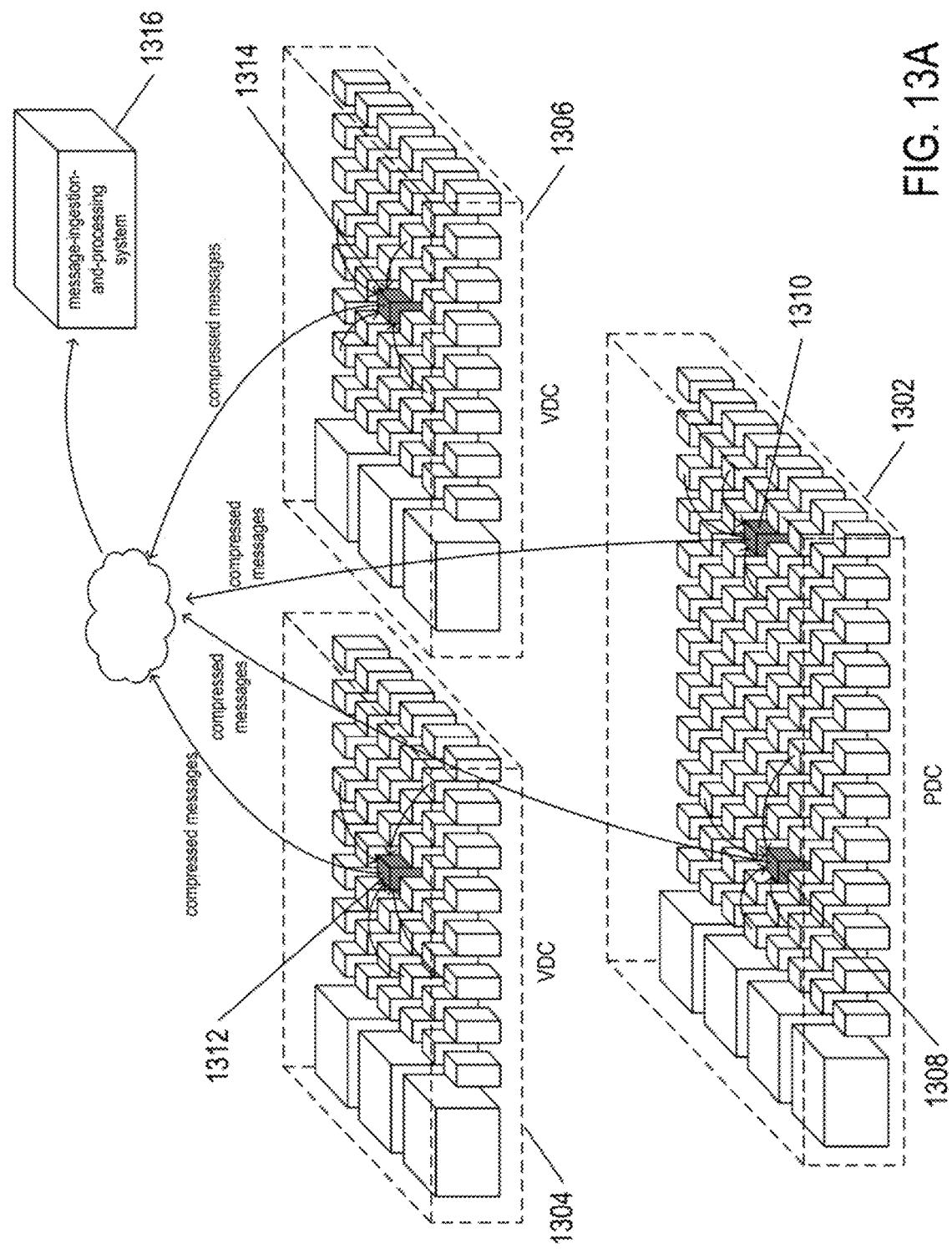
FIGS. 13A-B illustrate two different types of log/event-message collection and forwarding within distributed computer systems.
Figure 13B:
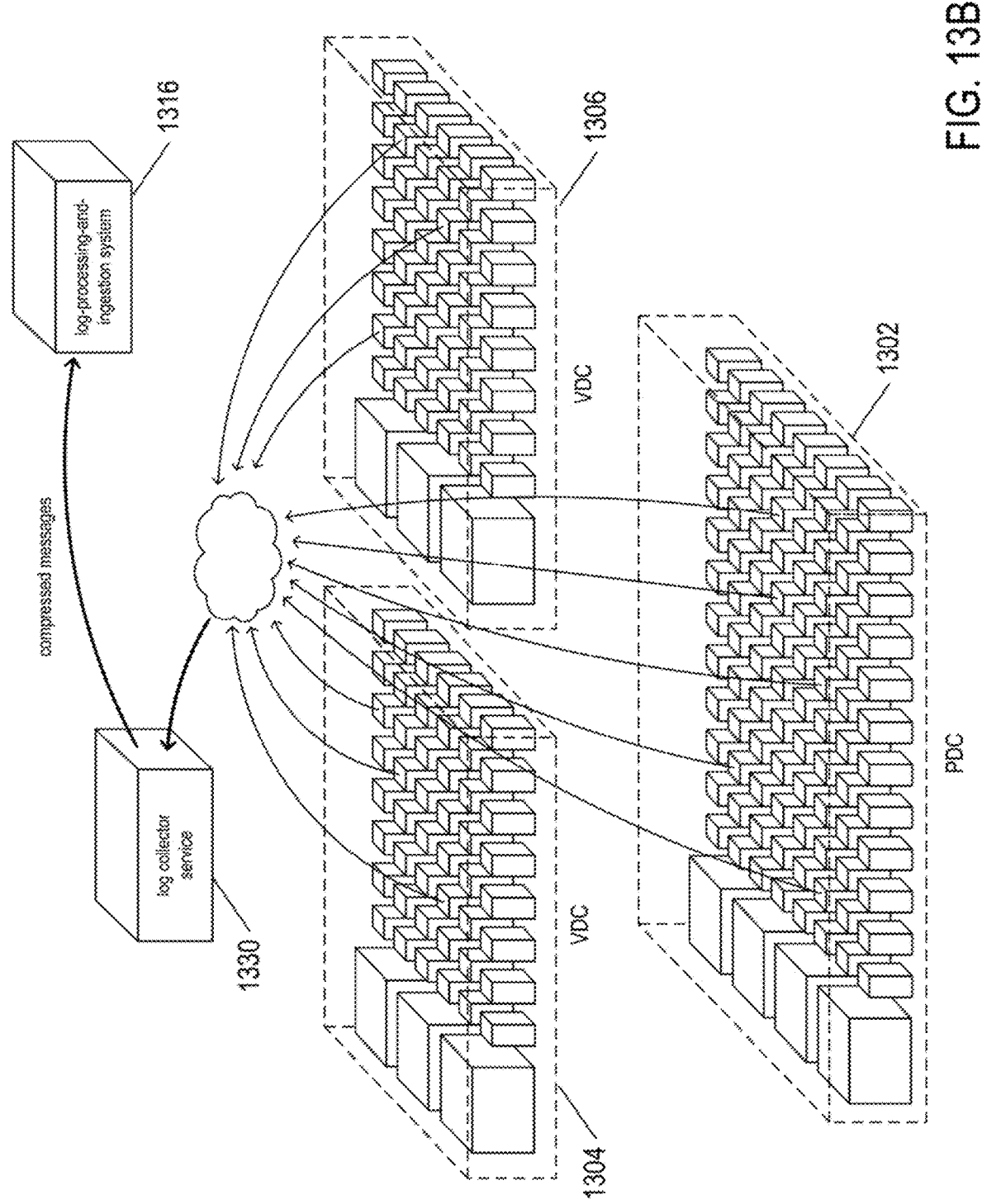

FIGS. 13A-B illustrate two different types of log/event-message collection and forwarding within distributed computer systems. FIG. 13A shows a distributed computing system comprising a physical data center 1302 above which two different virtual data centers 1304 and 1306 are implemented. The physical data center includes two message collectors running within two physical servers 1308 and 1310. Each virtual data center includes a message collector running within a virtual server 1312 and 1314. The message collectors compress batches of collected messages and forward the compressed messages to a message-processing-and-ingestion system 1316. In certain cases, each distributed computing facility owned and/or managed by a particular organization may include one or more message-processing-and-ingestion systems dedicated to collection and storage of log/event messages for the organization. In other cases, they message-processing-and-ingestion system may provide log/event-message collection and storage for multiple distributed computing facilities owned and managed by multiple different organizations. In this example, log/event messages may be produced and reported both from the physical data center as well as from the higher-level virtual data centers implemented above the physical data center. In alternative schemes, message collectors within a distributed computing system may collect log/event messages generated both at the physical and virtual levels.

FIG. 13B shows the same distributed computing system 1302, 1304, and 1306 shown in FIG. 13A. However, in the log/event-message reporting scheme illustrated in FIG. 13B, log/event messages are collected by a remote message-collector service 1330 which then forwards the collected log/event messages to the message-processing-and-ingestion system 1316.

FIG. 14 provides a block diagram of a generalized log/event-message system incorporated within one or more distributed computing systems. The message collectors 1402-1406 receive log/event messages from log/event-message sources, including hardware devices, operating systems, virtualization layers, guest operating systems, and applications, among other types of log/event-message sources. The message collectors generally accumulate a number of log/event messages, compress them using any of commonly available data-compression methods, encrypt the compressed messages, and send the encrypted and compressed batches of log/event messages to a message-ingestion-and-processing system 1408. The message-ingestion-and-processing system decrypts and decompresses received compressed and encrypted batches of messages, carry out any of various types of message processing, such as generating alerts for particular types of messages, filtering the messages, and normalizing the messages, prior to storing some or all of the messages in a message database 1410. A log/event-message query-processing system 1412 receives queries from distributed-computer-system administrators and managers, as well as from automated administration-and-management systems, and accesses the message database 1410 to retrieve stored log/event messages and/or information extracted from log/event messages specified by the receive queries for return to the distributed-computer-system administrators and managers and automated administration-and-management systems.

Figure 15A:
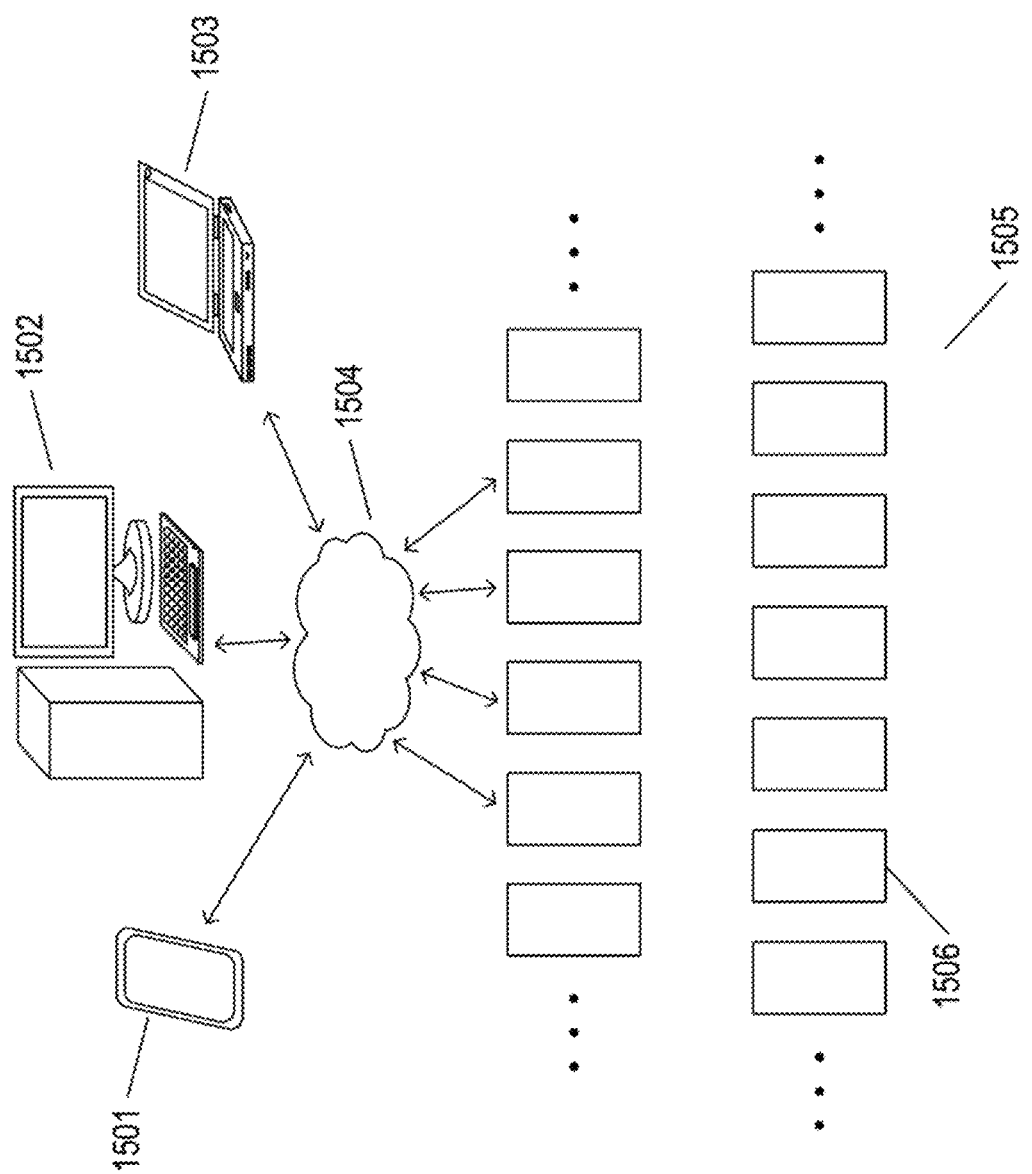
FIGS. 15A-J illustrate a problem domain addressed by the currently disclosed methods and subsystems.

FIGS. 15A-J illustrate a problem domain addressed by the currently disclosed methods and subsystems. FIG. 15A shows an initial view of a distributed application running within a distributed computer system accessed by external processor-controlled user devices. The external processor-controlled user devices 1501-1503 access the distributed application by calling distributed-application entrypoints via the Internet 1504 and a communication protocol, such as a Representational-State-Transfer ("REST") protocol. The distributed application runs within a distributed computer system 1505, such as the various different types of distributed computer systems discussed in the preceding subsection of this document. In general, the distributed computer system is known to contain multiple server computers, such as server computer 1506, but the distribution of distributed-application components within the distributed computer system is not known to the users or external processor-controlled user devices and may also not be known by the automated administration-and-management subsystem or subsystems within the distributed computer system.

Figure 15B:
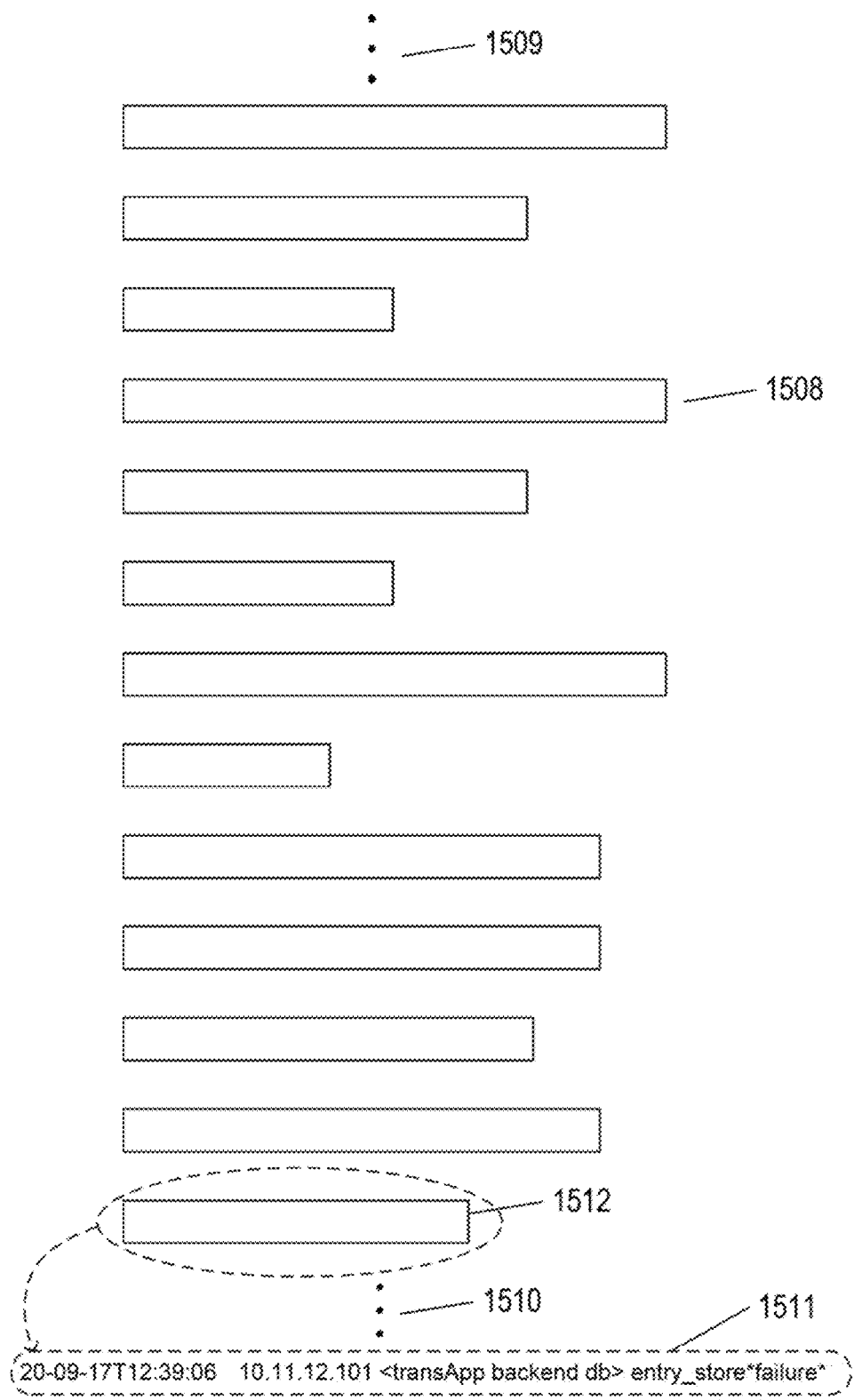

In order to administer and manage the distributed computer system, the automated administration-and-management subsystem or subsystems within the distributed computer system rely on collected log/event messages, discussed above. The various different log/event-message collection subsystems within distributed computer system collect and store log/event messages and provide access to the collected log/event messages, or to continuous streams of log/event messages, to the automated administration-and-management subsystem or subsystems, often through a query interface. The raw log/event messages, as shown in FIG. 15B, constitute a very large set of initially uninterpretable log/event messages. FIG. 15B shows a sequence of log/event messages, each represented by a horizontally oriented rectangle, such as rectangle 1508, with ellipses 1509-1510 used to indicate that the sequence may contain many additional log/event messages. As shown by inset 1511, which contains the character-string contents of log/event message 1512, the log/event messages are generally unstructured character strings that lack discernible meaning without some type of context and explanation. The sequence of log/event messages are ordered, but the ordering criteria are also initially unknown. The sequence of log/event messages may include log/event messages generated by various different applications and distributed applications, but may also include log/event messages generated by operating systems running within different servers and appliances within the distributed computing system, virtualization layers running within different servers within a distributed computing system, and even various types of controllers and hardware devices. The examples used in the discussion, below, involve log/event messages produced by components of a distributed application running within a distributed computer system. Therefore, the phrase "application transaction" is frequently used to indicate sequences of entrypoint calls within and among components of the distributed application. However, the same methods used to identify application transactions, discussed below, can also be used to identify transactions in operating systems, virtualization layers, and other computational entities, and even transactions within controllers and other hardware device. Thus, the phrase "application transaction" is used, in this document, not only for transactions within distributed applications, but more generally for transactions identified from log/event messages within other computational entities and devices.

Analysis of the contents of many log/event messages, by either fully automated methods or by using various types of additional information, including tabulated explanations of log/event-message contents, reveals that, as shown in FIG.

Figure 15C:
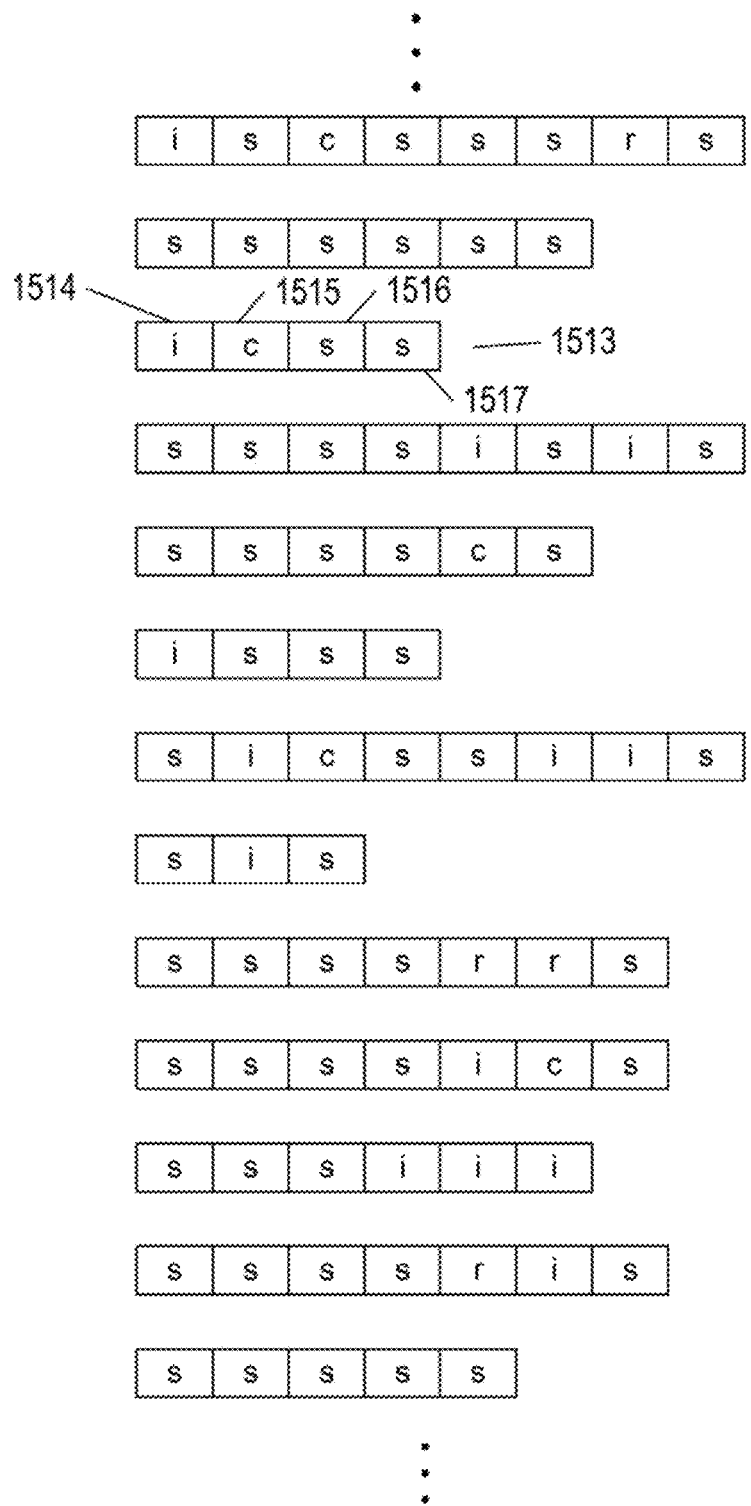
Figure 15D:
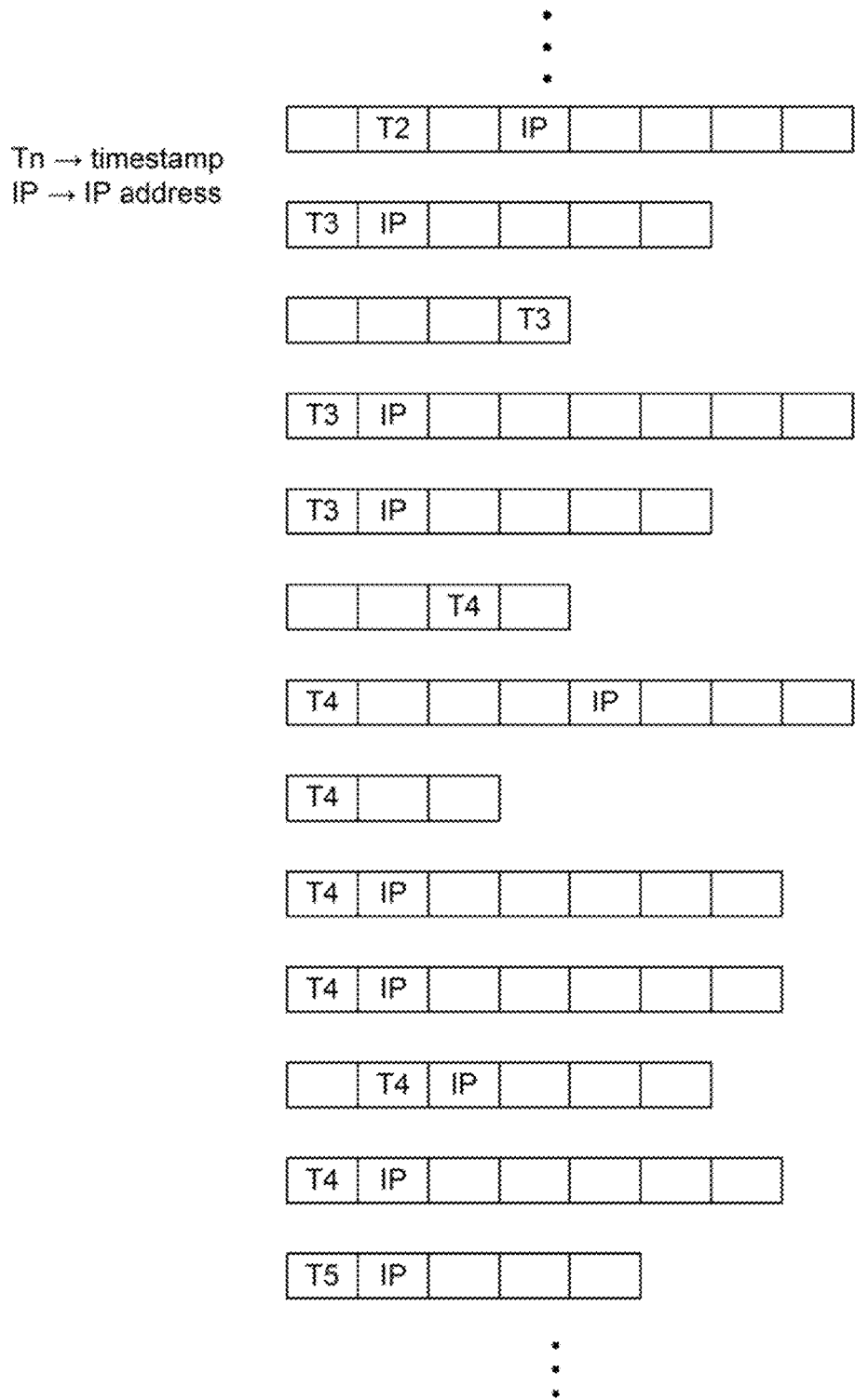

15C, the character-string contents of the log/event messages in the sequence of log/event messages can be logically partitioned into a sequence of one or more fields, with each field having a fundamental data type. In FIG. 15C, the lower-case letters "i," "s," "c," and "r" represent the fundamental data types integer, character string, character, and real or floating-point number, respectively. Thus, for example, log/event message 1513 includes a first integer field 1514, a second character field 1515, a third character-string field 1516, and a fourth character-string field 1517. Various different delimiters may be used to separate the fields within the character-string contents of a log/event message, including white-space characters, other special characters such as "*," "/," and "\," and pairs of special characters, such as "[" and "]," "<" and ">," and other such special-character pairs. Automated log/event-message processing methods, examples of which are discussed below, can be employed to partition the character-string contents of log/event messages into fields, as shown in FIG. 15C. As shown in FIG. 15D, automated log/event-message processing methods can also determine more specific data types for certain fields within log/event messages. For example, certain formatted alphanumeric character strings may correspond to timestamps and Internet protocol ("IP") addresses. Thus, in FIG. 15D, the character-string fields corresponding to timestamps are indicated using the upper-case letter "T" paired with a numeral and the character-string fields corresponding to IP addresses are indicated by the symbols "IP."

Given a log/event-message convention that each log/event message includes a timestamp, once the timestamps within a collection of log/event messages have been recognized, the sequence of log/event messages can be ordered with respect to the timestamps included in the log/event messages. Of course, the ultimate meaning of this time ordering depends on how the timestamp values are actually generated within the distributed computing system. If the timestamps are included in a log/event messages as the log/event messages are generated by distributed-application components, the time ordering obtained by ordering the log/event messages by timestamp values may roughly correspond to a sequencing of the log/event messages by generation time. However, this would depend on the various different distributed-computing-system components being able to determine an exact, common time value, and this is often not possible. Nonetheless, the log/event messages are ordered by timestamp values in the example implementation, discussed below.

Figure 15E:
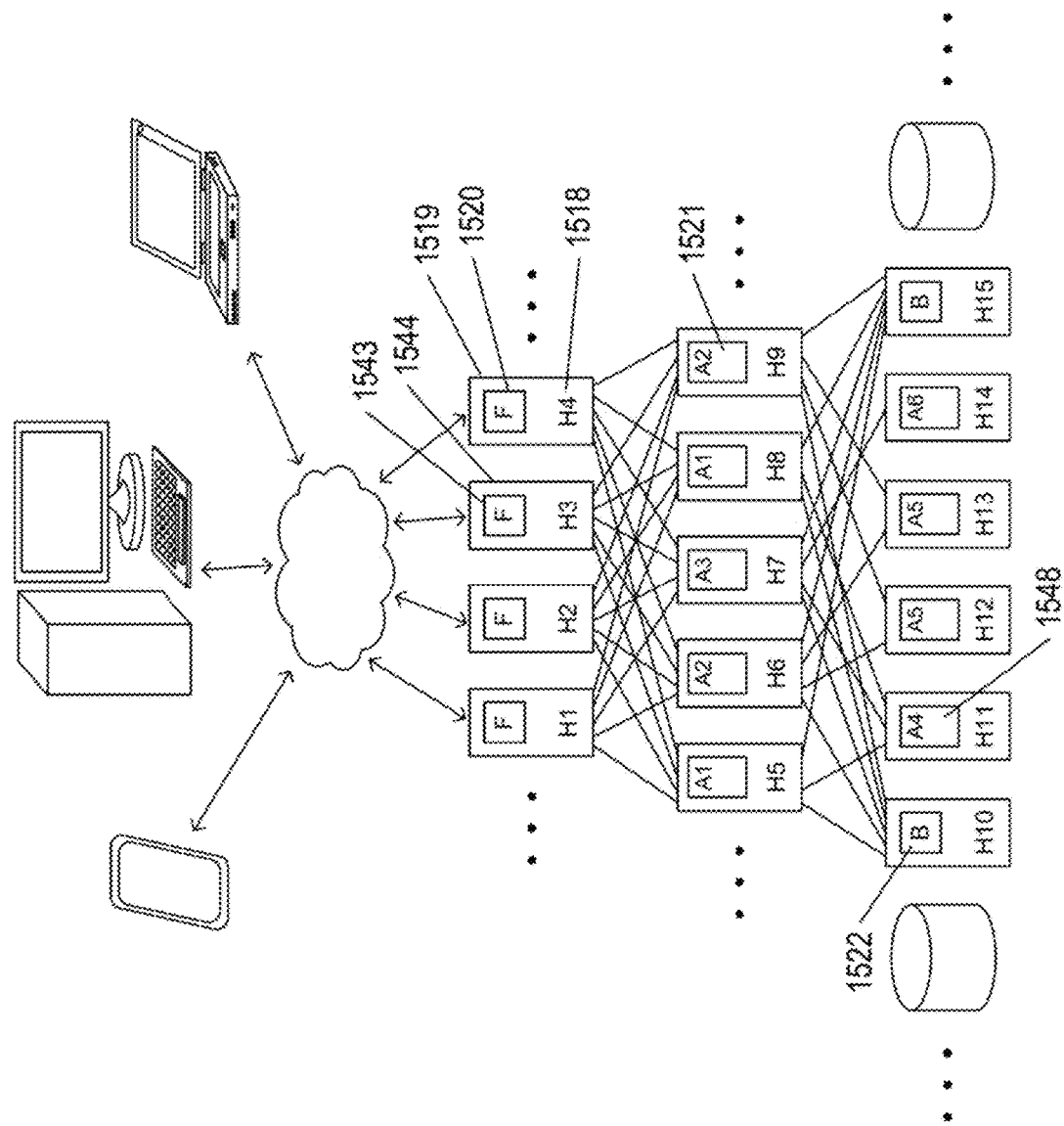
Figure 15F:
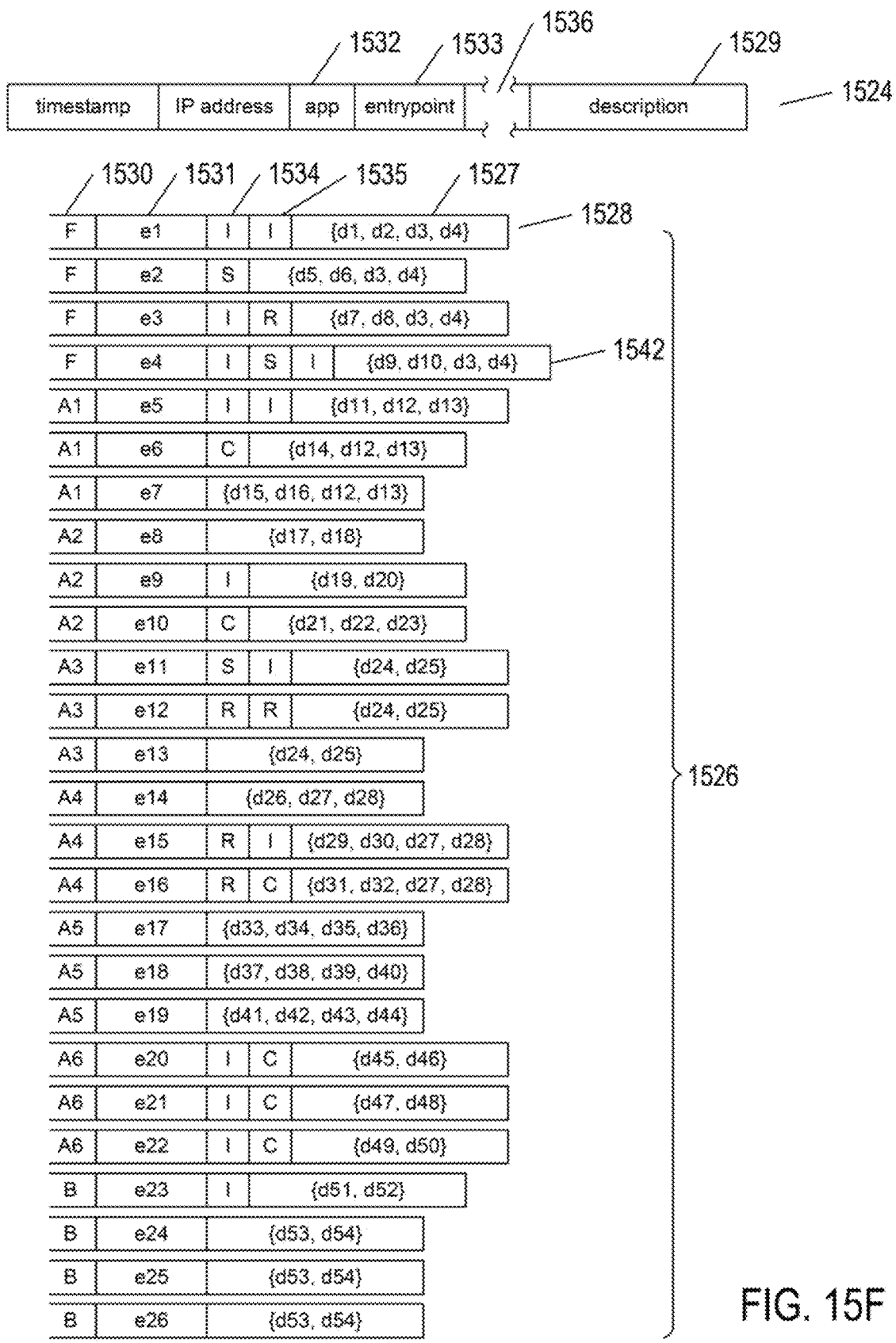

While identifying fields and certain more specific field types is a reasonable initial step in interpreting collections and/or streams of log/event messages, this step, alone, does not provide sufficient information for monitoring and detection of distributed-computer-system operational behaviors by an automated-administration-and-management subsystem. Additional information is needed to achieve useful levels of information extraction. FIGS. 15E-F illustrate additional information needed to attempt to understand the information content of the sequence of log/event messages shown in FIG. 15D. As shown in FIG. 15E, various methods may be used by an automated administration-and-management system to determine the topology of a distributed computing system and of one or more distributed applications running within a distributed computing system. In FIG. 15E, this information includes the identities and communications interconnections of at least some of the various servers and appliances within the distributed computer system as well as the locations of executing distributed-application components within these servers. The identities of the servers are represented by an upper-case "H" followed by a numeral, such as the identity "H4" 1518 of server 1519. The server identities can be mapped to one or more IP addresses corresponding to the server, in the simple example illustrated in FIGS. 15A-J. However, such mappings are non-trivial in real-world distributed computer systems. Distributed-application components executing within servers are represented by smaller rectangles, such as rectangle 1520 within server 1519. An upper-case letter or an upper-case letter followed by a numeral is used to indicate the type of distributed-application component. For example, distributed-application component 1520 is labeled with the upper-case letter "F" to indicate that it is a front-end-server component of the distributed application. Various other distributed-application components, such as a distributed-application component 1521, have labels beginning with the character "A" and additionally including one of the numerals "1," "2," and "3." These are mid-level distributed-application components. Several distributed-application components, such as distributed-application component 1522, have labels "B." indicating a backend-database-server distributed-application component. All of these above-mentioned distributed-application components are components of a single distributed application in the example of FIGS. 15 A-J. Additional labeled components with labels beginning with the character "A" and including one of the numerals "4," "5," and "6" correspond to either additional components of the distributed application or to external service applications called by the distributed application. While FIG. 15E shows a portion of the hardware and application-component topology of the distributed computer system relevant to the single distributed application, a more complete topology, not shown in FIG. 15E, may be available for the entire distributed computer system, including all of the hardware components as well as all of the various different distributed applications and non-distributed applications running within the distributed computer system.

FIG. 15 F shows yet more additional information that can be used to interpret the contents of the sequence of log/event messages shown in FIG. 15D. Additional information includes an indication 1524 of the fields common to all of the log/event messages generated by the distributed application, components of which are identified in FIG. 15E, and indications of the specific different log/event-message formats generated by each of the various different components of the distributed application 1526. In each of these specific formats, the final field, such as the final field 1527 in specific format indication 1528, corresponds to the description field 1529 in the indication 1524 of the fields common to all of the log/event messages generated by the distributed application. The first two fields in the specific formats, such as fields 1530-1531 in specific-format indication 1528, correspond to the application-component field 1532 and the entrypoint field 1533 in the indication 1524 of the fields common to all of the log/event messages generated by the distributed application. The remaining fields in each of the specific formats, such as fields 1534 and 1535 in specific-format indication 1528, correspond to the portion of the common-fields indication 1524 delimited by broken lines 1536.

Figure 15G:
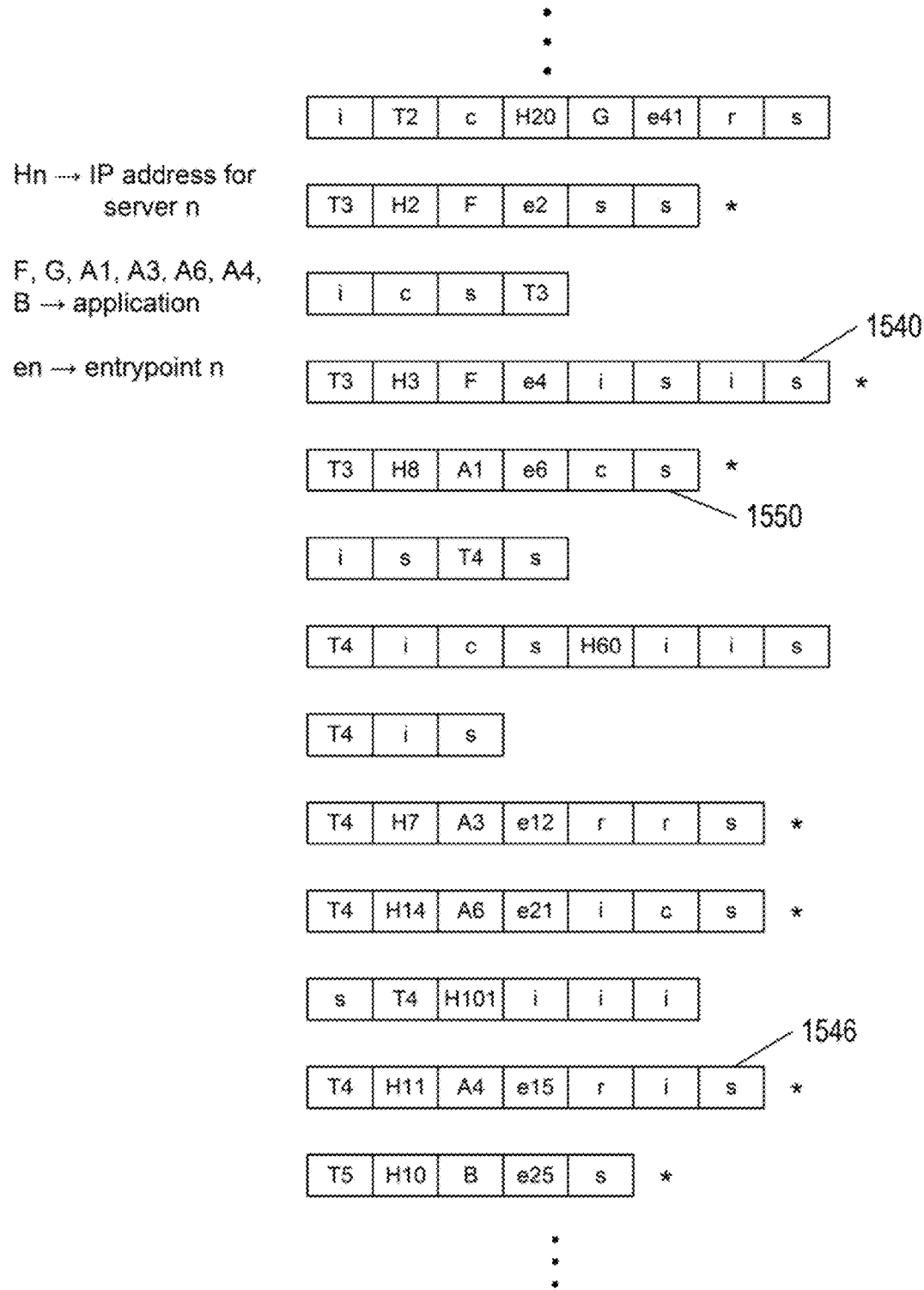

As shown in FIG. 15G, the information contained in FIGS. 15E-F, discussed above, allows for interpretation of those log/event messages contained in the sequence of log/event messages shown in FIG. 15C generated by components of the distributed application. The log/event messages generated by components of the distributed application are annotated with the symbol "*" in FIG. 15i. Thus, for example, log/event message 1540 in FIG. 15G corresponds to the specific format indicated by specific-format indication 1542 in FIG. 15F and was generated by distributed-application component 1543 within server 1544 in FIG. 15E. However, the remaining log/event messages not annotated with "*" symbols in FIG. 15G cannot be fully interpreted since they were generated by computational entities other than components of the distributed application, for which one or both of the component topologies and log/event-message formats remain unknown.

It might seem that, given the log/event-message interpretations for the distributed application shown in FIG. 15G, an automated administration-and-management subsystem would at least have sufficient information, from the collected log/event messages, to understand the state of the distributed application and to recognize incipient problems based on error codes and other additional information contained in the fields of specific log/event messages generated by the various distributed-application components. Unfortunately, that is not the case. Given the interpretations shown in FIG. 15G for the log/event messages generated by the distributed application, there is no way for an automated administration-and-management subsystem to understand the interrelationships between the various different distributed-application-generated log/event messages. For example, consider the case where an error code first appears in log/event message 1546 in FIG. 15G. This log/event message was generated by distributed-application component or service application 1548, shown in FIG. 15E. But, component 1548 is called by four higher-level distributed-application components labeled "A1" or "A2." Was log/event message 1546 generated by the distributed-application component that generated log/event message 1550? There is no way to know. Perhaps there are preceding log/event messages, not shown in FIG. 15G, from other of the distributed-application components that call component 1548. Or, perhaps the distributed-application component that called component 1548 generates a log/event message only after first calling component 1548, in which case the related log/event message would follow log/event message 1546 in the sequence of log/event messages. In fact, the interpretations of the log/event messages shown in FIG. 15G are insufficient for most types of automated-administration-and-management-subsystem analyses and operations. The administration-and-and management subsystem needs higher-level information in order to identify sequences of distributed-application events that may be indicative of various types of distributed-application state changes, problems, and incipient problems in order to monitor the operational behavior of the distributed application and make timely interventions to prevent serious distributed-computing-system operational anomalies.

Figure 15H:
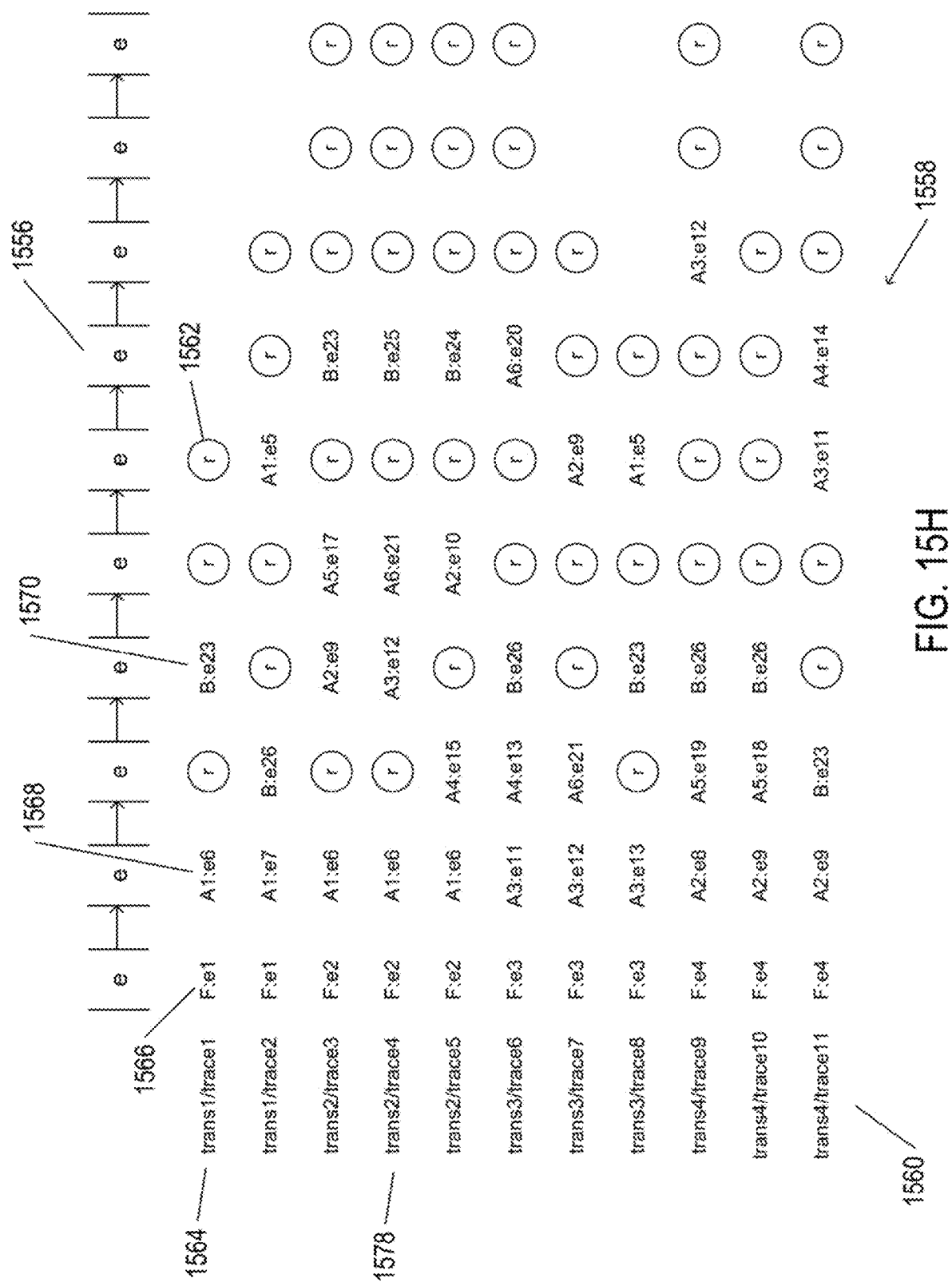

FIG. 15H illustrates additional information needed by an automated-administration-and-management subsystem to be able to extract sufficient information from collections of log/event messages to accurately monitor the operational behavior of a distributed application and to detect incipient problems sufficiently in advance of much more serious problems that can result from failing to anticipate the incipient problems and take corrective actions. Log/event messages are not randomly generated by a distributed application. Instead, they are generally sequentially generated, in particular patterns, as a distributed application executes calls to entrypoints of the application-programming interface ("API") associated with the distributed-application. Each different sequence of log/event-message types generated during execution of an application entrypoint is referred to as a "trace," which corresponds to an underlying sequence of internal calls within and between distributed-application components and additional service applications and other external entities. The underlying sequence of internal calls is referred to as an "application transaction." Thus, any particular application entrypoint may be associated with one or more different application transactions, and each application transaction is associated with a particular set of traces in a collections and/or stream of log/event messages. Similarly, even within a single non-distributed application, there are generally many different transactions, corresponding to the API entrypoints of the non-distributed application, consisting of internal calls between routines and modules of the non-distributed application, and each of these different transactions is generally associated with a set of traces in the log/event messages collected during operation of the non-distributed application. Even operating systems and virtualization layers may be associated with transactions and traces.

Figure 15I:
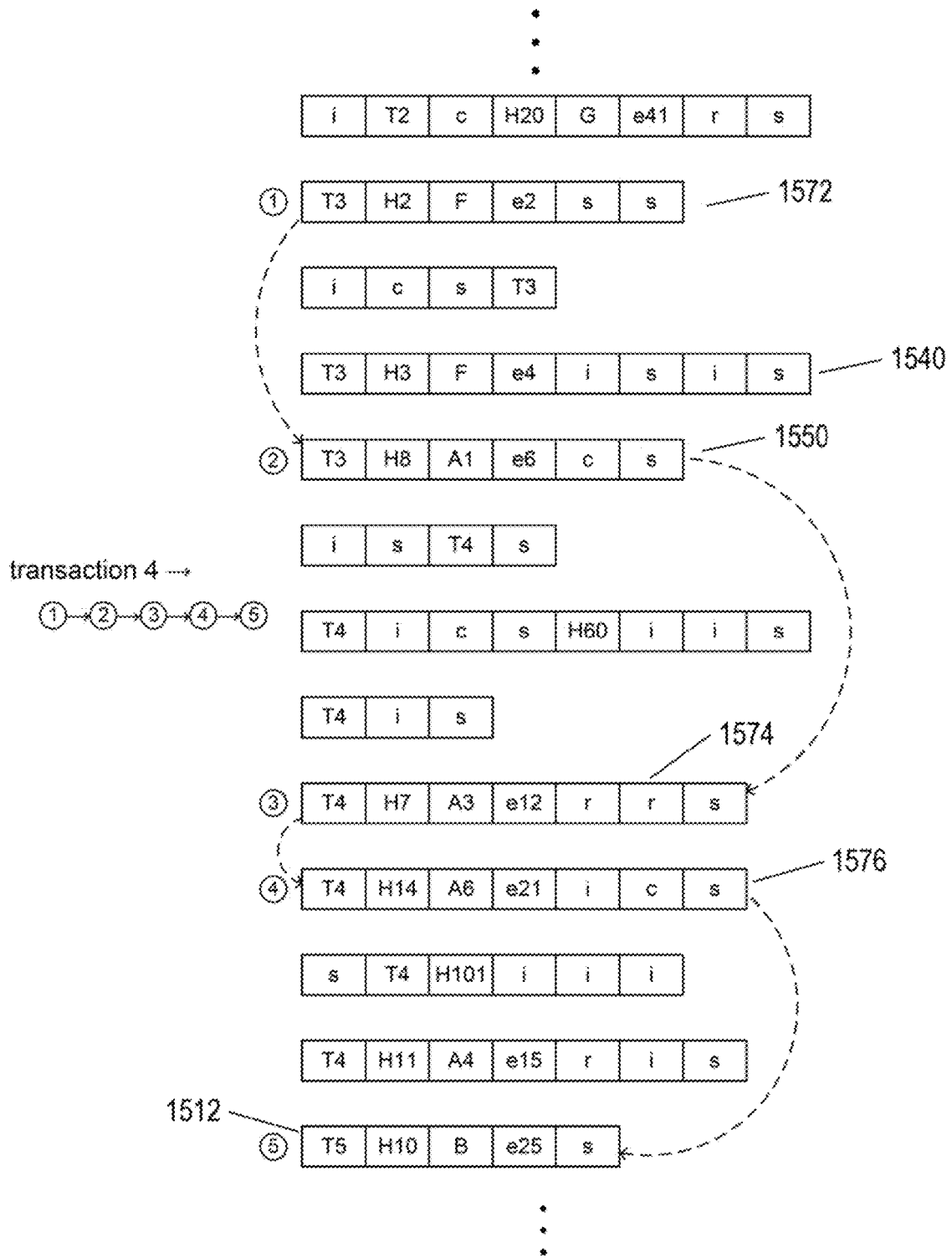
Figure 15J:
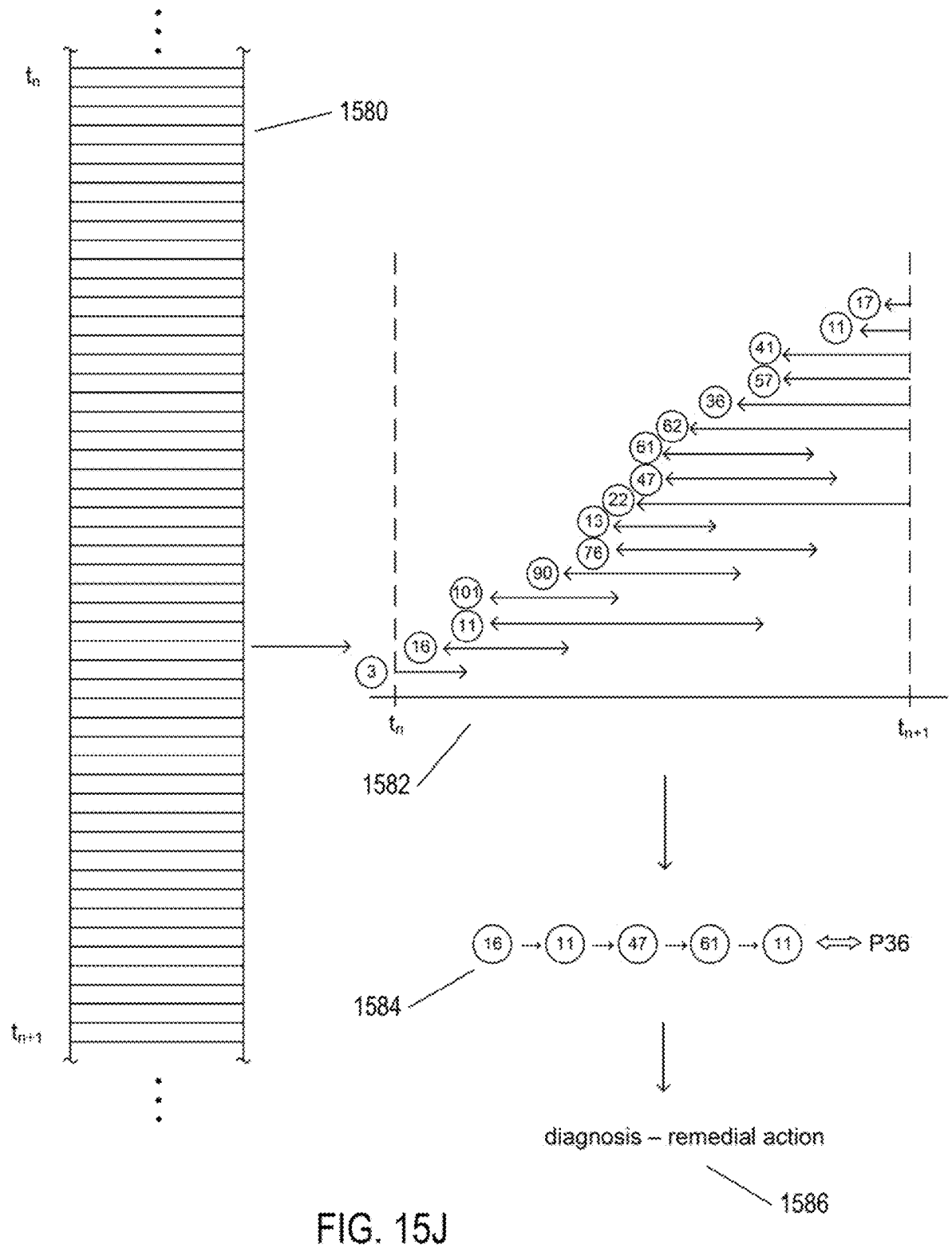

In FIG. 15IH, a sequence of internal calls 1556 is represented at the top of the figure. Each entrypoint in the sequence is associated with a column in a table 1558 below the representation of the sequence of internal calls 1556. Each row in the table corresponds to a different application trace, with the identities of the transaction and trace indicated in a leftmost column 1560. The circles including the lower-case letter "r," such as circle 1562, represent returns from calls. Thus, considering the first row 1564 of the table, the first trace type involves a call 1566 to entrypoint e1 of distributed-application component F, during which a call 1568 is made to entrypoint e6 of the distributed-application component A1. When the second call returns, distributed-application component F then calls 1570 entrypoint e23 of distributed-application component B. When this third call returns, the initial call to entrypoint e1 of distributed-application component F then returns, completing the transaction associated with front-end-server entrypoint e1. The exact sequence of log/event messages in a trace depends on when log/event messages are generated by the various application components during a transaction. There may not be a log/event message for each internal call within a transaction, but the transaction is generally associated with one or more traces, each having a particular sequence of log/event-message types.

FIG. 15I illustrates a more complete interpretation of the log/event messages initially shown in FIG. 15 C using the additional information discussed above with reference to FIGS. 15E, F, and H. Using this information, as well as information about the correspondence between log/event-message traces and distributed-application transactions, an automated application-administration-and-management subsystem can recognize that log/event messages 1572, 1540, 1550, 1574, 1576, and 1512, shown in FIG. 15 I, represents a trace that corresponds to the fourth type of transaction indicated by the fourth row 1578 shown in FIG. 15H. Therefore, as shown in FIG. 15J, the automated application-administration-and-management subsystem can convert a sequence of collected log/event messages 1580 into a time-ordered sequence of transactions 1582. The time-ordered sequence of transactions allows the automated application-administration-and-management subsystem to understand the sequence of API calls made to the distributed application as well as the transactions currently executing within the distributed application at each point in time. Thus, when an error code occurs within a particular log/event message, the occurrence of the error code can be understood within the context of the currently executing transactions within the distributed application as well as the sequence of transactions preceding the point in time at which the error code occurred. Longer-term analysis of the operational behavior of a distributed application by an automated-application-administration-and-management subsystem can allow the automated-application-administration-and-management subsystem to recognize reoccurring patterns of transactions 1584, and to monitor collected log/event messages to identify these various patterns of transactions in order to detect incipient problems or operational anomalies, diagnose the incipient problems and operational anomalies, and undertake appropriate remedial actions 1586. Thus, identifying application transactions and corresponding log/event-message traces is fundamental to extracting sufficient information from collections of log/event messages to efficiently and properly administer and manage a distributed application and a distributed computer system in which the distributed application runs. Similar comments apply to administration and management of operating systems, virtualization layers, and hardware components within a distributed computer system.

Figure 16A:
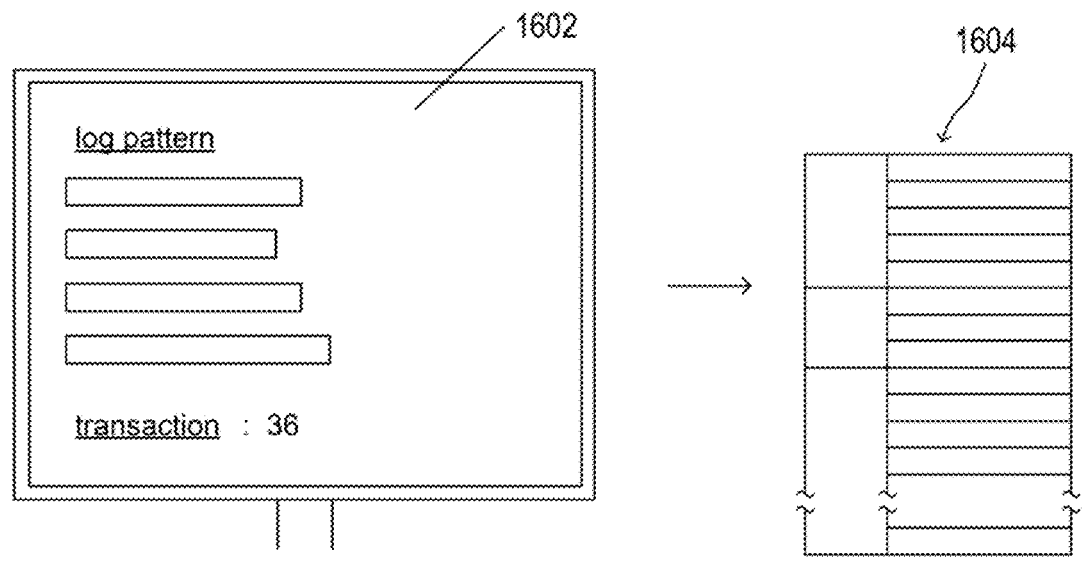
FIGS. 16A-C illustrate several current approaches to obtaining information about application transactions and identifying corresponding log/event-message traces.
Figure 16B:
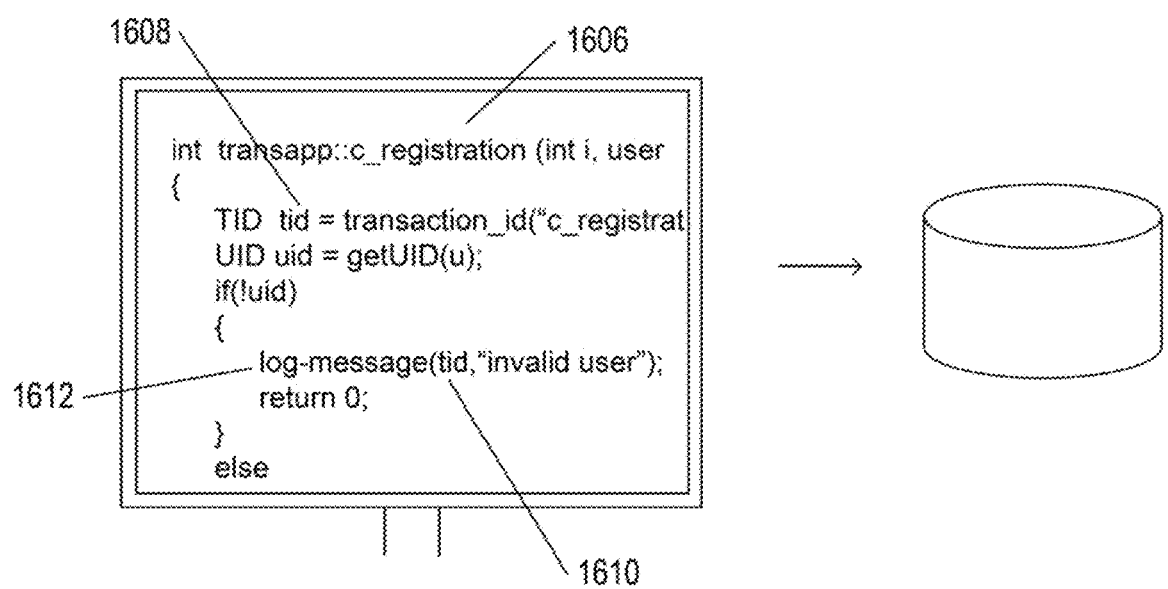
Figure 16C:
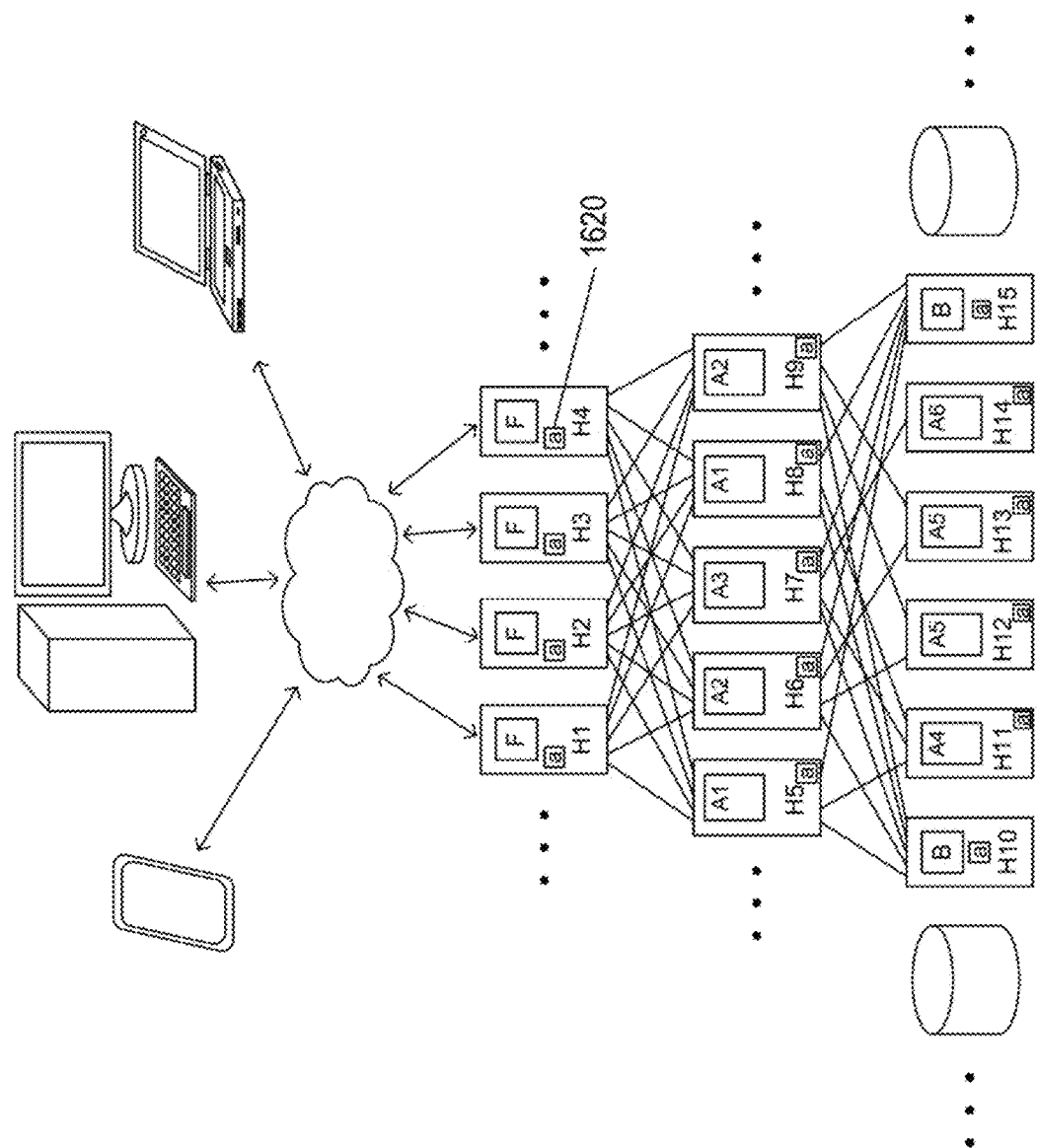

The problem for both human and automated log/event-message interpreters is obtaining accurate identifications of application transactions and corresponding log/event-message traces. Although many different approaches have been used, these approaches are all associated with significant disadvantages. FIGS. 16A-C illustrate several current approaches to identifying application transactions and corresponding log/event-message traces. One approach, illustrated in FIG. 16A, is for human users, such as system-administration personnel, to manually define log/event-message traces. As shown in FIG. 16A, a user interface 1602 is provided to a human system administrator allows the human system administrator to manually specify log/event-message transactions and traces, which can be encoded in transaction/trace tables 1604 stored within computer systems to facilitate automated transformation of collected log/event messages into time-ordered transaction sequences. However, this approach essentially propagates the underlying problems of transaction identification from automated systems to human users and analysts. For a particular distributed application, the developers and/or vendors of the distributed application may provide compiled listings of the log/event-message formats and log/event-message types generated by the distributed application. If, in addition, transaction and trace information is provided, then human users and analysts can simply extract the needed trace information from the information provided by the developers and vendors and generate digitally encoded transaction/trace tables 1604. However, when trace information is not provided, human users and analysts are still faced with the task of analyzing large numbers of collected log/event messages to try to identify temporal patterns of log/event-message-type occurrences and correlate these patterns with different transactions, which is far from trivial, and often infeasible. But the task is even more difficult because the types of log/event messages the temporal patterns of log/event-message generation can quickly change as new versions of distributed applications and other computational entities are produced and installed in a distributed computer system. It is nearly impossible for human users and analysts to monitor and track these changes in order to ensure that manually produced transaction/trace tables accurately reflect patterns of log/event messages generated by currently installed applications and other computational entities. Furthermore, the accuracy of human-identified traces and transactions is often poor due to various types of errors, from data-input errors to errors resulting from incomplete or logically inconsistent analysis.

A second approach for obtaining transaction/trace information is illustrated in FIG. 16B. In this approach, developers of applications and other computational entities are required to include transaction identifiers in each generated log/event message. Thus, in the example shown in FIG. 16B, as a developer is writing a distributed-application routine "c_registration" 1606, statements are included to generate an appropriate transaction identifier 1608 that is included in the argument list 1610 of a log/event-message-generation function 1612. Once each log/event message includes a transaction identifies, the task of identifying log/event-message traces and corresponding application transactions is vastly simplified, both for human trace identifiers as well as for automated trace-identification subsystems. Nonetheless, this approach also suffers significant deficiencies. Perhaps the most glaring deficiency is the fact that many existing distributed applications and other computational entities were not developed to include transaction identifiers and log/event messages, and retrofitting these existing applications and computational entities to do so would be a very difficult, expensive, and time-consuming task. Furthermore, developers are not necessarily immune to various types of errors and oversights, so that, for example, log/event messages generated during execution of a particular transaction might mistakenly include transaction identifiers corresponding to other transactions during execution of which the particular log/event messages are not generated. Program modifications and restructuring may inadvertently result in incorrect transaction IDs being included in log/event messages generated by modified code.

FIG. 16C illustrates yet a different approach to identifying transactions and traces. In this approach, transaction-identifying agents, such as agent 1620, are included in servers running log/event-message-generating computational entities, or directly in the computational entities themselves, to intercept and modify generated log/event messages to include transaction identifiers. These agents may, for example, use various operating-system and/or virtualization-layer functionalities to determine, in real time, the identities of computational entities and routines responsible for generation of intercepted log/event messages. In this case, significant disadvantages are related to the computational overheads associated with the introduction of additional computational entities into a distributed computer system and additional computational-resource usage by these computational entities during interception and processing of log/event messages. Additional significant disadvantages are associated with security risks inherent in deploying agents which access potentially confidential information and which may be monitored or attacked by malicious entities to obtain that confidential information.

Other approaches to identifying transactions and traces, in addition to those discussed above with reference to FIGS. 16 A-C, have been employed. In certain cases, source-code-analysis systems of been developed to attempt to generate transaction and trace information by direct analysis of the source code of computational entities that generate log/event messages. Here again, such methods are associated with inherent security risks and impracticalities. It is unlikely that vendors of distributed applications would provide source code to external entities for analysis. Because of the modern continuous application-release-and-deployment systems used to continuously update distributed applications, the lag time attendant with generation of transaction and trace information from source code is often far too high for automated-administration-and-management subsystems to keep up with changing log/event-message patterns produced by frequently updated installed applications.

The currently disclosed methods and systems were devised to address the deficiencies associated with the current transaction-and-trace identification methods, discussed above. As discussed, in detail, below, these methods employ automated log/event-message-type determination and automated analysis of log/event-message-type occurrences to identify patterns of log/event-message-type occurrences corresponding to traces and associated transactions. The currently disclosed methods and systems automatically determine log/event-message types as an initial preprocessing step in a first phase of the transaction/trace-identification process. Time-ordered sequences of log/event-message types are then generated from collected log/event messages and used for transaction/trace identification. The process of transaction/trace identification can identify transactions and traces for multiple different computational entities, including multiple different distributed applications.

The initial preprocessing of log/event-message types transforms an input collection or stream of log/event messages into a corresponding collection or stream of base-form log messages ("BFLMs"). A BFLM is a systematically transformed log/event message. In general, highly variable fields in input log/event messages are abbreviated or removed to produce a corresponding BFLM. However, variability is only one criterion for field removal or abbreviation. In general, the transformations of log/event messages to corresponding BFLMs is designed or obtained by automated methods to minimize the number of unique BFLMs while, at the same time, maximizing information recovered from BFLM sequences. The number of unique BFLMs generated from an input log/event-message collection or stream is generally far less than the number of unique log/event messages in the input log/event-message collection or stream, often a fraction of a percent of the number of unique log/event messages in the input log/event-message collection or stream. For example, input log/event messages generally include timestamps, so that only those log/event messages generated within the smallest-granularity time that can represented by a timestamp have any chance of being identical. However, when timestamps are removed or replaced by a common symbol when log/event messages are transformed to corresponding BFLMs, many of the BFLMs may be identical. A BFLM can serve as a log/event-message-type identifier, or may be mapped to a log/event-message type. The currently disclosed methods and systems transform log/event messages into timestamp/log/event-message type pairs.

Figure 17:
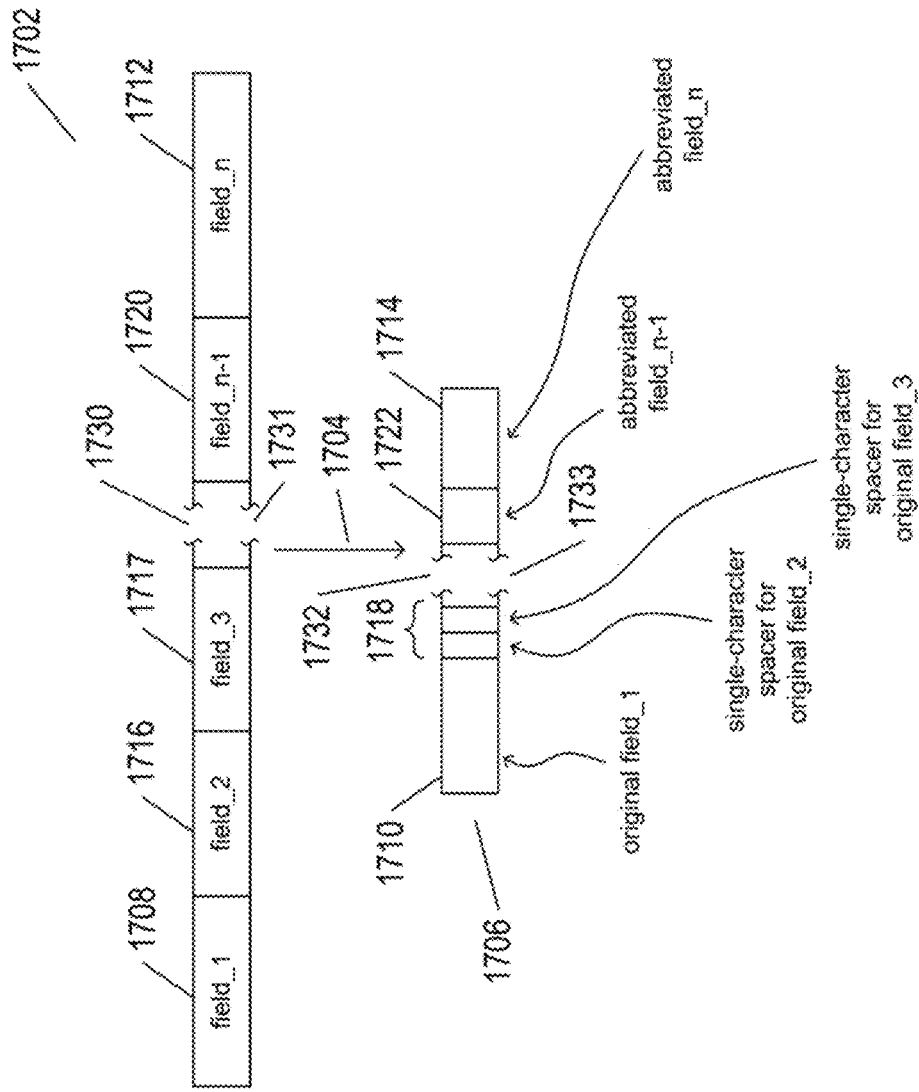
FIG. 17 illustrates log/event-message preprocessing.

FIG. 17 illustrates log/event-message preprocessing. An input log/event message 1702 is represented at the top of the figure. Arrow 1704 represents preprocessing. The result of preprocessing, BFLM 1706, is a generally truncated version of the input log/event message. In this example, the first field 1708 in the input log/event message remains intact 1710 in the BFLM. Similarly, the final field 1712 of the input log/event message remains intact 1714 in the BFLM. However, the second and third fields of the input message 1716-1717 are both abbreviated to single-character spacers 1718 in the BFLM, essentially removing these fields. The second to last field 1720 in the input log/event message is abbreviated 1722 in the output BFLM. Note that, in this figure and subsequent figures, broken lines 1730-1733 indicate the possible presence of additional fields in both representations of log/event messages as well as BFLMs. In general, there are a variety of different transformations that can be carried out on each original field of the input log/event message. The field can be incorporated in the BFLM, truncated and incorporated in the BFLM, abbreviated incorporated in the BFLM, compressed and incorporated in the BFLM, mapped to one of a set of replacement fields, with the replacement field incorporated in the BFLM, and omitted from the BFLM.

There are many different possible ways to generate systematic log/event-message preprocessors. The transformations, such as the transformation shown in FIG. 17, may be hardcoded or specified through a user interface by system administrators and other personnel. Alternatively, machine-learning techniques may be applied to optimize compression by learning which fields to remove or abbreviate to maximize compression while minimizing information loss. Users may employ additional information, including log-content packs provided by application and log-message-system vendors, to rationally determine the types of transformations that provide desired levels of compression without significant information loss.

Figure 18A:
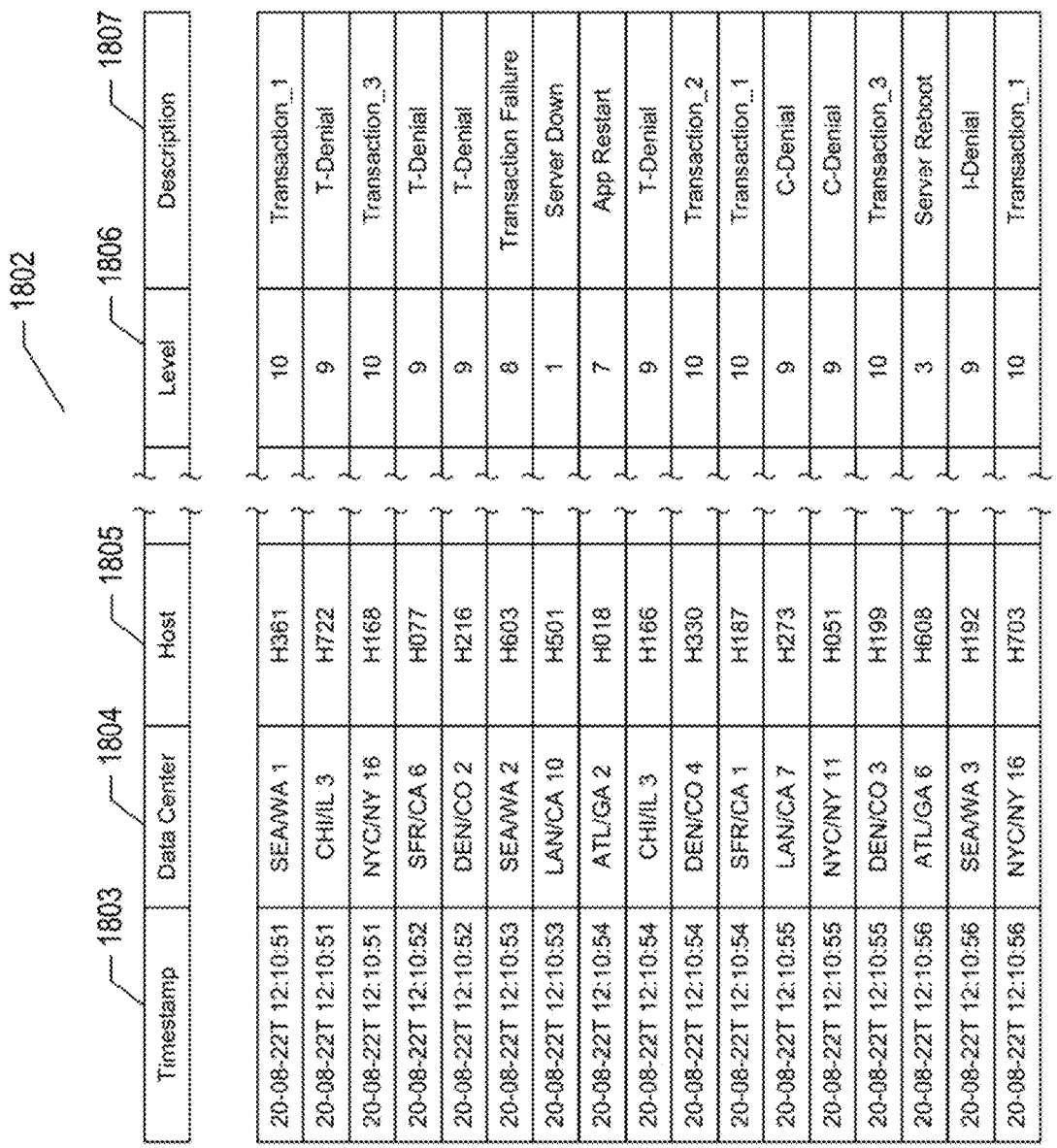
FIGS. 18A-C provide several examples of log/event-message-to-BFLM transformations.
Figure 18B:
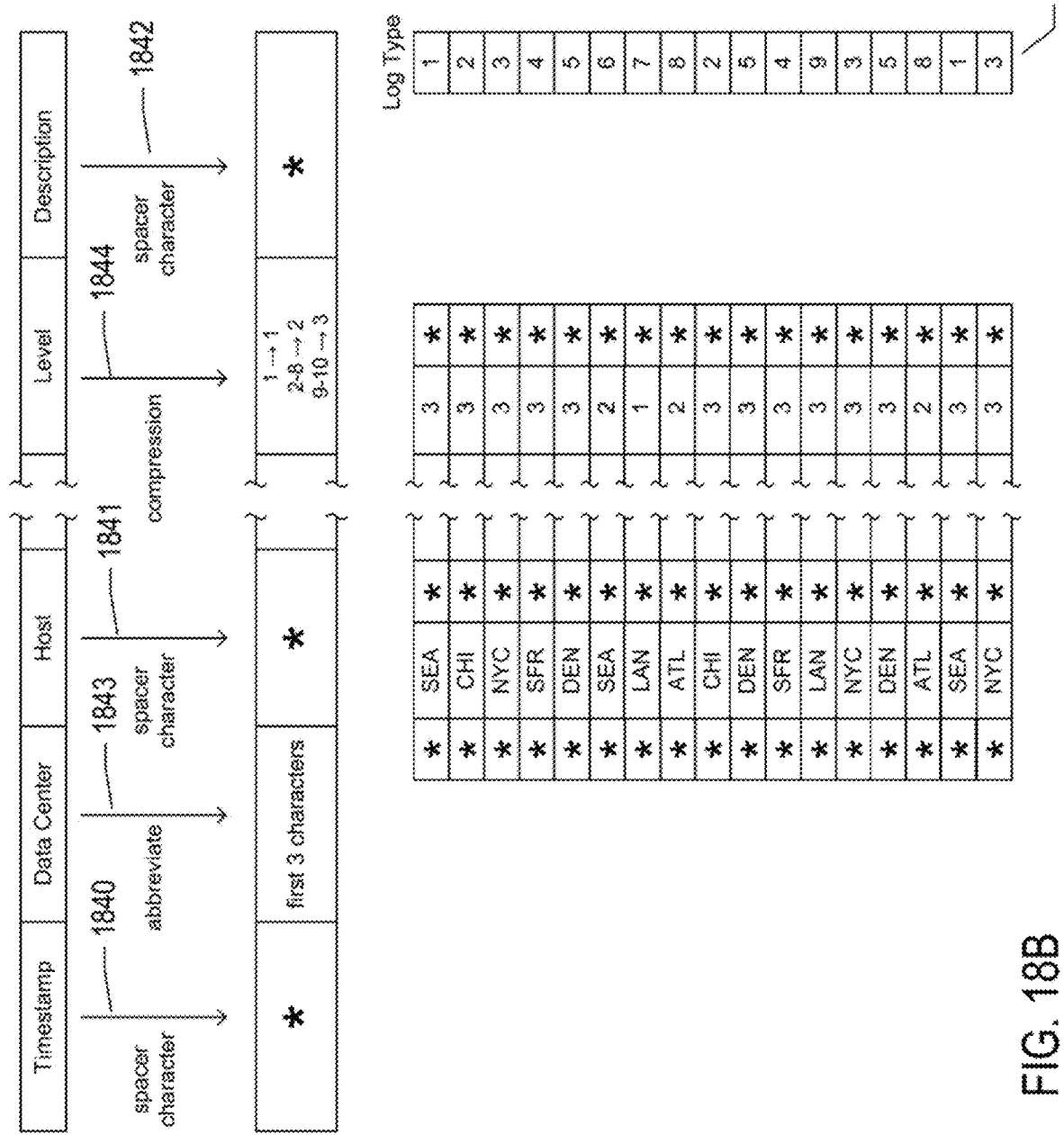
Figure 18C:
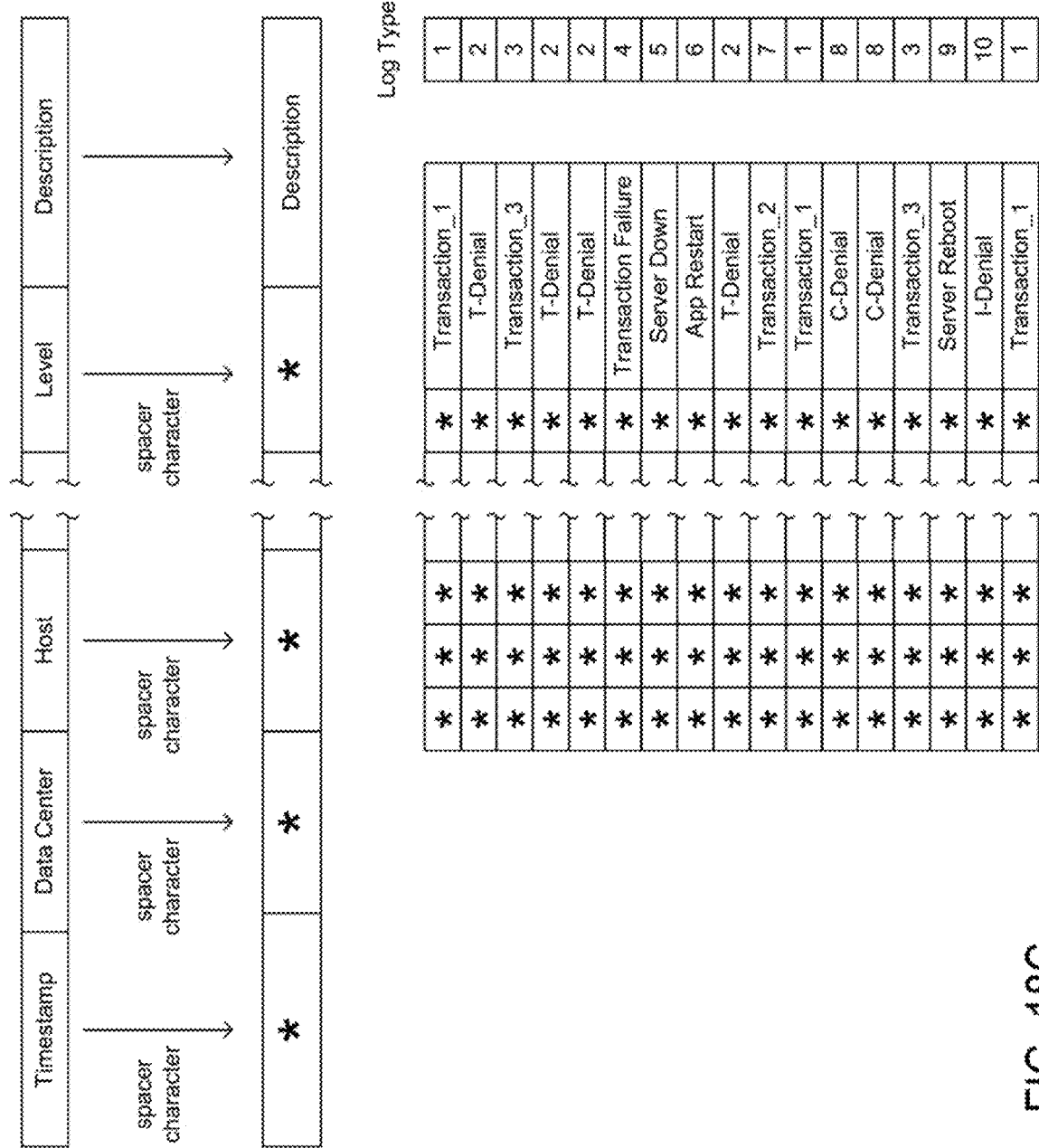

FIGS. 18A-C provide several examples of log/event-message-to-BFLM transformations. FIG. 18A shows a representation 1802 of a log/event message which includes the fields: (1) Timestamp 1803; (2) Data Center 1804; (3) Host 1805; (4) Level 1806; and (5) Description 1807. Table 1808 includes 17 log/event messages, with each row of the table representing a single log/event message. For example, a log/event message query system might store log/event messages in a relational-database table with columns corresponding to the log/event-message fields. FIG. 1813 shows a first log/event-message-o-BFLM transformation and a table containing the 17 BFLMs produced by the transformation corresponding to the 17 log/event-messages shown in table 1808 in FIG. 18A. The first log/event-message-to-BFLM transformation substitutes a spacer character for the first, third, and final fields 1840-1842, abbreviates the second field using the first three characters of the original second field 1843, and compresses the second-to-last field 1844 by compressing 100 different possible levels that may be encoded in the Level field to only three levels. As indicated by a log-type column 1846, following transformation, the 17 different log/event messages are transformed into only nine different BFLMs. Of course, in an actual log/event-message system, this type of transformation may lead to compression of literally billions of different log/event messages to only a few tens to hundreds of different types of BFLMs. FIG. 18C illustrates a different, second log/event-message-to-BFLM transformation, using the same illustration conventions as used in FIG. 181B. In this case, the 17 different log/event messages, shown in FIG. 18A, are compressed into 10 different types of BFLM. As with the first log/event-message-to-BFLM transformation, application of the second log/event-message-to-BFLM transformation to a real-world set of billions of log/event messages may result in compression of literally billions of different log/event messages to only a few tens to hundreds of different BFLMs. Thus, log/event-message preprocessing is used to produce a modest number of unique BFLMs corresponding to a very large number of different types of log/event messages. In general, the ratio of unique BFLMs to unique log/event-messages is less than 0.001, is frequently less than 0.000001, and can often be significantly smaller. In many cases, a log/event-message system may employ multiple different transformations, each applied to a particular subset of log/event messages. In other words, a particular transformation may be used for each of a number of different fundamental types of log/event messages.

Figure 19C:
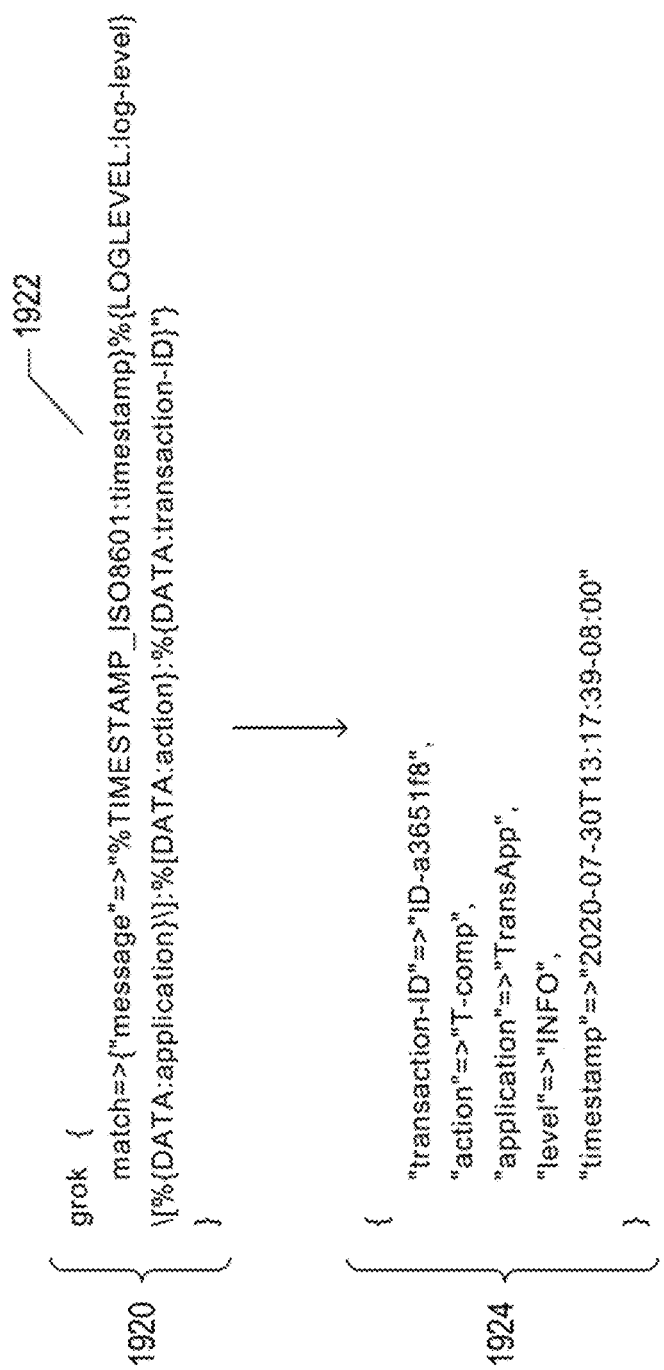

FIGS. 19A-C illustrate one approach to extracting fields from a log/event message. Log/event messages may be understood as containing discrete fields, as in the representations shown in FIGS. 17-18A, but, in practice, they are generally alphanumeric character strings. An example log/event message 1902 is shown at the top of FIG. 19A. The five different fields within the log/event message are indicated by labels, such as the label "timestamp" 1904, shown below the log/event message. FIG. 19B includes a variety of labeled regular expressions that are used, as discussed below with reference to FIG. 19C, to extract the values of the discrete fields in log/event message 1902. For example, regular expression 1906 follows the label YEAR 1908. When this regular expression is applied to a character string, it matches either a four-digit indication of a year, such as "2020," or a two-digit indication of the year, such as "20." The string "\d\d" matches two consecutive digits. The "(?>" and ")" characters surrounding the string "\d\d" indicates an atomic group that prevents unwanted matches to pairs of digits within strings of digits of length greater than two. The string "(1, 2)" indicates that the regular expression matches either one or two occurrences of a pair of digits. A labeled regular expression can be included in a different regular expression using a preceding string "%{"and a following symbol "}," as used to include the labeled regular expression MINUTE (1910 in FIG. 19B) in the labeled regular expression TIMESTAMP_ISO8601 (1912 in FIG. 19B). There is extensive documentation available for the various elements of regular expressions.

Grok parsing uses regular expressions to extract fields from log/event messages. The popular Logstash software tool uses grok parsing to extract fields from log/event messages and encode the fields according to various different desired formats. For example, as shown in FIG. 19C, the call to the grok parser 1920 is used to apply the quoted regular-expression pattern 1922 to a log/event message with a format of the log/event message 1902 shown in FIG. 19A, producing a formatted indication of the contents of the fields 1924. Regular-expression patterns for the various different types of log/event messages can be developed to identify and extract fields from the log/event messages input to message collectors. When the grok parser unsuccessfully attempts to apply a regular-expression pattern to a log/event message, an error indication is returned. The Logstash tool also provides functionalities for transforming input log/event messages into BFLMs, as discussed above with reference to FIG. 17-18C. The regular-expression patterns, as mentioned above, can be specified by log/event-message-system users, such as administrative personnel, can be generated by user interfaces manipulated by log/event-message-system users, or may be automatically generated by machine-learning-based systems that automatically develop efficient compression methods based on analysis of log/event-message streams.

Figure 20:
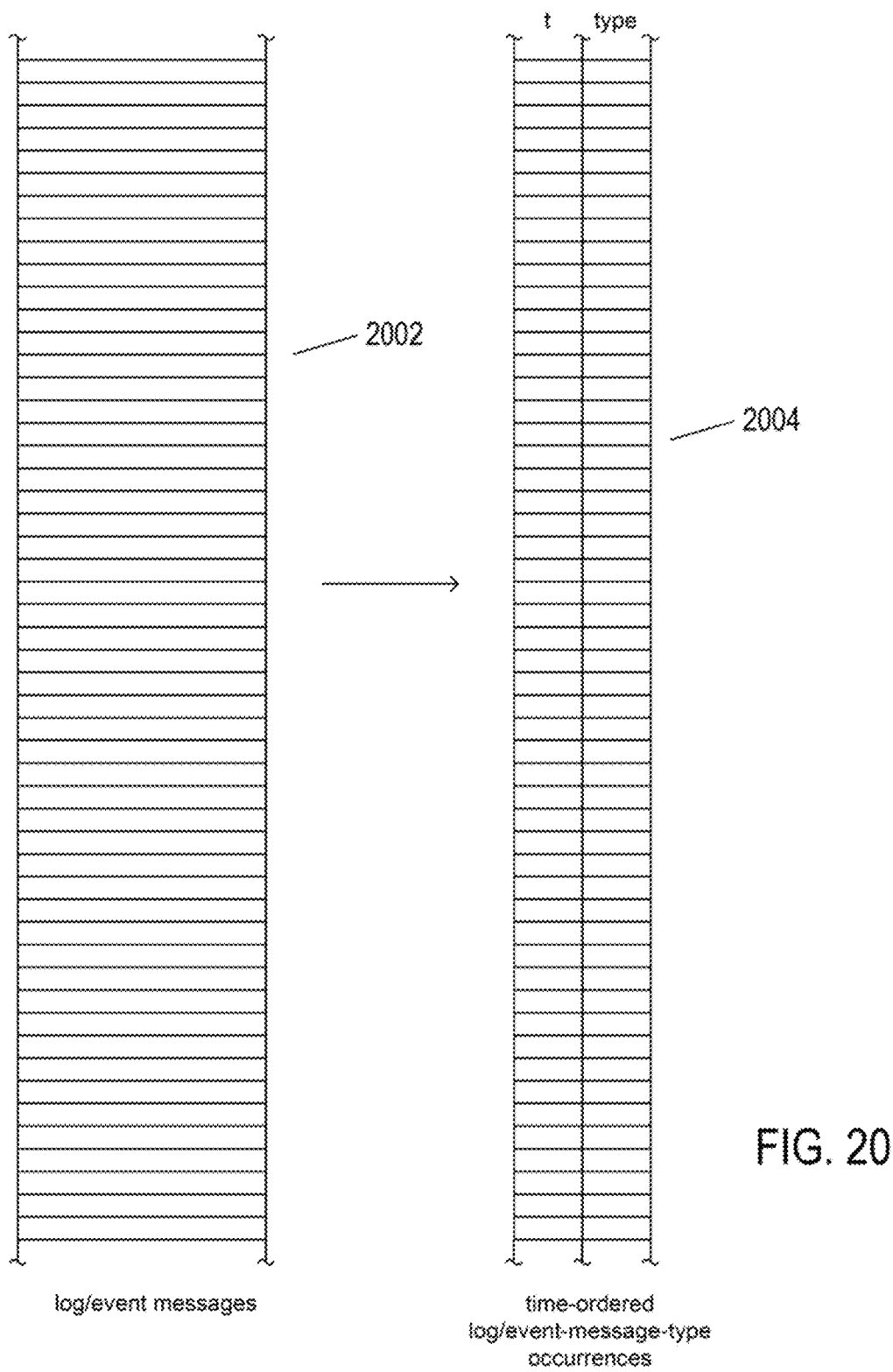
FIG. 20 illustrates a first step in a first phase of the currently disclosed process for identifying transactions and traces.

FIG. 20 illustrates a first step in a first phase of the currently disclosed process for identifying transactions and traces. This first step includes log/event-message preprocessing to generate log/event-message types. An input stream or collection of log/event messages 2002 is preprocessed and then converted into a time-ordered sequence of timestamp/log-event-message-type pairs 2004. The timestamp in each timestamp/log-event-message-type pair is extracted or derived from the original log/event message. The type in each timestamp/log-event-message-type pair is either a BFLM generated from the original log/event message or a numeric or alphanumeric type to which the BFLM is mapped. The sequence of timestamp/log-event-message-type pairs 2004 can alternatively be considered to be a time-ordered sequence of log/event-message-type occurrences extracted from the input collection or stream of log/event messages.

Figure 21:
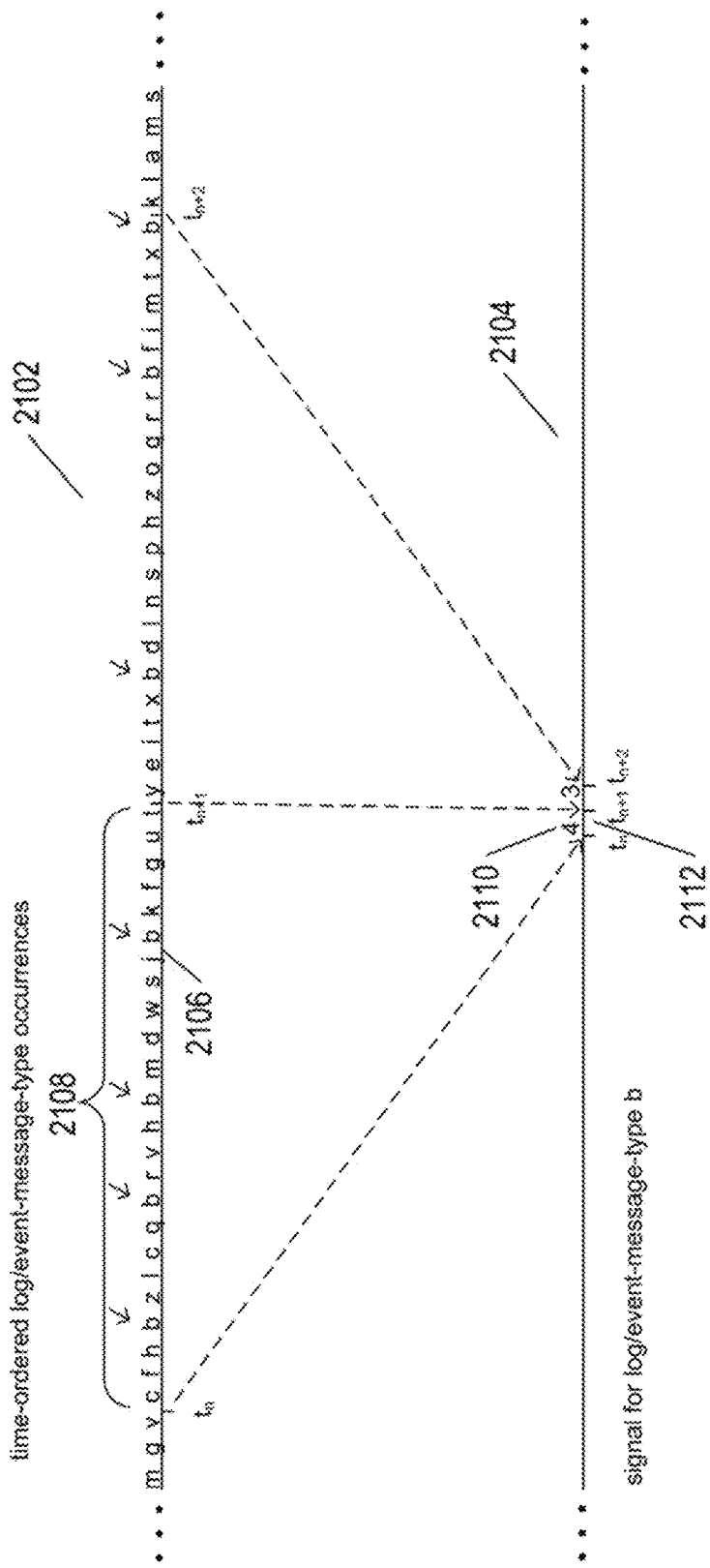
FIG. 21 illustrates a second step in the first phase of the currently disclosed process for identifying transactions and traces.

FIG. 21 illustrates a second step in the first phase of the currently disclosed process for identifying transactions and traces. In the second step, the ordered sequence of log/event-message-type occurrences 2102 generated in the first step is used to generate a time-series-like signal 2104 for each different log/event-message type. In FIG. 21, the time-ordered sequence of log/event-message-type occurrences 2102 is represented by a timeline along which log/event-message types, each represented by a lower-case letter, are arranged in time order. When the timestamps associated with a set of log/event-message types are identical, the log/event-message types with identical timestamps are arranged adjacent to one another in a random linear order along the timeline, in this representation. For each time interval along the timeline, where a time interval includes all of the log/event-message types with timestamps greater than or equal to a first time to and less than a second time $t_{n+1}$, the number of occurrences of a particular log/event-message type are counted and entered into a corresponding time interval of the time-series-like signal for the particular log/event-message type. For example, in the time interval 2108 in the time-ordered sequence of log/event-message-type occurrences 2102, there are four occurrences of the log/event-message type represented by the character "b" and, thus, the number 4 (2110) is placed into the corresponding time interval 2112 of the time-series-like signal for log/event-message-type b. The time intervals of the time-ordered sequence of log/event-message-type occurrences from which occurrence counts are selected are generally on the order of tens or hundreds of milliseconds to one or a few seconds, and, in any particular process, have identical lengths. The length of the time intervals is selected to provide a sufficiently large average number of log/event-message occurrences in a sufficient number of the time intervals of the time-series-like signals so that the time-series-like signals exhibit statistically meaningful patterns but, at the same time, are selected to be short enough so that the granularity of log/event-message-type occurrences is fine enough to detect fluctuations within time periods similar to those for execution times of transactions. Because of the high rate of log/event-message generation in distributed computer systems, statistically meaningful counts of log/event-message-type occurrences are obtained by using time intervals in the above-discussed ten milliseconds to one or more seconds range.

Figure 22:
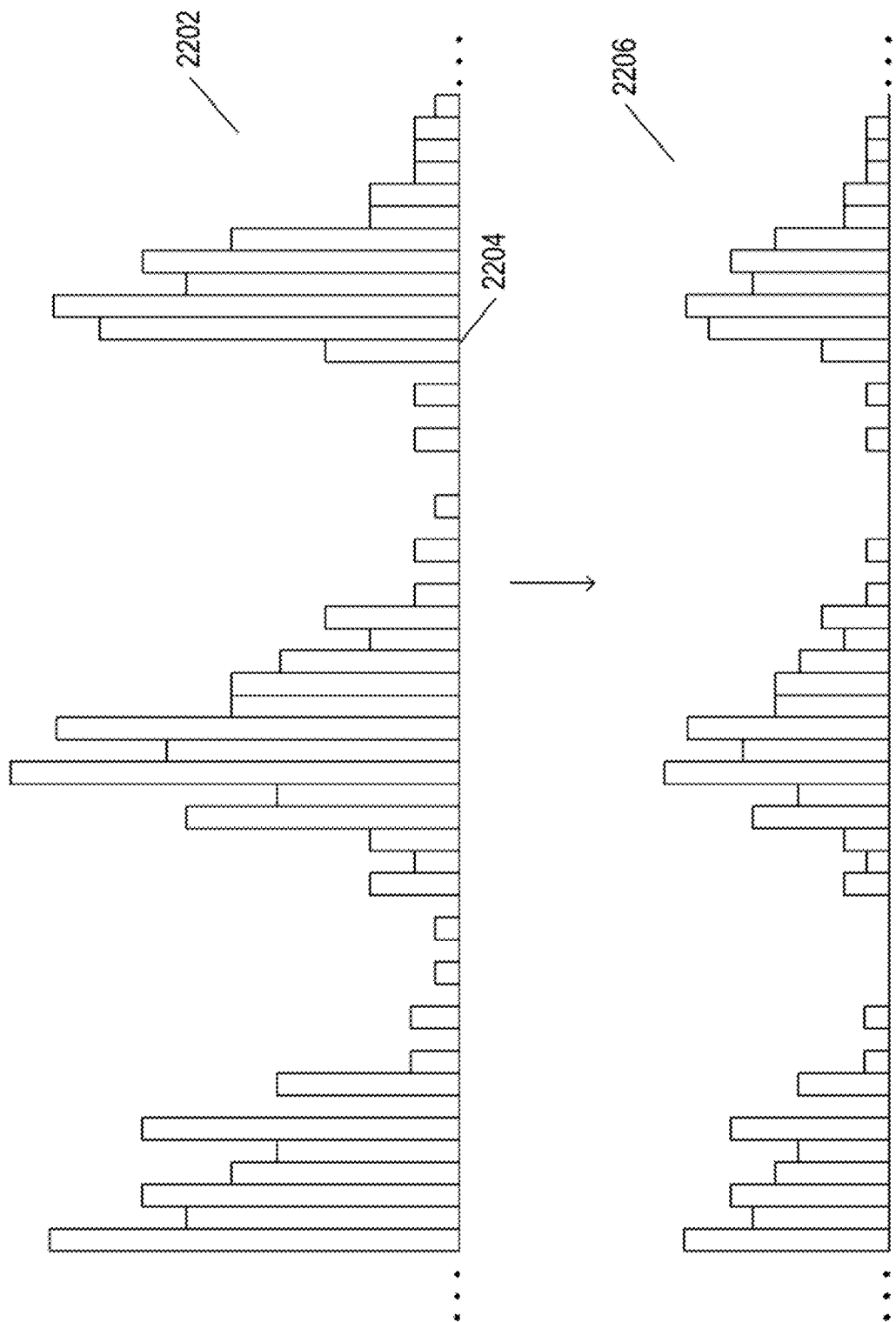
FIG. 22 illustrates a next step in the first phase of the process of identifying transactions and traces.

FIG. 22 illustrates a next step in the first phase of the process of identifying transactions and traces. The time-series-like signal for a particular log/event-message type, represented, in FIG. 21, by a timeline 2104 associated with counts of the occurrences of log/event messages of the particular type for each interval along the timeline is alternatively represented 2202, in FIG. 22, by a histogram in which the counts of the occurrences of log/event messages of the particular type represented by columns arranged along the same timeline 2204. Because the time-series-like signals for each of the different log/event-message types are pair-wise compared, in following steps, the time-series-like signals for the different log/event-message types are normalized and then smoothed. Normalization is shown in FIG. 22. It is essentially a scaling operation that proportionally rescales the column heights so that the total number of occurrences, or, equivalently, the area under the curve obtained by smoothing discrete points corresponding to column heights, is a fixed value for all of the different time-series-like signals corresponding to the different log/event-message types. As shown in FIG. 22, rescaling of the histogram-like representation of the time-series-like signal 2202 results in a proportional decrease in the heights of the columns to generate the normalized histogram-like representation of the time-series-like signal 2206. There are a variety of methods for normalization. Perhaps the simplest method is to determine a fixed total-number-of-occurrences value v for normalization, to then determine a rescaling ratio r for each time-series-like signal by dividing v by the total number of occurrences for the particular log/event-message type, and then rescaling the columns of the histogram-like representation of the time-series-like signal for the particular log/event-message type by the rescaling ratio r.

Figure 23:
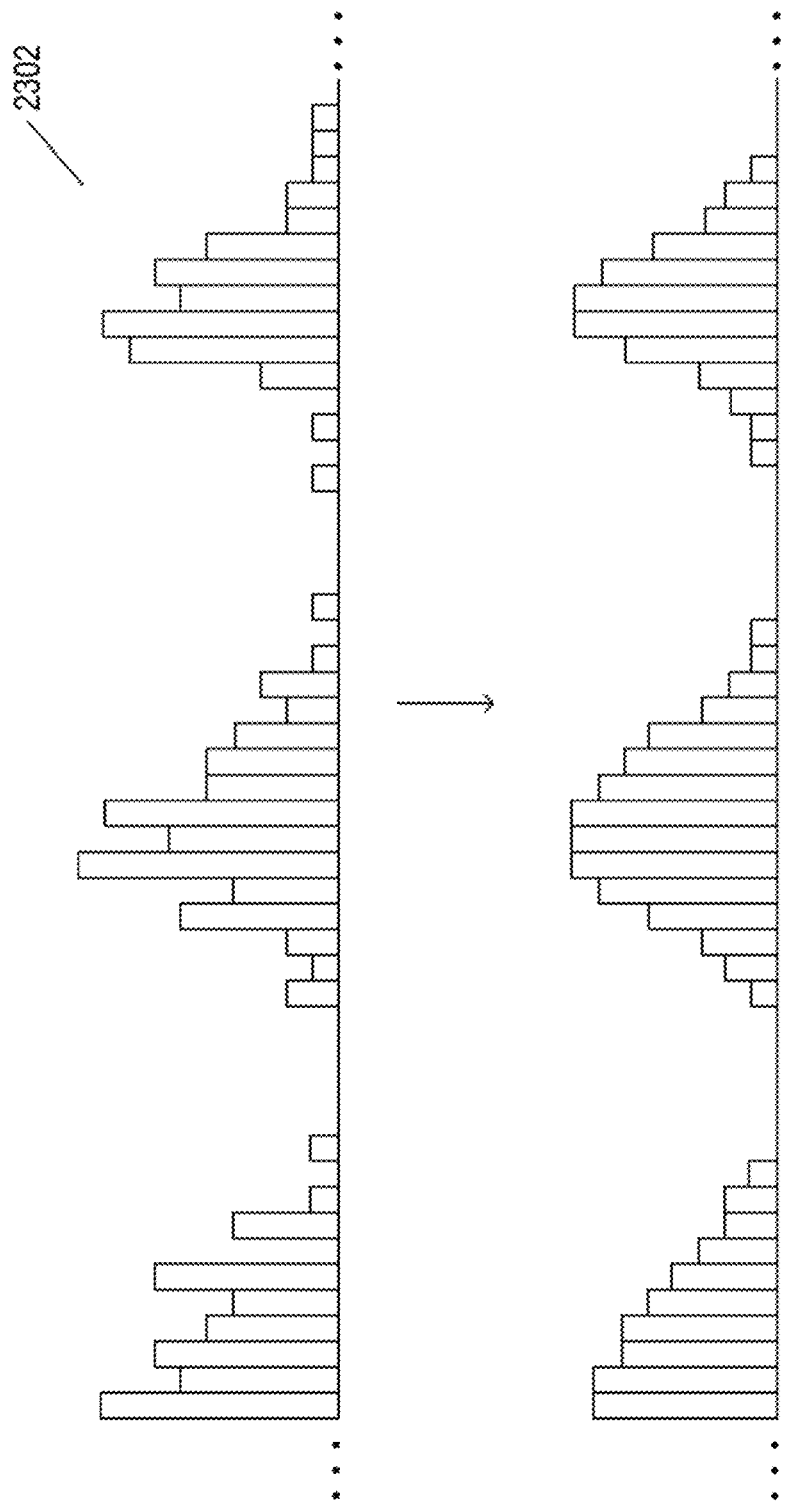
FIG. 23 illustrates a smoothing step.

FIG. 23 illustrates a smoothing step. The rescaled and normalized time-series-like signals for each of the different log/event-message types, such as the signal represented by histogram 2302 in FIG. 23, are subjected to a smoothing operation to smooth the discrete approximation to a curve represented by the heights of the columns so that the smoothed column heights correspond to a relatively smooth discrete approximation of a continuous curve. The smoothing operation essentially lowers the granularity of variation in column heights along the time axes.

Figure 24:
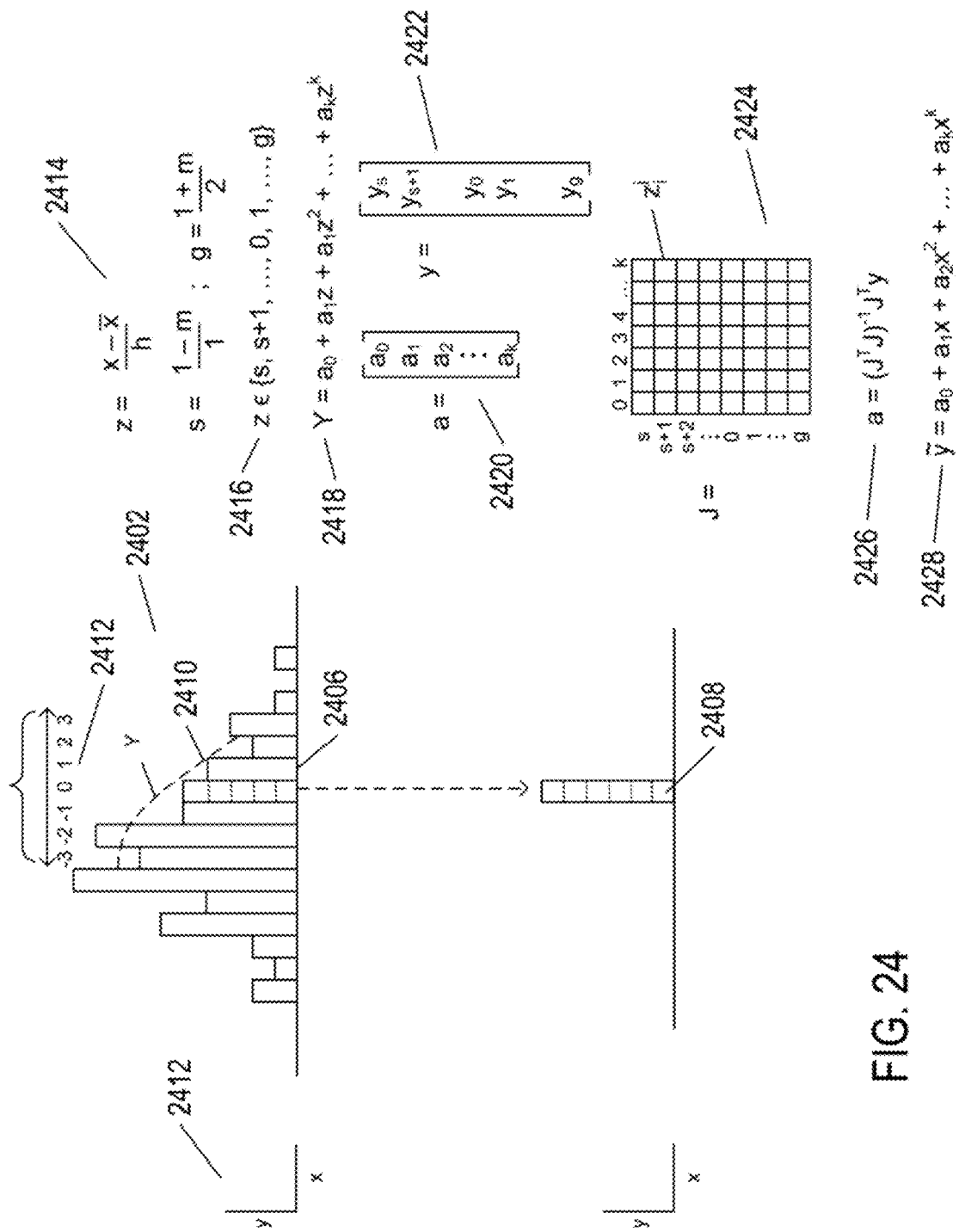
FIG. 24 illustrates one approach to smoothing time-series-like signals corresponding to log/event-message types.

FIG. 24 illustrates one approach to smoothing time-series-like signals corresponding to log/event-message types. A portion of a histogram-like representation of a time-series-like signal 2402 is shown at the top of FIG. 24. A smoothing operation is successively applied to each column in the histogram-like representation, such as column 2406, to generate a smoothed column 2408 with a potentially altered column height. The smoothing operation computes a polynomial representation of a window of columns centered about the column that is being smoothed, as represented in FIG. 24 by the dashed curve 2410. The dashed curve corresponds to a computed polynomial approximation Y of the column heights in the window of columns. In this example, the window of columns spans a small portion of the timeline 2412 from time values $-m=-3$ to $m=3$, with the column being smoothed located at $m=0$.

In order to compute the polynomial Y, a change of coordinates is carried out. As indicated by key 2412, the histogram time axis corresponds to an original coordinate x and the column heights correspond to coordinate y. The x coordinate for the column to which smoothing is applied is x. A z coordinate for each x coordinate in the time-axis window about the column being smoothed is then computed as indicated by expression 2414, where h is the column width. This generates z coordinates 2416 for the columns in the window from $-m$ to m, where m is the z coordinate of the rightmost column in the window and is also the number of columns in the window to each side of the column on which the smoothing operation is carried out an $h=1$. The polynomial Y is a polynomial in z of degree k 2418. The coefficients are represented by the vector a 2420 and the column heights for the columns in the window are represented by vector y 2422. A two-dimensional matrix J 2424 has row indices spanning the ranges of z coordinates 2416 and column indices spanning the degrees 0-k of the terms of polynomial Y. Thus, each element in matrix J can be expressed as $z_i^j$, where i is a z-coordinate index and j is an exponent index. The coefficients of polynomial Y are then computed by a standard least-squares regression represented by expression 2426. With the coefficients in hand, a new, smoothed column height for the column being smoothed can then be computed from the determined polynomial Y, as indicated by expression 2428.

Figure 25:
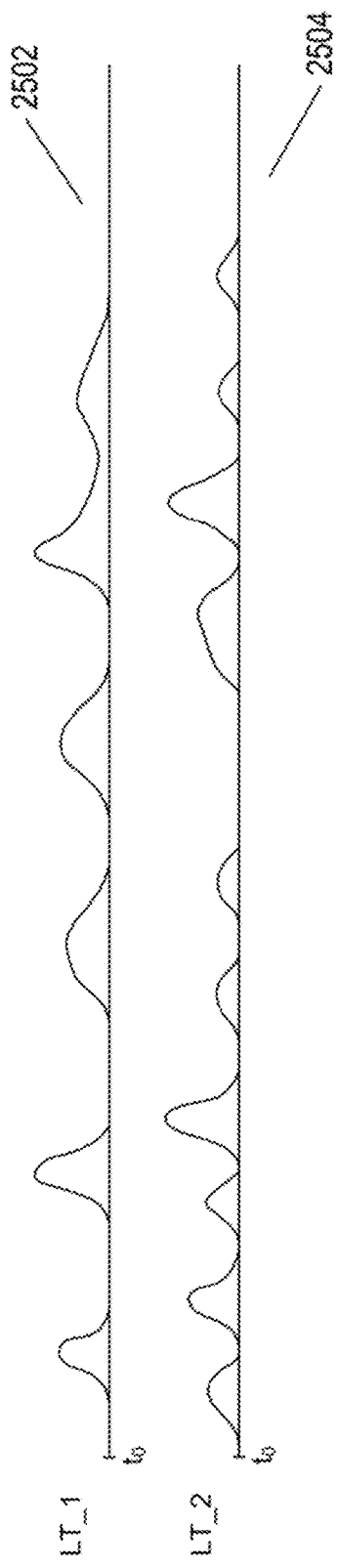
FIGS. 25, 26A-B, and 27A-B together illustrate the pairwise comparison of two time-series-like signals generated by the above-described process steps for each of two different log/event-message types.
Figure 26A:
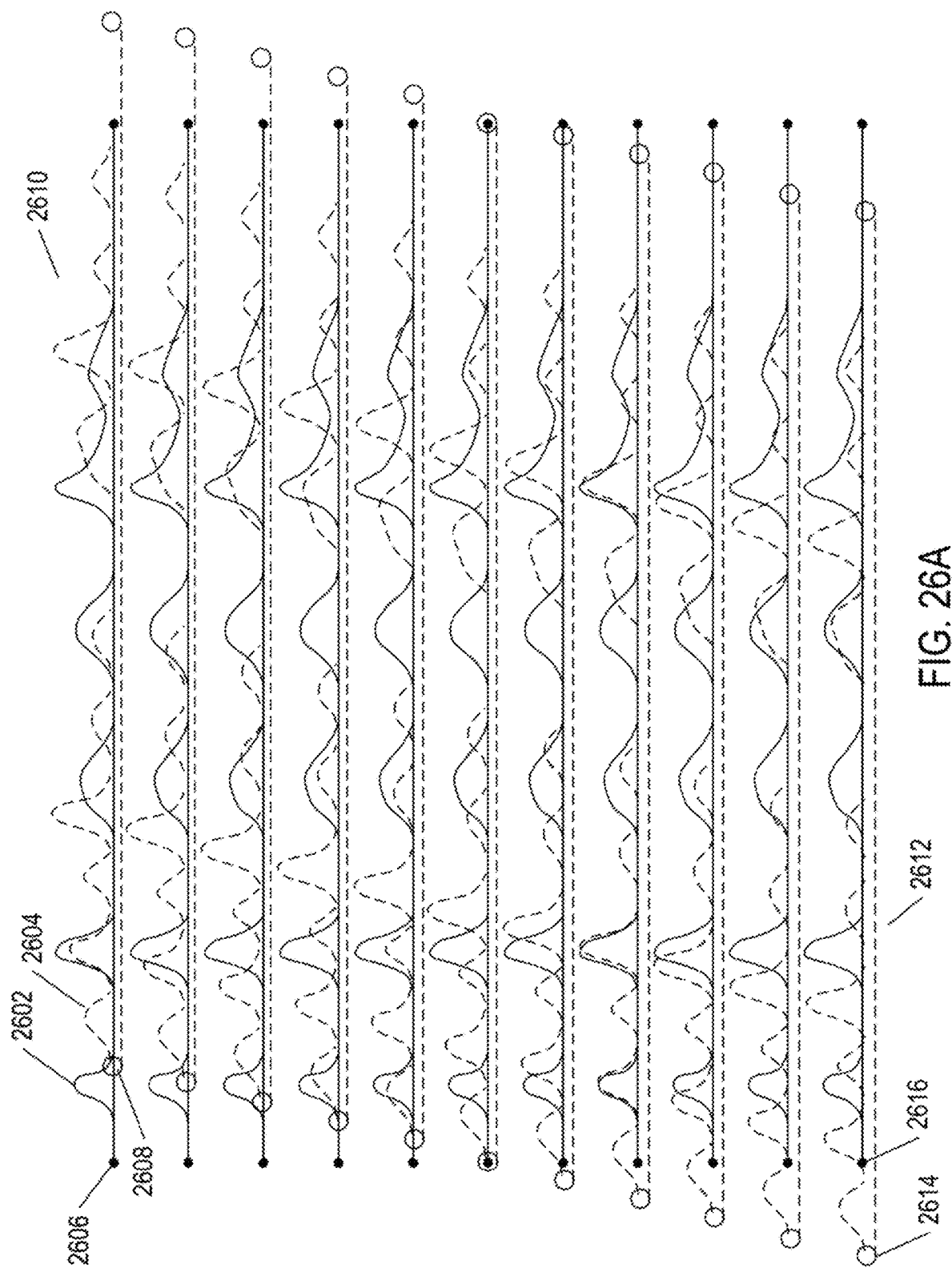

FIGS. 25, 26A-B, and 27A-B together illustrate the pair-wise comparison of two time-series-like signals generated by the above-described process steps for each of two different log/event-message types. FIG. 25 shows continuous-curve representations of the normalized and smoothed time-series-like signals for a first log/event-message type 2502 and the second log/event-message type 2504. FIG. 26A shows superpositions of the time-series-like signal for the second log/event-message type 2504 at different lateral offsets, or phases, onto the time-series-like signal for the first log/event-message type 2502. In FIG. 26A, the time-series-like signal for the first log/event-message type is represented by solid continuous curves, such as solid-continuous curve 2602, and the time-series-like signal for the second log/event-message type is represented by dashed continuous curves, such as dashed continuous curve 2604. The starting position for the time-series-like signal for the first log/event-message type in each superposition is indicated by a solid disc, such as solid disk 2606. The starting position for the time-series-like signal for the second log/event-message type in each superposition is indicated by a circle, such as circle 2608. In the first superposition 2610, the time-series-like signal for the second log/event-message type 2604 is offset relatively far to the right, as can be seen by comparing the starting point for the time-series-like signal for the first log/event-message type 2606 to the starting point 2608 for the time-series-like signal for the second log/event-message type. For each next superposition, the starting point for the time-series-like signal for the second log/event-message type is shifted by a fixed increment to the left. For the last superposition 2612 shown in FIG. 26A, the starting point 2614 for the time-series-like signal for the second log/event-message type is shifted relatively far to the left of the starting point 2616 for the time-series-like signal for the first log/event-message type.

Figure 26B:
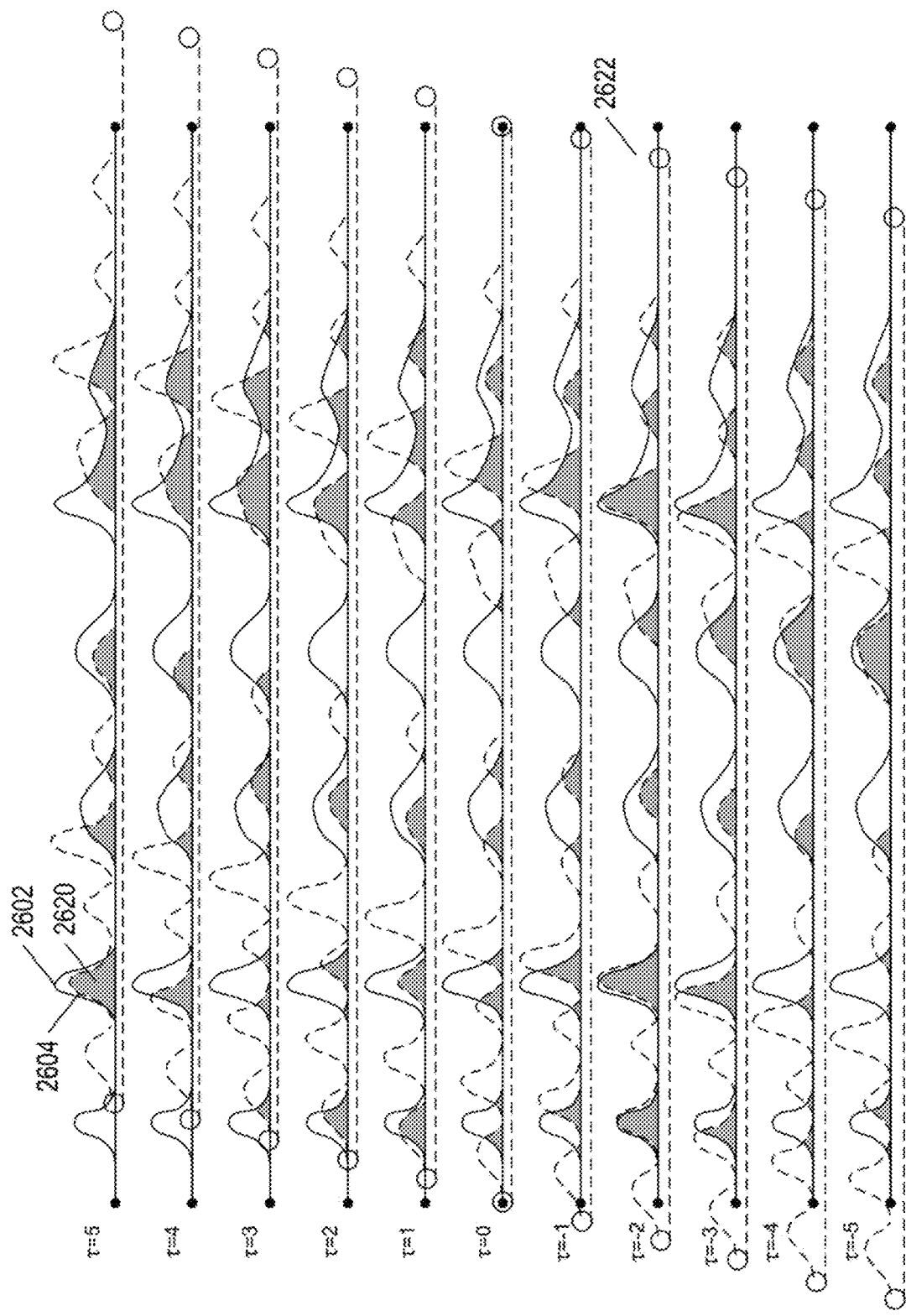

FIG. 26B shows the same superpositions shown in FIG. 26A with the intersections of the areas below both curves in each superposition shaded, such as shaded area 2620 below the curve 2602 for the time-series-like signal for the first log/event-message type and below the curve 2604 for the time-series-like signal for the second log/event-message type. By looking through all of the superpositions, it is evident that superposition 2622 features the greatest overlap, or correlation, between the two time-series-like signals. In this superposition, the second time-series-like signal is shifted by two time intervals to the left of the first time-series-like signal. This overlap indicates a strong correlation between, for example, peak 2624 in the first time-series-like signal and peak 2626 and the second time-series-like signal. This correlation indicates that there is a strong likelihood that a log/event message of the second type follows a log/event message of the first type by two time increments. This, in turn, indicates that the first log/event-message type and second log/event-message type may commonly occur in at least one trace corresponding to at least one transaction.

Figure 27A:
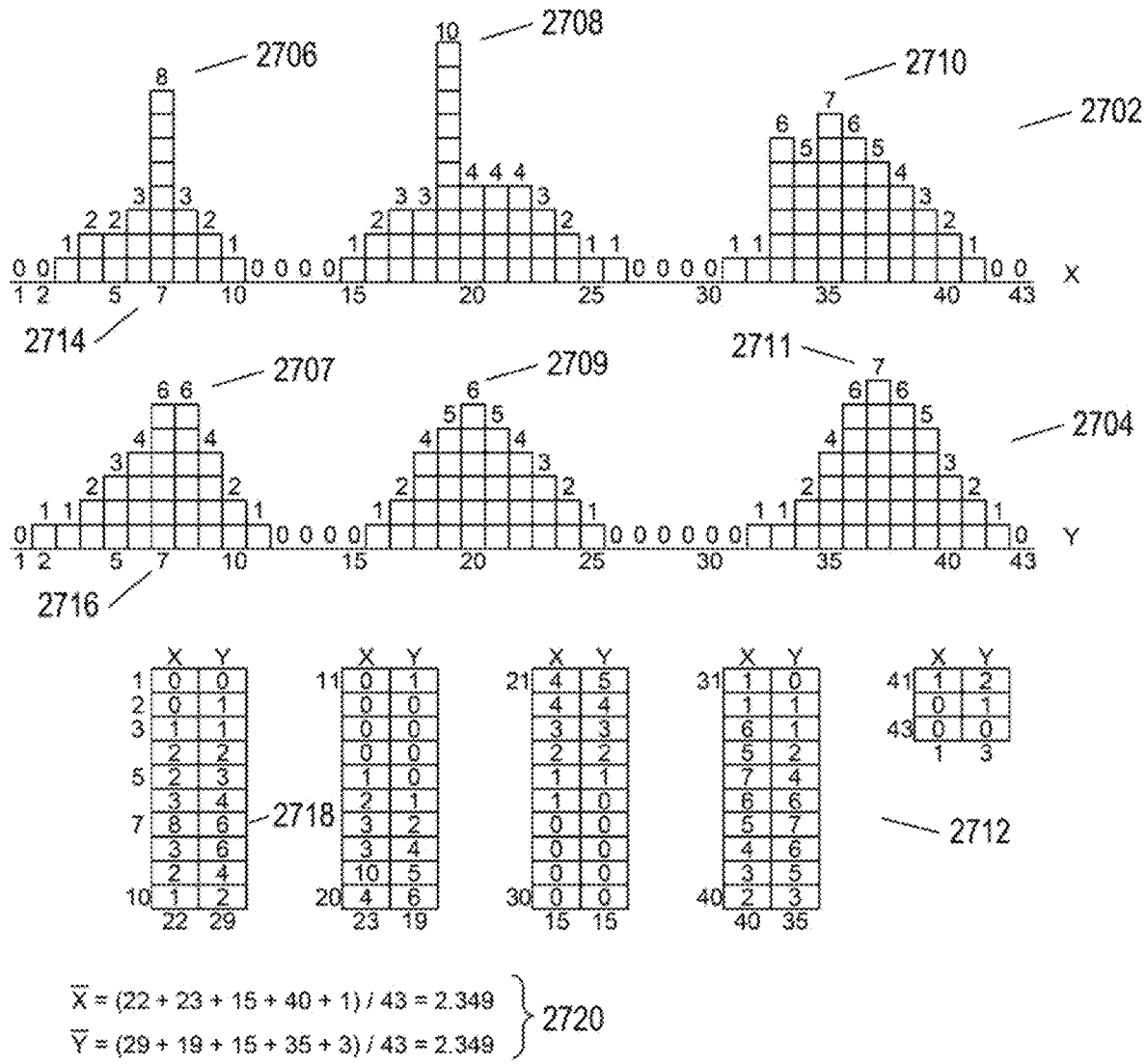
Figure 27B:
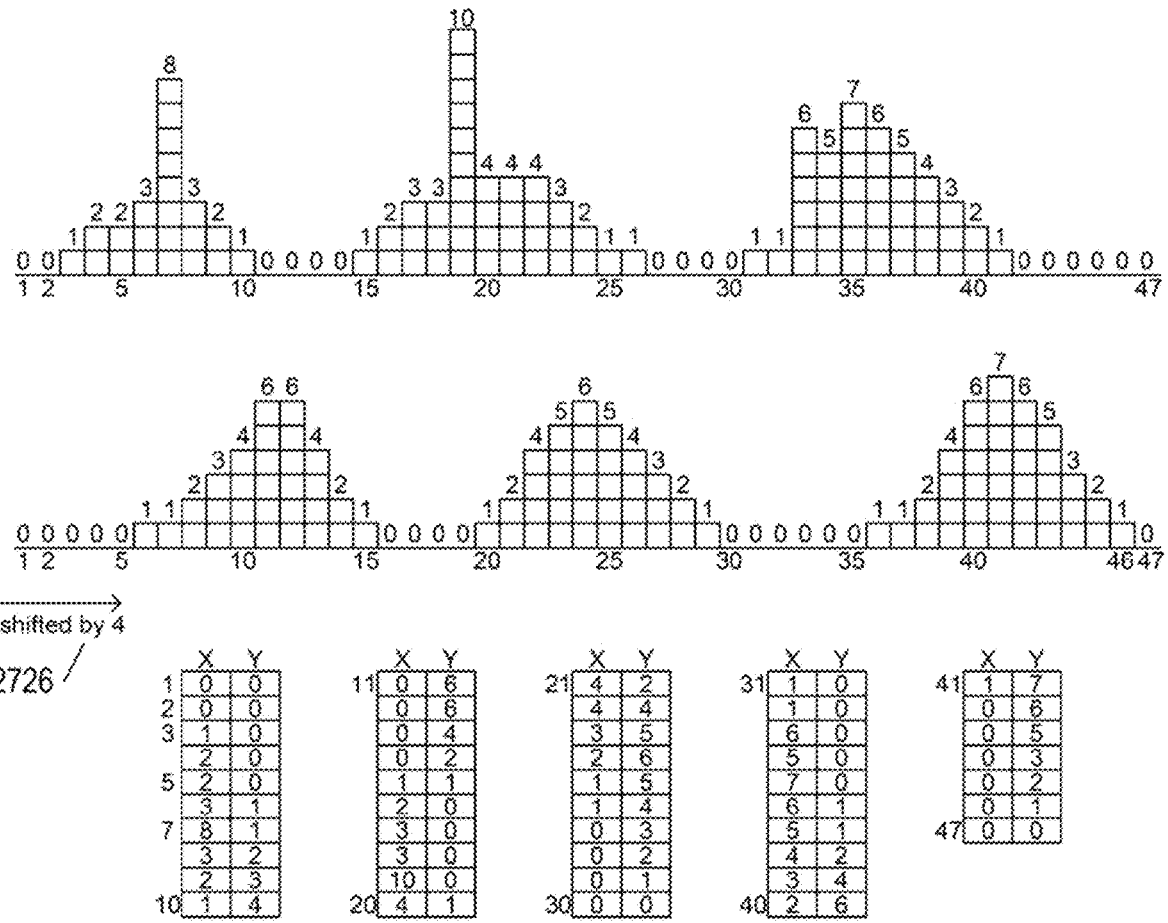

FIGS. 27A-B illustrate one approach to computing a cross-correlation coefficient, or metric, for two time-series-like signals corresponding to two different log/event-message types. A portion of the first time-series-like signal, represented by histogram 2702, is shown at the top of the figure, below which a portion of a second time-series-like signal is shown represented by histogram 2704. The two time-series-like-signal portions are aligned horizontally with respect to time. Clearly, peak 2706 is relatively well aligned with peak 2707, peak 2708 is relatively well aligned with peak 2709, and peak 2710 is relatively well aligned with peak 2711. Table 2712 shows the log/event-message-occurrence values for the two time-series-like curves that each time point. For example, at time point 7 (2714) and 2716, the first time-series-like curve has a value of 8 and the second time-series-like curve has a value of 6. Thus, in table 2712, the pair of values (8, 6) 2718 is included for time point 7. The pairs of values in table 2712 can be considered to represent a two-dimensional curve, with the first value in each pair representing an x coordinate and the second value in each pair representing a y coordinate. The average values 2720 for the x and y coordinates for this curve, x and y, are the same since the two time-series-like curves are normalized. Any of numerous different correlation coefficients can be then computed for the two-dimensional curve, such as the Pearson's correlation coefficient 2722, the closely related Spearman ranks correlation coefficient, or the normalized cross-correlation coefficient 2724. Values of the Pearson's correlation coefficient fall in the range [−1,1] and values for the normalized cross-correlation coefficient fall in the range [0,1]. The larger the correlation coefficient, the greater the similarity between the two time-series-like curves for which the cross-correlation coefficient is computed. It is possible that certain cross-correlation metrics may have smaller values for similar time-series-like curves and larger values for less similar time-series-like curves, but, of course, a simple algebraic transformation can invert the meanings of such cross-correlation metrics. In this document, the phrase "maximum cross-correlation coefficient" corresponds to a correlation coefficient among multiple different correlation coefficients that indicates greatest similarity between two time-series-like curves. FIG. 27B shows the same two curves, but with the second time-series-like curve shifted to the right by four time intervals 2726. The computed correlation coefficients 2728 and 2730 have much smaller magnitudes than those shown in FIG. 27A for the much better aligned time-series-like curves.

In the currently disclosed methods and systems, a cross-correlation value is computed for each pair of time-series-like signals generated for each different log/event-message type. This cross-correlation value is the maximum computed correlation coefficient for a series of superpositions of the two time-series-like signals, such as the superpositions shown in FIGS. 26A-B. In other words, it is the maximum correlation coefficient obtained for a the various offsets τ in time between the two time-series-like signals in the series of superpositions. Then, those pairs of time-series-like signals having cross-correlation values greater than a threshold value are considered to be strongly correlated. The strongly-correlated signal pairs are then used, as discussed in detail, below, to identify transactions and traces in a second phase of the transaction/trace-identification process.

Figure 28A:
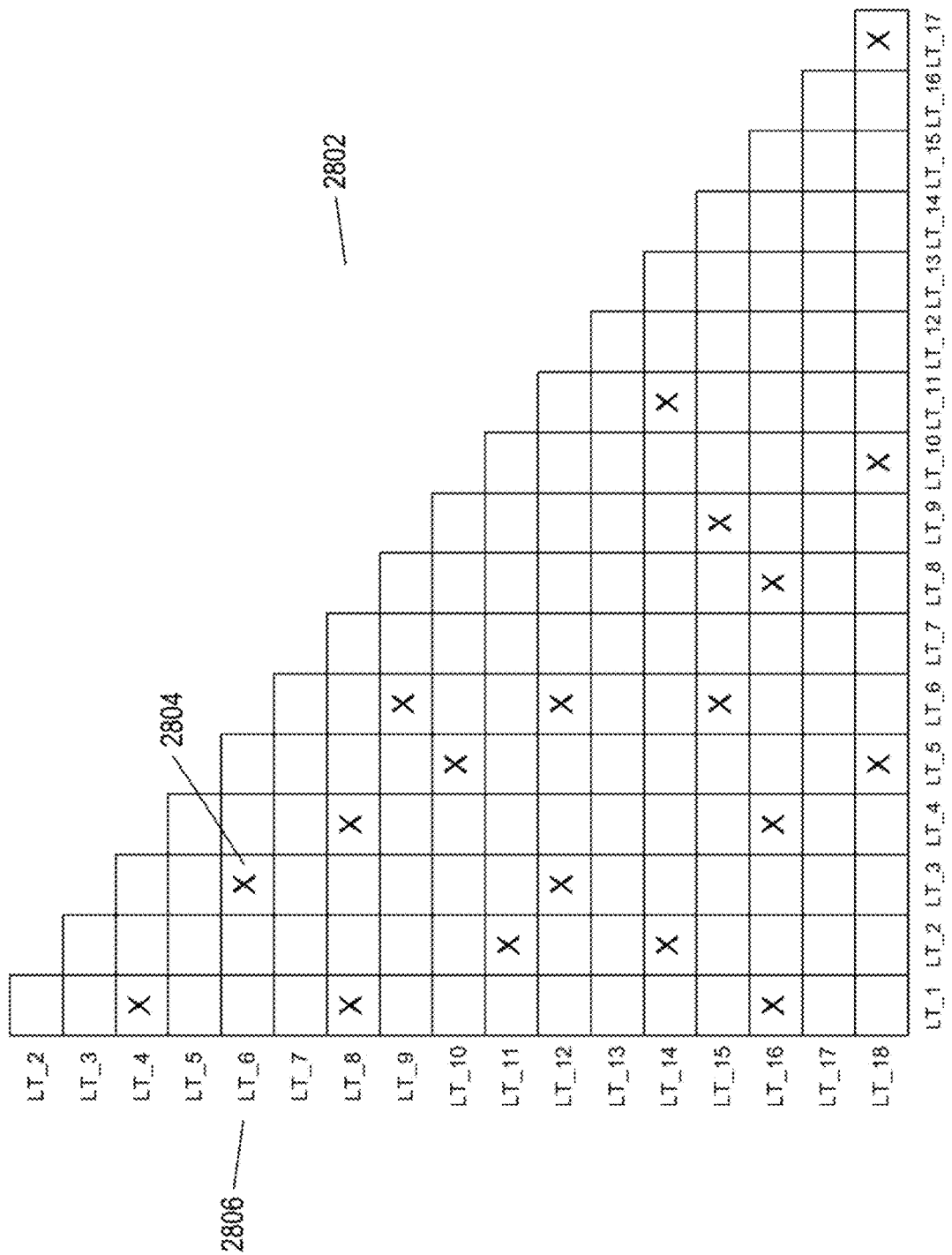

FIGS. 28A-B illustrate a first step the second phase of the transaction/trace-identification process. FIG. 28A shows a table 2802 that contains indications of the strongly-correlated log/event-message types obtained from the above-discussed time-series-like signals generated for each log/event-message type. The row and column indices of each cell marked with a symbol "X" corresponds to a strongly-correlated log/event-message-type pair. Thus, for example, the symbol "X" 2804 indicates that log/event-message type 6 (2806) is strongly correlated with log/event-message type 3 (2808). These indications of strong correlations between log/event-message types are then used to generate the strongly-correlated-type graph 2820, shown in FIG. 28B. Each node in this graph represents a log/event-message type and each edge in this graph represents a strong correlation between the two log/event-message types connected by the edge. Strongly-correlated-type graph 2020 is simply an alternative representation of table 2802 shown in FIG. 28A. A connected-component method is employed to extract connected-component subgraphs 2824-2827 from strongly-correlated-type graph 2820. The nodes and edges in each connected-component subgraph are the same as corresponding nodes and edges in strongly-correlated-type graph 2820. There are no edges or connections between a connected-component subgraph and any of the other connected-component subgraphs extracted from a strongly-correlated-type graph. Each connected-component subgraph corresponds to a different transaction or, in the case of log/event messages produced by components of a distributed application, a different application transaction. The log/event-message types included in these connected-component graphs are all strongly correlated with one another. Additional log/event-message types may be generated during execution of any particular application transaction that are not present as nodes in the connected-component subgraph corresponding to the application transaction. For example, multiple different application transactions may call some particular application component, in which case the time-series-like signal generated from a log/event-message type produced by the particular application component may not be sufficiently strongly correlated with other of the log/event-message types produced by the multiple different application transactions to be selected for inclusion in the strongly-correlated-type graph. However, in the currently disclosed implementation, the goal is not to produce exhaustive and complete sets of log/event-message types corresponding to application transactions, but instead to produce sets of highly relevant log/event-message types that together serve as identifiers for each of the different application transactions.

Figure 29A:
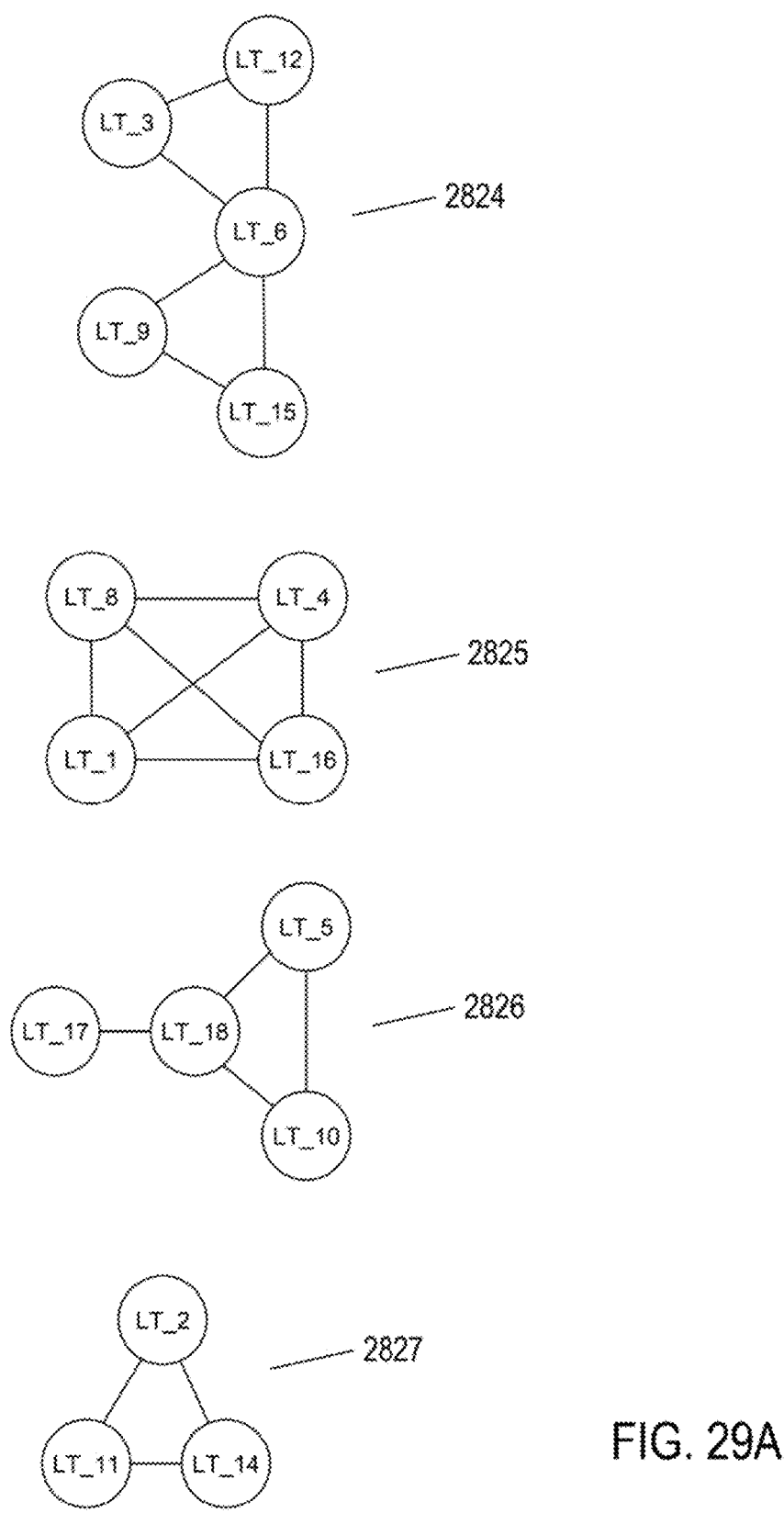
Figure 29E:
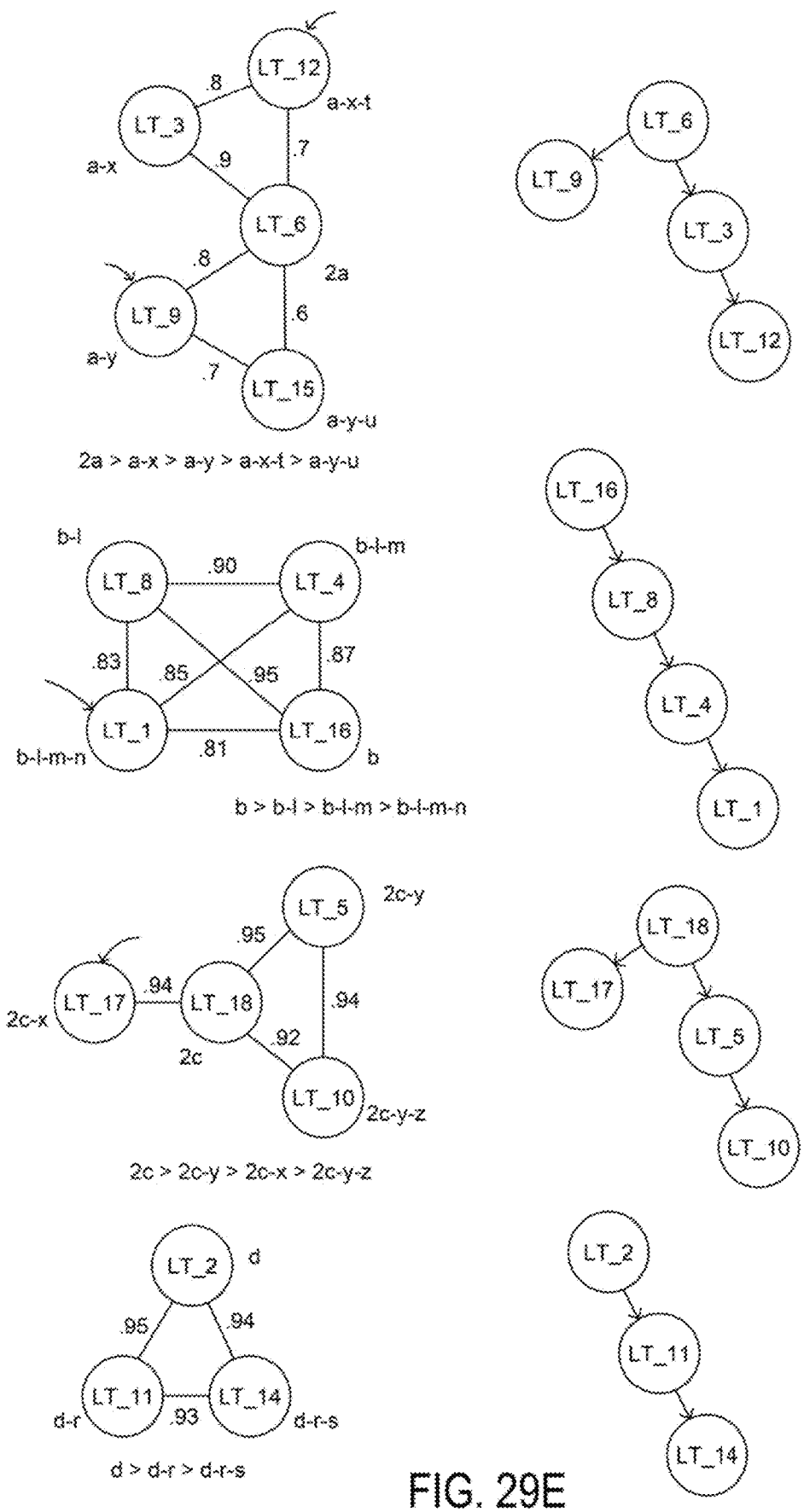

FIGS. 29A-G illustrate generation of traces corresponding to each of the application transactions that, in turn, correspond to each of the connected-component subgraphs extracted from strongly-correlated-type graph 2020 shown in FIG. 28B. FIG. 29A shows all four connected-component subgraphs 2824-2827. In FIG. 29B, the nodes of each connected-component subgraphs are annotated with the unnormalized number of occurrences of the log/event-message type corresponding to the node in the original, input collection of log/event message. Each edge is annotated by the cross-correlation value computed for the two log/event-message types corresponding to the two nodes connected by the edge. In a first step, shown in FIG. 29B, a root node is selected in each of the connected-component subgraphs. The selected root node is indicated by an arrow, such as arrow 2902 that points to node 2904 in connected-component subgraph 2824.

In many cases, the root node is selected as the node representing the log/event-message type associated with the highest number of unnormalized occurrences in the collected log/event messages input to the transaction/trace-identification process. The root node thus corresponds to the log/event-message type of the log/event-message types identified as belonging to the same application transaction that occurs most frequently. This is a reasonable approach, since the first log/event message generated in an application transaction would logically be expected to have the highest number of occurrences, since application transactions may prematurely terminate due to errors or to the fact that the application transaction may naturally terminate before all of the additional routines and components that may possibly be called during execution of the application transaction actually are called. However, in certain cases, this criterion for root-node selection is inadequate. Top address this problem, additional information is used for root-node selection, including the time-ordering of the log/event-message occurrences of the log/event-message types corresponding to the nodes of the acyclic graph. Not only is the type of the first log/event message generated in an application transaction generally associated with a large type occurrence, it also precedes the remaining types associated with the nodes of the acyclic graph in time. In addition, available information about distributed-application entrypoints may also be used for selecting root nodes. Additionally, a user interface may be provided to allow human personnel to select root nodes for application transactions based on additional information known to them. The selected root nodes 2904-2907 are shown to the right of each connected-component subgraph, to which additional nodes are added in subsequent figures to generate the corresponding acyclic graph.

Once a root node is selected for each connected-component subgraph, a recursive depth-first search is conducted within each connected-component subgraph, during which each next node is selected based on the magnitude of the correlation between the current node and the next node, or, in other words, based on the value associated with the edge between the current node in the next node. Cycles are not allowed. Thus, this depth-first-search process essentially removes cycles from the connected-component graphs to produce an acyclic, tree-like derivative of the connected-component graph. In the current example, it is assumed that the cross-correlation values corresponding to all of the edges connected to any particular node in a connected-component subgraph are different, to simplify the example. When this is not true, it may be necessary to consider several different possible depth-first searches in order to determine whether the two edges correspond to two different traces or, instead, correspond to adjacent edges in a single trace. In the currently described implementation, the polarity of the time lags between the time-series-like signals are not considered, but this information is available in order to facilitate determination of whether the two edges correspond to two different traces or, instead, correspond to adjacent edges in a single trace. In FIG. 29C, each node selected as the first node in the recursive depth-first search is annotated with an arrow, such as arrow 2908 associated with node 2909. The selected nodes 2909-2912 are added to the acyclic graphs to the right of the corresponding connected-component subgraphs. In each successive figure of FIGS. 29 D-F, a next node in the recursive depth-first search is annotated with a curved arrow. Since cycles are not allowed in the acyclic graphs, when a leaf node is reached, from which there are no connections to any nodes not already included in the acyclic graph, the recursive depth-first search recurses upward to start a next trac, when nodes remain in the connected-component subgraph that have not yet been added to the acyclic graph.

Figure 29F:
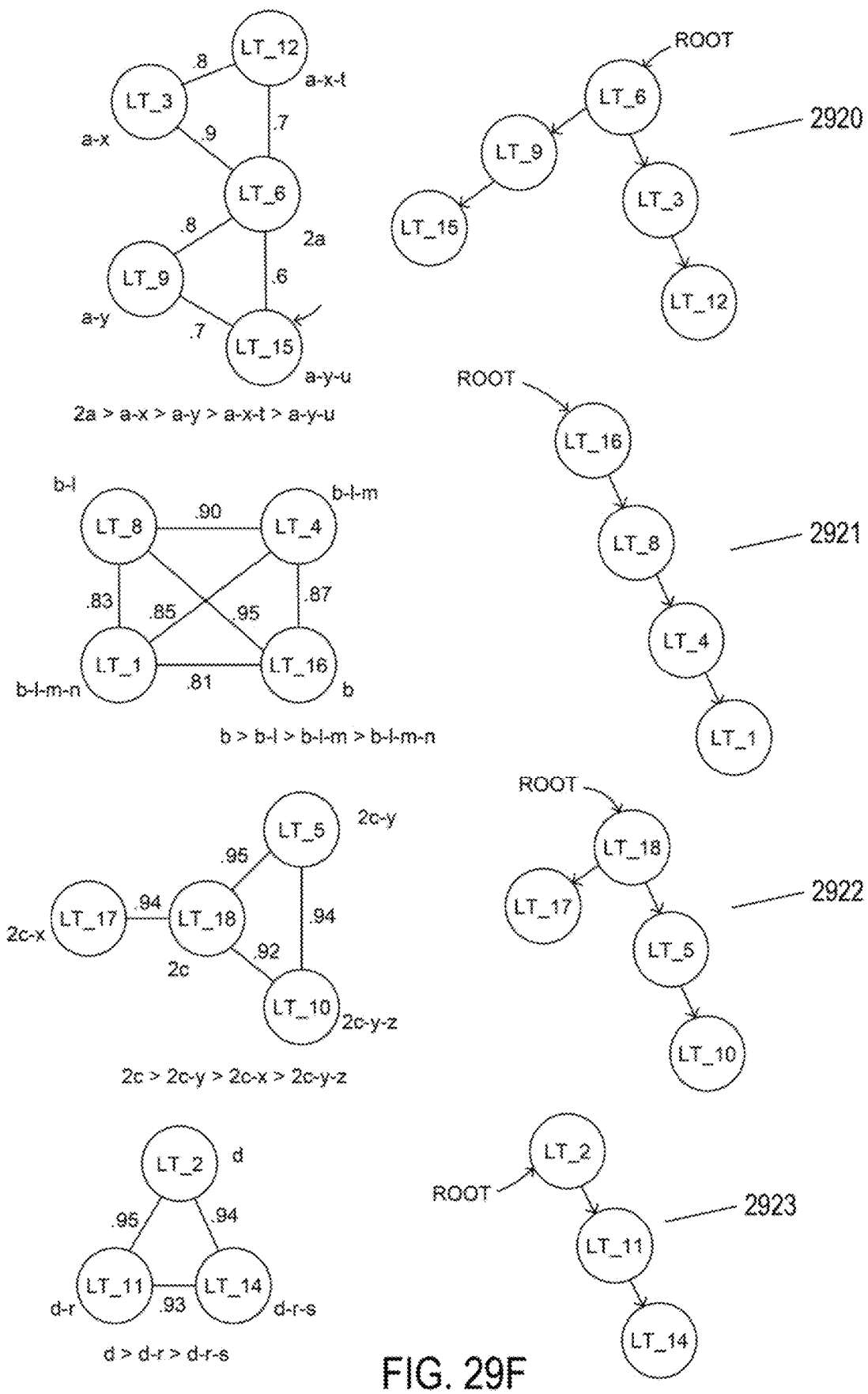
Figure 29G:
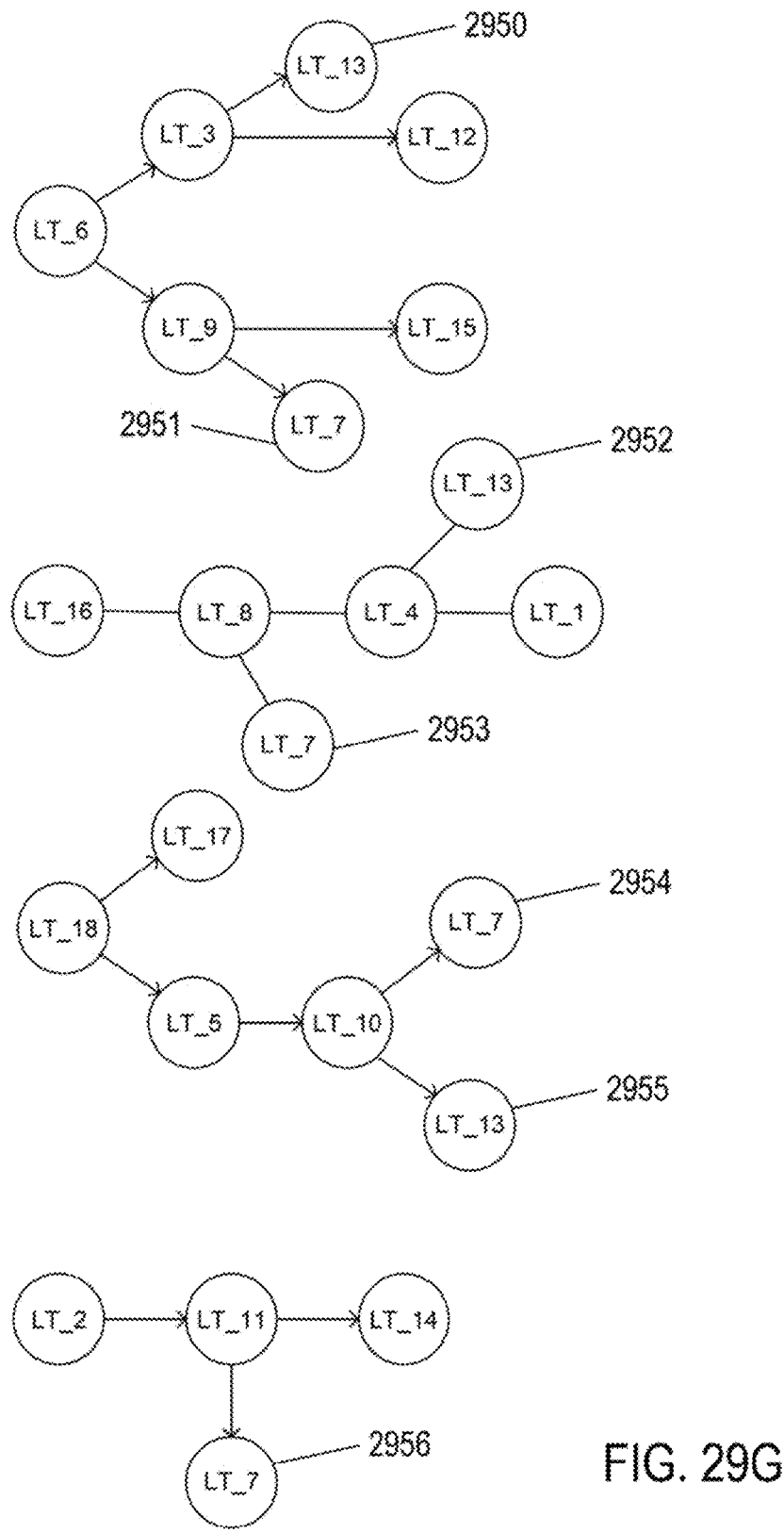

FIG. 29F shows the final acyclic graphs 2920-2923 produced by the depth-first searches applied to each of the connected-component subgraphs shown in FIG. 29A. Each leaf node in an acyclic graph corresponds to a different trace corresponding to the application transaction that, in turn, corresponds to the connected-component subgraph from which the acyclic graph is generated. The full trace is obtained by traversing the acyclic graph from the leaf node back to the root node. Thus, for example, acyclic graph 2920 represents two traces: 6→9→15 and 6→3→12. FIG. 29G illustrates the complete acyclic graphs corresponding to the complete connected-component subgraphs corresponding to the identified application transactions in the example of FIGS. 28A-29G. Because log/event-message types 7 and 13 occur in multiple application transactions 2950-2956, these two log/event-message types were not sufficiently strongly correlated with other of the log/event-message types to be included in the original strongly-correlated-type graph 2820 shown in FIG. 28 B. However, the traces obtained from acyclic graphs 2920-2923, shown in FIG. 29F, represent accurate and robust identifiers for the application transactions from which each of the acyclic graphs were generated.

As discussed above, identification of transactions and traces from a collection or stream of log/event messages is a fundamental and necessary step in the various types of administration-and-management monitoring and anomalous-behavior-detection tasks carried out by an automated-administration-and-management subsystem within a distributed computer system. Without this information, an automated-administration-and-management subsystem cannot extract sufficient information from a collection or stream of log/event messages to recognize transactions and transaction patterns that are the fundamental indicators of the current operational states of computational entities running within a distributed computer system and, in the case of log/event messages generated by hardware components, that are fundamental indicators of the current operational state of the physical distributed computer system. The currently disclosed methods and systems for identifying transactions and traces from collections and streams of log/event messages is thus a first and necessary step in automated distributed-computing-system and distributed-application administration and management. As discussed above, current methods used to obtain this information are associated with significant and often debilitating deficiencies. Only by using a robust and accurate automated approach to identifying transactions and traces within collections and streams of log/event messages can an automated-administration-and-management subsystem have any hope of keeping abreast with the rapid evolution of computing entities in modern distributed computer systems.

FIGS. 30A-E provide an example implementation of methods for extracting connected-component subgraphs from a strongly-correlated-type graph and for transforming the extracted connected-component subgraphs into acyclic graphs, as discussed above with reference to FIGS. 25-29F. FIGS. 30A-B provide the class declarations for the example implementation. These classes include: (1) graphComponent 3002, a parent or base class from which nodes, or vertexes, and edges are derived; (2) vertex 3004, instances of which represent nodes or vertices in a graph; (3) edge 3006, instances of which represent edges in a graph; (4) stack 3008, two instances of which are included in the class graph, one for stacking vertices and one for stacking edges; and (5) graph 3010, instances of which represent graphs. For the sake of brevity and clarity, only the public member functions in the class declarations are provided. In the example implementation, instances of the classes vertex and edge can store one or more data values. The class graphComponent provides member functions 3012 for setting and retrieving these data values as well as a member function 3014 that returns the type of graph component represented by an instance of the class graphComponent. The classes vertex and edge provide various constructors for constructing instances of these classes with no, one, and two associated data values, and instances of the class edge additionally store pointers to the two vertices, or nodes, connected by the edge instances, which can be retrieved by member function 3016. The class graph includes member function removeAndReturnCC 3018, which removes a next connected-component subgraph from the graph and returns a pointer to the connected-component subgraph. The class graph also includes a pair of member functions acyclize and acyclizeRecursive 3020 which together generate an acyclic graph from a graph and return a pointer to the acyclic graph.

FIG. 30C shows an implementation of the member function removeAndReturnCC of the class graph. A local variable v is set to a vertex within the graph 3030. If there are no vertices in the graph, then a null pointer is returned 3031. Otherwise, a new graph instance is allocated 3032. In the do-while loop 3033, pointers to all of the edges that include the vertex v are pushed onto an internal edge stack 3034. A pointer to a first edge is then popped from the internal edge stack 3035 and placed in local variable e. In while-loop 3036, each edge popped from the internal edge stack is processed. For each edge, the vertex not equal to vertex v is pushed onto an internal vertex stack 3037 and the edge is added to the acyclic graph 3038. Once all the edges stacked for the vertex v have been processed, vertex v is added to the acyclic graph 3039 and removed from the original graph 3040. Then, a next vertex, if any, is removed from the internal vertex stack 3041. When there are no more vertices on the internal vertex stack, the acyclic graph is returned 3042.

FIG. 30D shows an implementation of the member function acyclize of the class graph. Local variable v is initialized to point to the graph vertex, or node, with a maximum associated data value 3050. This assumes that the data value unambiguously indicates the root node. As discussed above, in real-world implementations, additional considerations may be used to select root nodes. The associated data values of the graph nodes are, as explained above, the unnormalized number of occurrences of the log/event-message type represented by the graph note. If no such graph node is found, null is returned 3051. Otherwise, a new graph-class instance is allocated 3052. Then, all of the edges that include vertex v and that do not include any vertex currently inhabiting the internal vertex stack are pushed onto an internal edge stack 3053 and vertex v is pushed onto an internal vertex stack 3054. In do-while loop 3055, depth-first searches starting with the current edge associated with vertex v corresponding to the maximum correlation coefficient are initiated. The edge with maximum correlation coefficient is found in the for-loop 3056 and a recursive depth-first search is begun with a call to member function acyclizeRecursive 3057. After the call returns to member function acyclizeRecursive, the currently considered edge is added to the acyclic graph 3058 and all of the edges associated with the first vertex in the initiated recursive depth-first search are removed from the original graph 3059. In while-loop 3060, all of the internally stacked vertexes are added to the acyclic graph, then all of the vertices are removed from the current graph 3061, and, finally, the acyclic graph is returned 3062.

FIG. 30E provides an implementation for the member function acyclizeRecursive of the class graph. This member function implements the recursive depth-first search beginning with a vertex of the edge with maximum cross-correlation value emanating from the selected root node. The argument nxtV points to this first vertex in the depth-first search. If this argument is null, a null value is returned 3070. Otherwise, all of the edges that include this vertex and that do not include any vertex residing on the internal vertex stack are pushed onto the internal edge stack 3071. The vertex referenced by nxtV is then pushed onto the internal vertex stack 3072. In the for-loop 3073, the edges pushed onto the internal stack 3071 are popped and processed. For each edge, the vertex connected by the edge not equal to the vertex referenced by nxtV is used as the first node in a recursive depth-first search 3074. Following that search, the current edge is added to the acyclic graph 3075 and all edges that include the first node of the recursive depth-first search begun by the call to acyclizeRecursive are removed from the current graph 3076.

Figure 31:
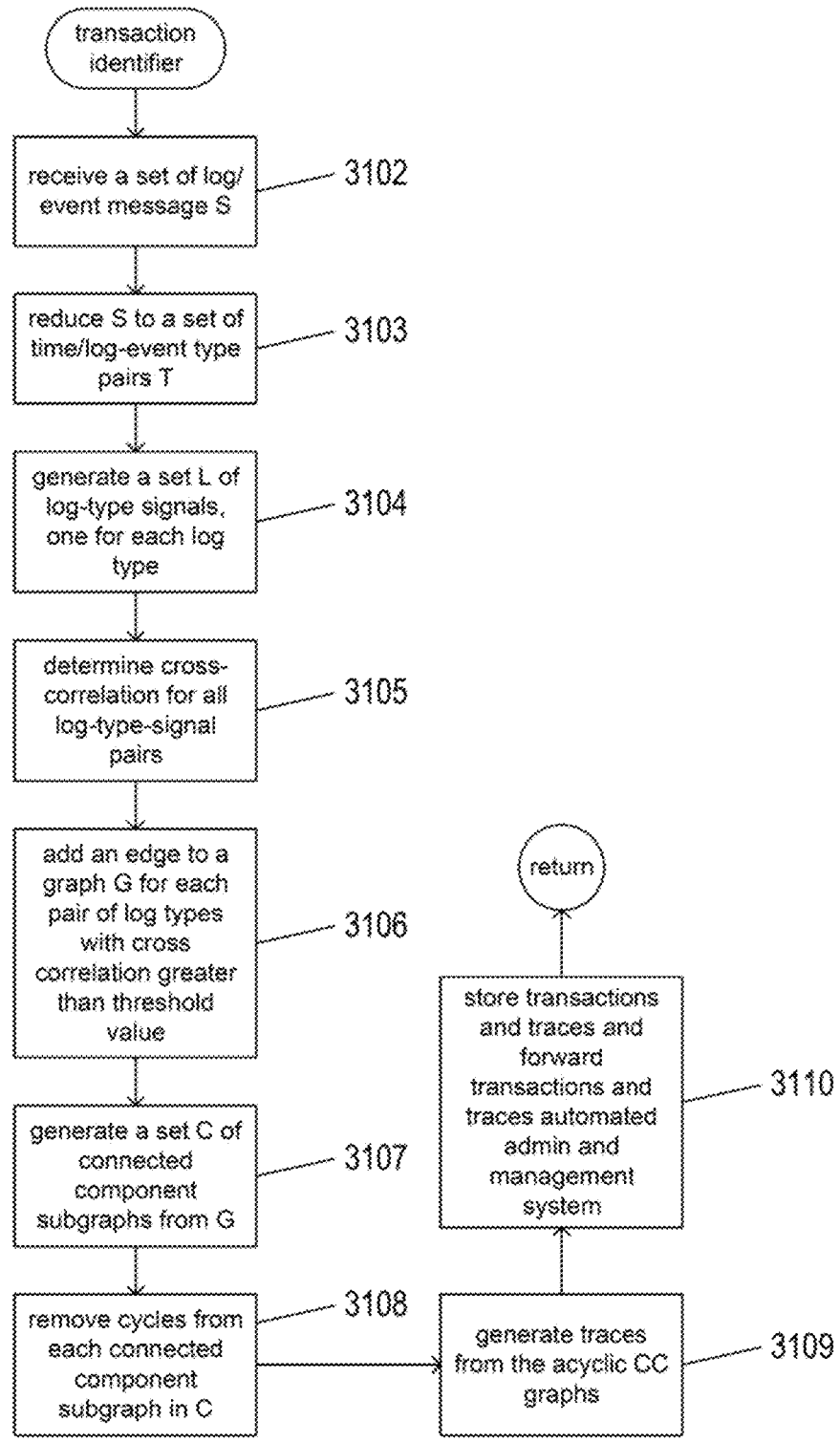
FIG. 31 provides a control-flow diagram that summarizes one implementation of the above-described methods, carried out by a transaction/trace-identification subsystem within a distributed computer system, that identify transactions and associated log/event-message traces for computational entities within the distributed computer system from an input stream and/or collection of log/event messages.

FIG. 31 provides a control-flow diagram that summarizes one implementation of the above-described methods, carried out by a transaction/trace-identification subsystem within a distributed computer system, that identify transactions and associated log/event-message traces for computational entities within the distributed computer system from an input stream and/or collection of log/event messages. In step 3102, a collection or stream of log/event messages. S, is received or accessed. In step 3103, the received stream or collection of log/event messages is reduced, or transformed, to a set T of time/log/event-message-type pairs, as discussed above with reference to FIGS. 17-20. In Step 3104, a set L of time-series-like signals, one for each log/event-message type, is generated from the set T of time/log/event-message-type pairs, as discussed above with reference to FIGS. 21-24. In step 3105, a cross-correlation value is determined for each pair of time-series-like signals, as discussed above with reference to FIGS. 25-27B. In step 3106, a strongly-correlated-type graph is generated from those pairs of time-series-like signals for which the computed cross-correlation values are greater than a threshold value. In step 3107, a set of connected-component subgraphs C is extracted from the strongly-correlated-type graph, as discussed above with reference to FIG. 20B. In step 3108, cycles are removed from each of the connected-component subgraphs in set C to generate corresponding acyclic graphs, as discussed above with reference to FIG. 28B. In step 3109, traces are generated from the acyclic graphs, as discussed above with reference to FIGS. 29A-G. Finally, in step 3110, the identified transactions and the traces associated with each transaction are stored and immediately or subsequently forwarded to an automated-administration-and-management subsystem within a distributed computer system for use in extracting information, from collections and/or streams of log/event messages, about the operational states of distributed applications and other computational entities running within the distributed computer system as well as information about the states of physical components of the distributed computer system. As discussed above, an automated-administration-in-management subsystem cannot extract sufficient information for these purposes without having a relevant and accurate set of identified transactions and traces.

The present invention has been described in terms of particular embodiments, it is not intended that the invention be limited to these embodiments. Modifications within the spirit of the invention will be apparent to those skilled in the art. For example, any of many different implementations of the above-disclosed transaction/trace identification methods and subsystems can be obtained by varying various design and implementation parameters, including modular organization, control structures, data structures, hardware, operating system, and virtualization layers, and other such design and implementation parameters. As mentioned above, there are many different possible methods for normalizing and smoothing time-series-like curves that can be used in addition to the methods mentioned above. Similarly, many different methods can be used to generate cross-correlation coefficients that indicate the similarity between two timeseries-like curves generated for log/event-message types. As also mentioned, many different approaches, from hard coding by developers to automated machine-learning-based methods, can be used to generate patterns and log/event-message-to-BFLM transformations. Determination of transactions and traces using graph-based methods are described above, but other methods may be employed to identify transactions and traces from normalized and smoothed time-series-like curves generated from timestamp/log-event-message-type pairs. While timestamp ordering is employed in the above-discussed methods, other approached may be used for ordering log/event messages for generation of time-series-like signals. A transaction-and-trace identification subsystem provided transaction and trace identifications to an automated distributed-computer-system management-and-administration system, and may implement the transaction/trace-identification methods in one or more servers or other types of computer systems within a distributed computer system via implementations of first-phase and second-phase components that carry out the actions and transformations discussed above.

What is claimed is:

1. An improved transaction-and-associated-trace identification subsystem, incorporated within one or more computer systems of a distributed computer system, each having one or more processors and one or more memories, that identifies transactions and associated log/event-messages traces from a collection and/or stream of log/event messages, the transaction-and-associated-trace identification subsystem comprising:
    first-phase transaction-and-associated-trace identification subsystem components that generate cross-correlation values for each pair of log/event-message types in the collection or stream of log/event messages; and
    second-phase transaction-and-associated-trace identification subsystem components that
        identify transactions and associated log/event-message traces from the generated cross-correlation values,
        store the identified transactions and associated log/event-message traces in one or more of the one or more memories, and
        transmit the identified transaction and associated log/event-message traces to an analysis system that identifies patterns of transaction in collections or streams of log/event messages.

2. The improved transaction-and-associated-trace identification subsystem of claim 1 wherein the first phase identification-subsystem components
    receive or access the collection or stream of log/event messages;
    preprocess the log/event messages to generate a log/event-message type for each log/event message;
    generate a timestamp/log-or-event-message-type pair for each log/event message;
    generate a time-series-like event-message-type-occurrence signal for each log/event-message type from the timestamp/log-or-event-message-type pairs generated for the log/event-message type; and
    compute a cross-correlation value for each pair of time-series-like event-message-type-occurrence signals.

3. The improved transaction-and-associated-trace identification subsystem of claim 1 wherein the second phase identification-subsystem components
    select those pairs of log/event-message types for which the cross-correlation value computed from their corresponding time-series-like event-message-type-occurrence signals is greater than a threshold value;
    add, to a strongly-correlated-type graph, each selected pair of log/event-message types as two nodes connected by an edge representing the cross-correlation value computed for the pair of log/event-message types;
    extract a set of connected-component subgraphs from the strongly-correlated-type graph;
    generate an acyclic graph corresponding to each connected-component subgraph;
    extract one or more log/event-message traces from each acyclic graph;
    store each identified transaction corresponding to a connected-component subgraph and associated log/event-message traces extracted from the connected-component subgraph; and
    transmit the identified transaction and associated log/event-message traces to an analysis system that identifies patterns of transaction in collections or streams of log/event messages.

4. A method that identifies transactions and associated log/event-message traces in a collection or stream of log/event messages and that is implemented in one or more servers or other computer systems, each including one or more processors and one or more memories, within a distributed computer system, the method comprising:
    generating cross-correlation values for each pair of log/event-message types in the collection or stream of log/event messages;
    identifying transactions and associated log/event-message traces from the generated cross-correlation values;
    storing the identified transactions and associated log/event-message traces in one or more of the one or more memories; and
    transmitting the identified transaction and associated log/event-message traces to an analysis system that identifies patterns of transaction in collections or streams of log/event messages.

5. The method of claim 4 wherein generating cross-correlation values for each pair of log/event-message types in the collection or stream of log/event messages further comprises:
    receiving or accessing the collection or stream of log/event messages;
    preprocessing the log/event messages to generate a log/event-message type for each log/event message;
    generating a timestamp/log-or-event-message-type pair for each log/event message;
    generating, for each log/event-message type included in one or more of the timestamp/log-or-event-message-type pairs, a time-series-like log/event-message-type occurrence signal; and
    computing a maximum cross-correlation coefficient for each pair of time-series-like log/event-message-type occurrence signals.

6. The method of claim 5 wherein log/event-message are generated within the distributed computer system by:
    message-generation-and-reporting components of hardware components of the distributed computer system, including network routers and bridges, network-attached storage devices, network-interface controllers, and other hardware components and devices; and
    message-generation-and-reporting components within computer-instruction-implemented components of the distributed computer system, including virtualization layers, operating systems, and applications running within servers and other types of computer systems.

7. The method of claim 5 wherein log/event-messages include text, alphanumeric values, or numeric values that represent different types of information, including notifications of completed actions, errors, anomalous operating behaviors and conditions, various types of computational events, and warnings.

8. The method of claim 5 wherein preprocessing a log/event message to generate a log/event-message type for the log/event message further includes;
identifying fields within the log/event message; and
altering one or more variable fields selected from the identified fields to generate a base-form corresponding to the log/event message.

9. The method of claim 8
wherein variable fields are fields with content that varies among the log/event messages in the collection or stream of log/event messages; and
wherein variable fields are altered by one of
deleting the variable field,
replacing the variable field with a character or symbol that is used for replacing the variable field in those log/event messages that contain the variable field,
replacing the variable field with multiple characters or symbols that are used for replacing the variable field in those log/event messages that contain the variable field, and
abbreviating the variable.

10. The method of claim 8 wherein generating a timestamp/log-or-event-message-type pair for a log/event message further includes:
extracting a timestamp from the log/event message;
generating a base-form corresponding to the log/event message;
using, for the timestamp element of the timestamp/log-or-event-message-type pair, one of
the extracted timestamp, and
a numeric or alphanumeric value to which the extracted timestamp is mapped; and
using, for the log-or-event-message-type element of the timestamp/log-or-event-message-type pair, one of
the base-form, and
a numeric or alphanumeric value to which the base-form is mapped.

11. The method of claim 5 wherein generating, for a particular log/event-message type included in one or more of the timestamp/log-or-event-message-type pairs, a time-series-like log/event-message-type occurrence signal further comprises:
for each timestamp/log-or-event-message-type pair, generated from a log/event message in the collection or stream of log/event messages, that includes the particular log/event-message type,
determining a time interval corresponding to the timestamp included in the timestamp/log-or-event-message-type pair, and
incrementing an occurrence-count value for that time interval in the time-series-like log/event-message-type occurrence signal.

12. The method of claim 11 wherein the time intervals within the time-series-like log/event-message-type occurrence signal are of a single, fixed length in a range of ten milliseconds to a second.

13. The method of claim 5 wherein computing a maximum cross-correlation coefficient for each pair of time-series-like log/event-message-type occurrence signals further comprises:
for each pair of time-series-like log/event-message-type occurrence signals,
for each time shift $\tau$ in a set of time shifts,
computing a cross-correlation coefficient for a superposition of the first time-series-like log/event-message-type occurrence signal of the pair with the second time-series-like log/event-message-type occurrence signal of the pair shifted in time by $\tau$; and
selecting, as the maximum cross-correlation coefficient for the pair, the largest cross-correlation coefficient computed for a superposition of the first time-series-like log/event-message-type occurrence signal of the pair with the second time-series-like log/event-message-type occurrence signal of the pair.

14. The method of claim 13 wherein a cross-correlation coefficient is a metric, the value of which reflects the similarity of two time-series-like log/event-message-type occurrence signals for which the cross-correlation coefficient is computed.

15. The method of claim 4 wherein identifying transactions and associated log/event-message traces from the generated cross-correlation values further comprises:
selecting those pairs of log/event-message types for which the cross-correlation value computed from their corresponding time-series-like log/event-message-type occurrence signals is greater than a threshold value;
adding, to a strongly-correlated-type graph, each selected pair of log/event-message types as two nodes connected by an edge representing the cross-correlation value computed for the pair of log/event-message types;
extracting a set of connected-component subgraphs from the strongly-correlated-type graph;
generating an acyclic graph corresponding to each connected-component subgraph; and
extracting one or more log/event-message traces from each acyclic graph.

16. The method of claim 15 wherein a strongly-correlated-type graph includes nodes, or vertices, that each represents a log/event-message type and edges that each represents a greater-than-threshold cross-correlation value computed for the log/event-message types represented by a first and second node connected by the edge.

17. The method of claim 15
wherein each node of a connected-component subgraph is connected by an edge to at least one other node of the subgraph; and
wherein no node of the connected-component subgraph is connected by an edge to a node not contained in the connected-component subgraph.

18. The method of claim 15 wherein generating an acyclic graph corresponding to each connected-component subgraph further comprises:
choosing, as the root node of the acyclic graph, a node of the connected-component subgraph representing a log/event-message type based on the log/event-message type occurring more frequently in the collection or stream of log/event message than the other log/event-message types represented by other nodes of the connected-component subgraph as well as time ordering of the occurrences of log/event-message types; and
carrying out a recursive depth-first search of the remaining nodes of the connected-component subgraph, with any node encountered in the recursive depth-first search without a connection to a node not already included in the acyclic graph included in in the acyclic graph as a leaf node and with non-leaf nodes encountered in the search added to the acyclic graph as non-root, non-leaf interior nodes of the acyclic graph.

19. The method of claim 15 wherein extracting one or more log/event-message traces from an acyclic graph further comprises:
generating a trace for each leaf node of the acyclic graph by traversing the acyclic graph from the leaf node back to the root node.

20. A physical data-storage device that stores computer instructions that, when executed by processors within one or more computer systems of a distributed computer system, control the one or more computer systems to identify transactions and associated log/event-message traces in a collection or stream of log/event messages by:
generating cross-correlation values for each pair of log/event-message types in the collection or stream of log/event messages;
identifying transactions and associated log/event-message traces from the generated cross-correlation values;
storing the identified transactions and associated log/event-message traces in one or more of one or more memories; and
transmitting the identified transaction and associated log/event-message traces to an analysis system that identifies patterns of transaction in collections or streams of log/event messages.

* * * * *